REPRODUCING APPARATUS

Filed Sept. 30, 1964 28 Sheets-Sheet 1

INVENTORS
ROBERT F. OSBORNE
JOHN W. MELVILLE
ROLF W. EICHLER
KARL A. NORTHRUP
JOHN F. WIRLEY
BY Norman E. Schrader
Arthur H. Krein
ATTORNEYS ROBERT F. OSBORNE
JOHN W. MELVILLE
ROLF W. EICHLER
KARL A. NORTHRUP
JOHN F WIRLEY

BY

ATTORNEYS

REPRODUCING APPARATUS

Filed Sept. 30, 1964 28 Sheets-Sheet 3

ROBERT F. OSBORNE
JOHN W. MELVILLE
ROLF W. EICHLER
KARL A. NORTHRUP
JOHN F. WIRLEY

BY [signature]
[signature]
ATTORNEYS

Jan. 31, 1967 R. F. OSBORNE ETAL 3,301,126

REPRODUCING APPARATUS

Filed Sept. 30, 1964 28 Sheets-Sheet 4

INVENTORS
ROBERT F. OSBORNE
JOHN W. MELVILLE
ROLF W. EICHLER
KARL A. NORTHRUP
JOHN F. WIRLEY

BY [signature]
[signature] Arthur H. Krein
ATTORNEYS

Jan. 31, 1967 R. F. OSBORNE ET AL 3,301,126

REPRODUCING APPARATUS

Filed Sept. 30, 1964 28 Sheets-Sheet 5

INVENTORS
ROBERT F. OSBORNE
JOHN W. MELVILLE
ROLF W. EICHLER
KARL A. NORTHRUP
JOHN F. WIRLEY

BY [signature]
[signature]
ATTORNEYS

INVENTORS
ROBERT F. OSBORNE
JOHN W. MELVILLE
ROLF W. EICHLER
KARL A. NORTHRUP
JOHN F. WIRLEY
BY Spencer E. Schneider
Arthur N. Krein
ATTORNEYS

REPRODUCING APPARATUS

Filed Sept. 30, 1964 28 Sheets-Sheet 7

INVENTORS
ROBERT F. OSBORNE
JOHN W. MELVILLE
ROLF W. EICHLER
KARL A. NORTHRUP
JOHN F. WIRLEY
BY Herman P. Schroeder
Arthur H. Krein
ATTORNEYS INVENTORS
ROBERT F. OSBORNE
JOHN W. MELVILLE
ROLF W. EICHLER
KARL A. NORTHRUP
JOHN F. WIRLEY
BY
ATTORNEYS INVENTORS
ROBERT F. OSBORNE
JOHN W. MELVILLE
ROLF W. EICHLER
KARL A. NORTHRUP
JOHN F. WIRLEY
BY Norman C. Schroeder
Arthur H. Krein
ATTORNEYS INVENTORS
ROBERT F. OSBORNE
JOHN W. MELVILLE
ROLF W. EICHLER
KARL A. NORTHRUP
JOHN F. WIRLEY
BY
ATTORNEYS

REPRODUCING APPARATUS

Filed Sept. 30, 1964 28 Sheets-Sheet 11

INVENTORS
ROBERT F. OSBORNE
JOHN W. MELVILLE
ROLF W. EICHLER
KARL A. NORTHRUP
JOHN F. WIRLEY
BY Norman C. Schrader
Arthur H. Krein
ATTORNEYS INVENTORS
ROBERT F. OSBORNE
JOHN W. MELVILLE
ROLF W. EICHLER
KARL A. NORTHRUP
JOHN F. WIRLEY
BY
ATTORNEYS Jan. 31, 1967 R. F. OSBORNE ET AL 3,301,126

REPRODUCING APPARATUS

Filed Sept. 30, 1964 28 Sheets-Sheet 13

INVENTORS
ROBERT F. OSBORNE
JOHN W. MELVILLE
ROLF W. EICHLER
KARL A. NORTHRUP
JOHN F. WIRLEY

BY [signature] [signature]
ATTORNEYS

INVENTORS
ROBERT F. OSBORNE
JOHN W. MELVILLE
ROLF W. EICHLER
KARL A. NORTHRUP
JOHN F. WIRLEY

BY [signature]
[signature]
ATTORNEYS

INVENTORS
ROBERT F. OSBORNE
JOHN W. MELVILLE
ROLF W. EICHLER
KARL A. NORTHRUP
JOHN F. WIRLEY
BY
ATTORNEYS

INVENTORS
ROBERT F. OSBORNE
JOHN W. MELVILLE
ROLF W. EICHLER
KARL A. NORTHRUP
JOHN F. WIRLEY

BY [signature]
[signature]
ATTORNEYS

INVENTORS
ROBERT F. OSBORNE
JOHN W. MELVILLE
ROLF W. EICHLER
KARL A. NORTHRUP
JOHN F. WIRLEY
BY [signature]
[signature]
ATTORNEYS Jan. 31, 1967 R. F. OSBORNE ETAL 3,301,126

REPRODUCING APPARATUS

Filed Sept. 30, 1964 28 Sheets-Sheet 18

INVENTORS
ROBERT F. OSBORNE
JOHN W. MELVILLE
ROLF W. EICHLER
KARL A. NORTHRUP
JOHN F. WIRLEY

BY [signature]
[signature]
ATTORNEYS

REPRODUCING APPARATUS

INVENTORS
ROBERT F. OSBORNE
JOHN W. MELVILLE
ROLF W. EICHLER
KARL A. NORTHRUP
JOHN F. WIRLEY
BY
Norman C. Schneider
Arthur H. Krein
ATTORNEYS

REPRODUCING APPARATUS

INVENTORS
ROBERT F. OSBORNE
JOHN W. MELLVILLE
ROLF W. EICHLER
KARL A. NORTHRUP
JOHN F. WIRLEY

BY

ATTORNEYS

INVENTORS
ROBERT F. OSBORNE
JOHN W. MELVILLE
ROLF W. EICHLER
KARL A. NORTHRUP
JOHN F. WIRLEY
BY [signature]
[signature]
ATTORNEYS ROBERT F. OSBORNE
JOHN W. MELVILLE
ROLF W. EICHLER
KARL A. NORTHRUP
JOHN F. WIRLEY
BY
ATTORNEYS ROBERT F. OSBORNE
JOHN W. MELVILLE
ROLF W. EICHLER
KARL A. NORTHRUP
JOHN F. WIRLEY
BY
ATTORNEYS ROBERT F. OSBORNE
JOHN W. MELVILLE
ROLF W. EICHLER
KARL A. NORTHRUP
JOHN F. WIRLEY
BY [signature]
[signature]
ATTORNEYS ROBERT F. OSBORNE
JOHN W. MELVILLE
ROLF W. EICHLER
KARL A. NORTHRUP
JOHN F. WIRLEY BY [signature]
[signature]
ATTORNEYS

REPRODUCING APPARATUS

Filed Sept. 30, 1964

INVENTORS
ROBERT F. OSBORNE
JOHN W. MELVILLE
ROLF W. EICHLER
KARL A. NORTHRUP
JOHN F. WIRLEY
BY
ATTORNEYS

INVENTORS
ROBERT F. OSBORNE
JOHN W. MELVILLE
ROLF W. EICHLER
KARL A. NORTHUP
JOHN F. WIRLEY

BY [signature] [signature]
ATTORNEYS

INVENTORS
ROBERT F. OSBORNE
JOHN W. MELVILLE
ROLF W. EICHLER
KARL A. NORTHRUP
JOHN F. WIRLEY

BY [signatures]
ATTORNEYS

United States Patent Office 3,301,126

Patented Jan. 31, 1967

3,301,126
REPRODUCING APPARATUS

Robert F. Osborne and John W. Melville, Webster, Rolf W. Eichler, Fairport, Karl A. Northrup, Rochester, and John F. Wirley, Webster, N.Y., assignors to Xerox Corporation, Rochester, N.Y., a corporation of New York Filed Sept. 30, 1964, Ser. No. 400,542
5 Claims. (Cl. 88—24)

This invention relates in general to copying machines and, in particular, to an improved xerographic reproducing apparatus.

More specifically, the invention relates to an improved automatic xerographic appartaus or similar apparatus for use as a copier in producing reproductions from either transparent, translucent or opaque copy, whether in the form of single sheets or in the form of a book.

Since the disclosure of the basic concept of xerography, as disclosed in either Carlson Patent 2,297,691, issued October 6, 1942, or in Carlson Patent 2,357,809, issued September 12, 1944, a variety of machines and devices have been proposed to incorporate such teachings in a manner to form copy xerographically on a commercial basis. For the most part, each of such devices has been specifically designed to the solution of a particular reproduction problem and, for the most part, has been limited to the particular use intended. Although a number of these machines are presently in wide commercial use, each of these machines has been designed for making a limited number of reproductions from an original. Essentially, each of these prior art machines can be considered as copiers, that is, machines capable of making only a limited number of copies of an original, or multiple copies with no direct count of the number of copies being made.

It is, therefore, the principal object of this invention to improve xerographic reproducing apparatus for use as a copier for making copies quickly, automatically, economically and accurately.

Another object of this invention is to improve xerographic apparatus of the rotary type whereby the operations of this device are effected by means of a programming device and interlock circuit to make a pre-selected number of copies, the programmer and machine resetting when the programmed number of copies have been made or when actuated by the interlock circuit.

Another object of this invention is to improve xerographic apparatus having a programming mechanism and interlock by which an operator can pre-select the desired number of copies to be made, the programming being unaffected by miss-feeds or paper jams within the apparatus but controlled by the interlock circuit.

It is a further object of the invention to improve xerographic apparatus in a manner to produce a copy from a stationary original selectively, either one copy of the original or a plurality of copies of the original and to form such copies repeatively in quick succession.

For a better understanding of the invention as well as other objects and further features thereof, reference is had to the following detailed description of the invention to be read in connection with the accompanying drawings, wherein.

Figure 30:
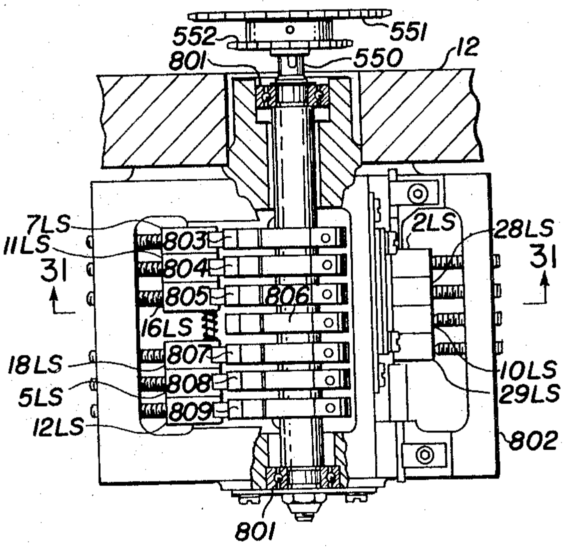
Figure 31:
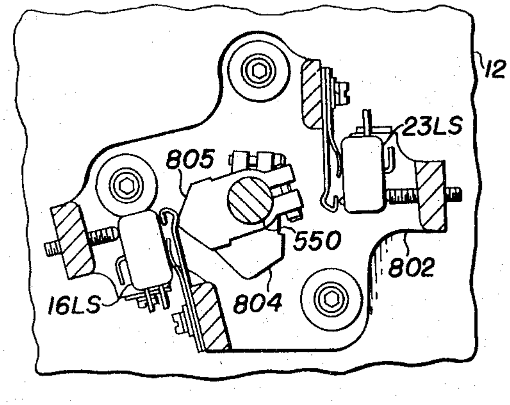
Figure 32A:
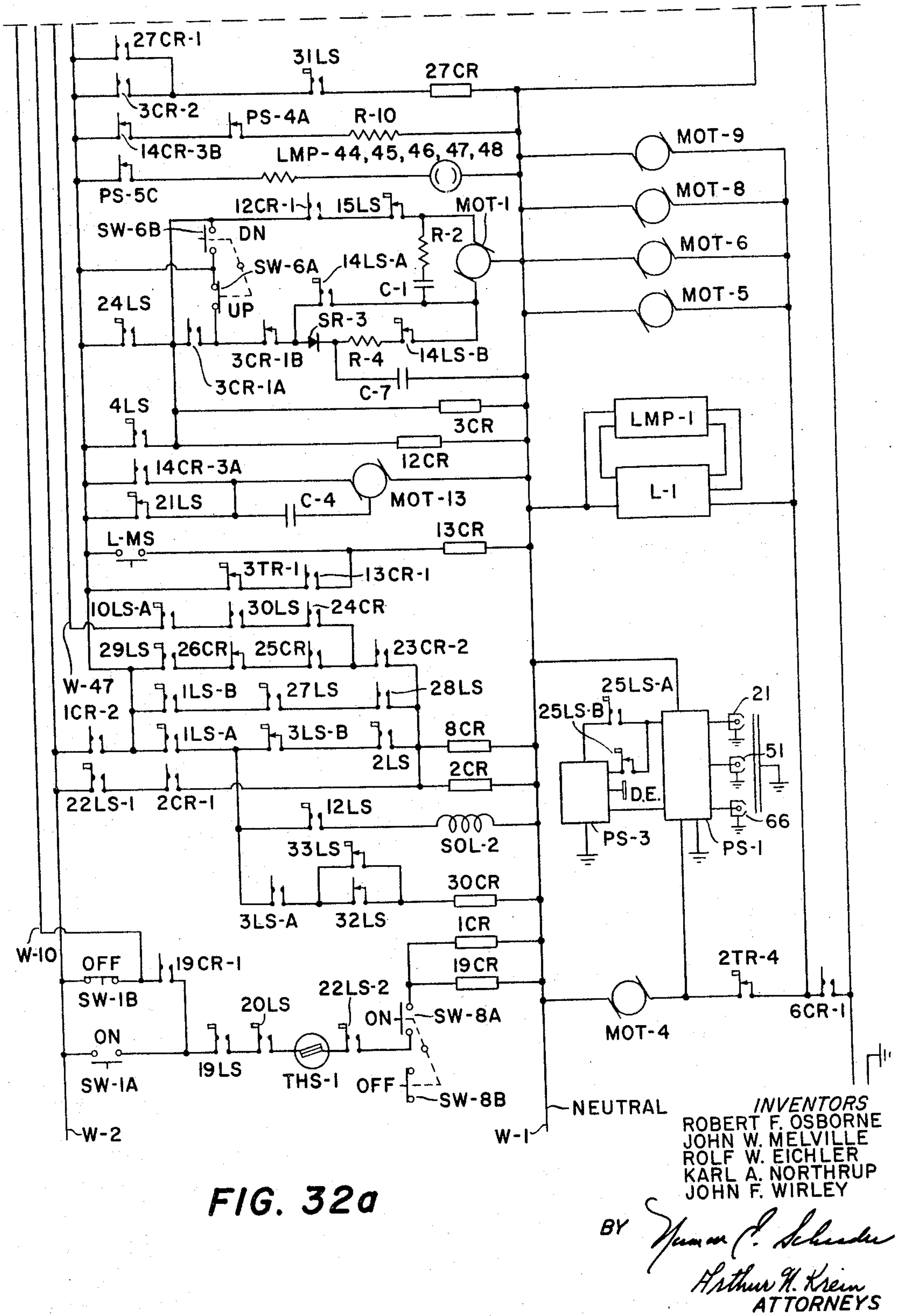
Figure 32B:
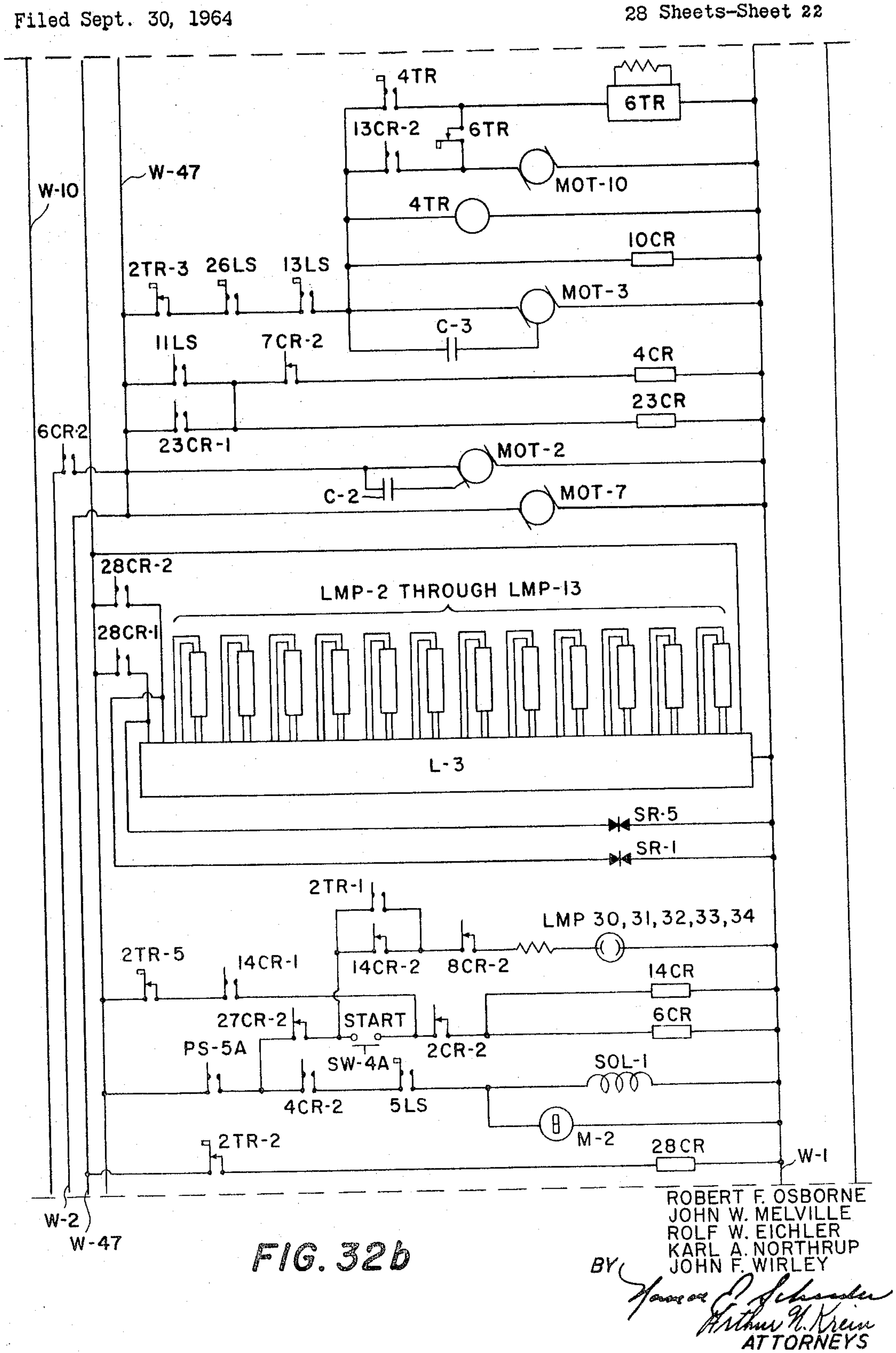
Figure 32C:
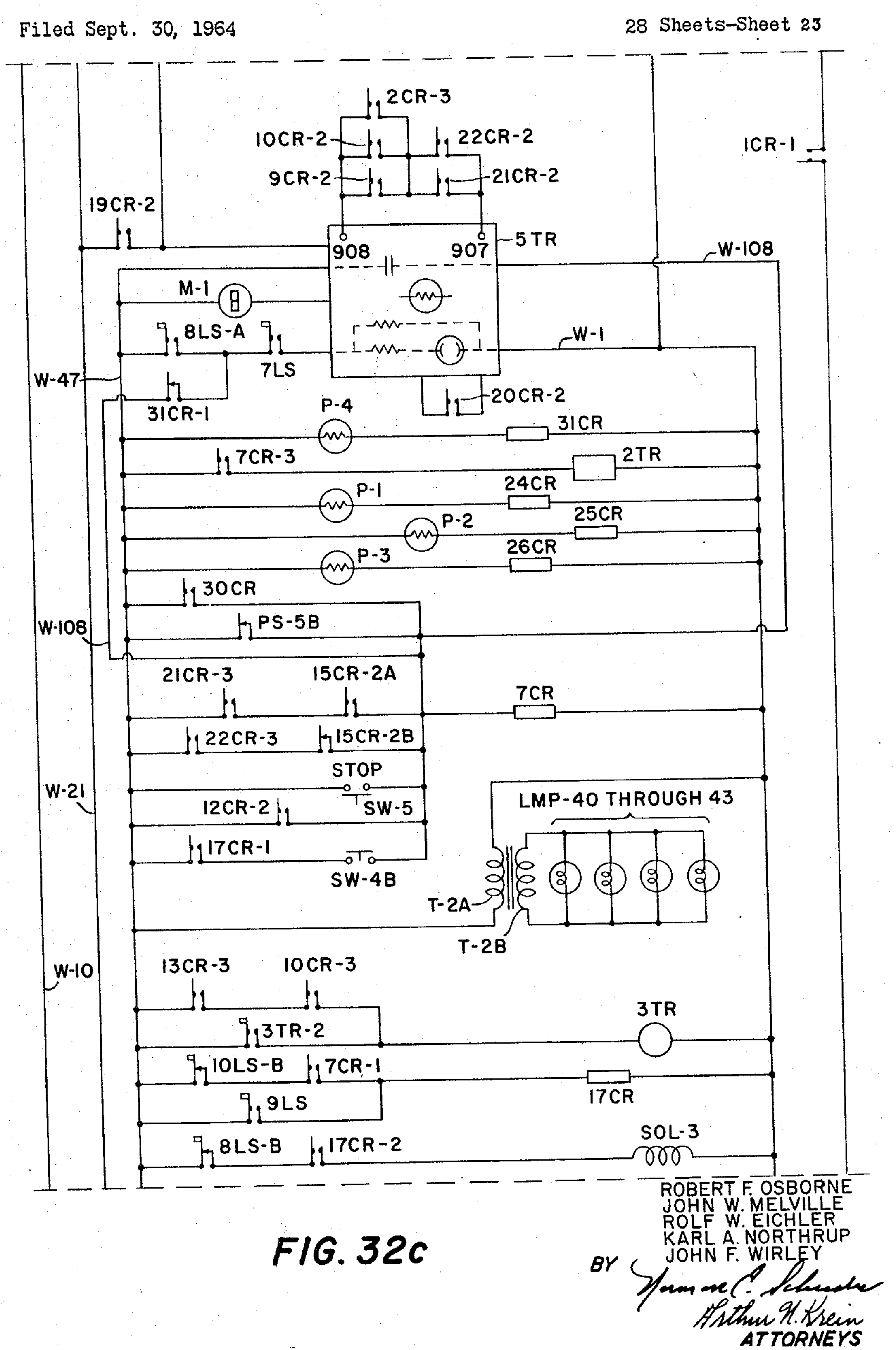
Figure 33A:
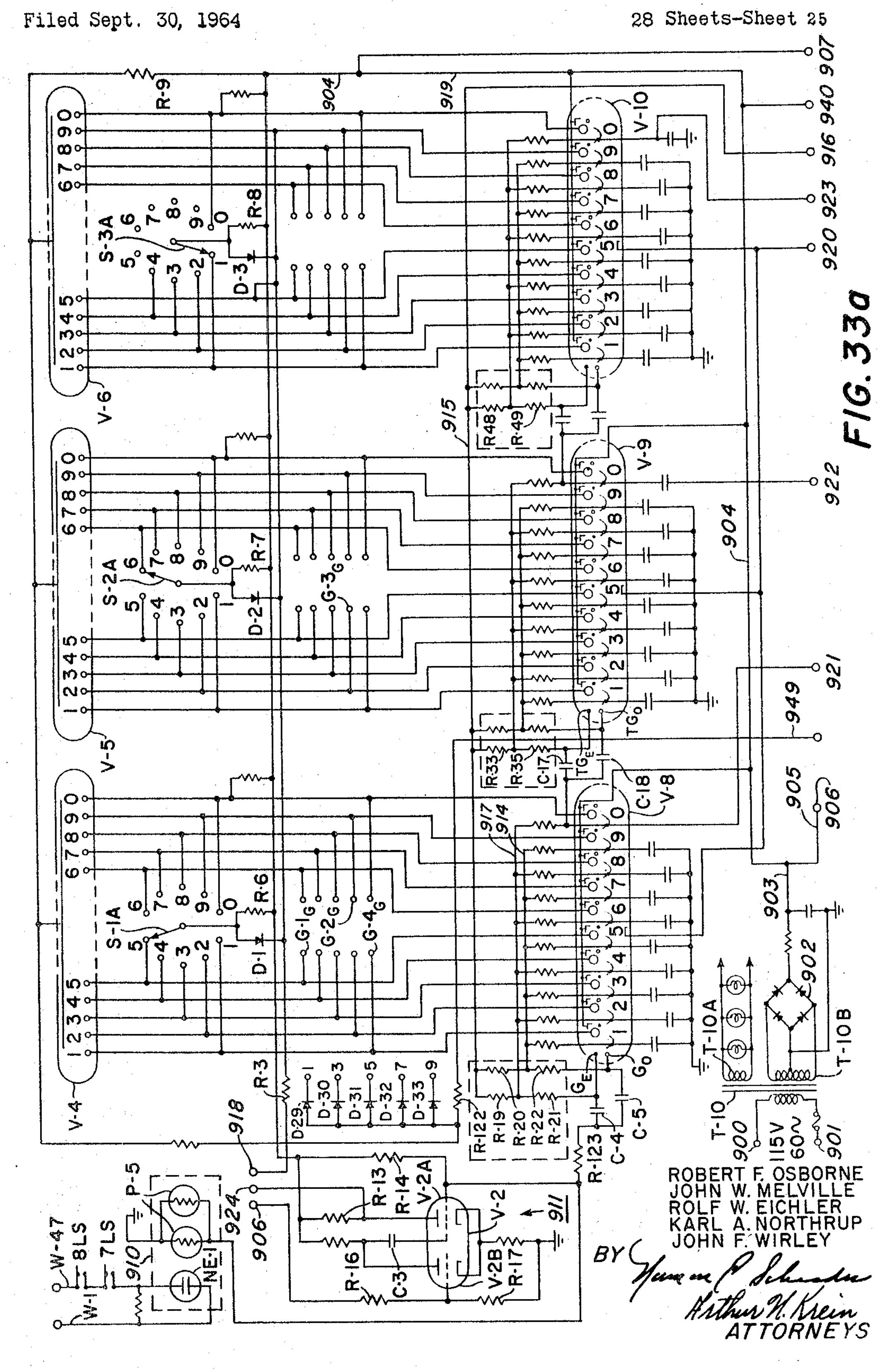
Figure 33B:
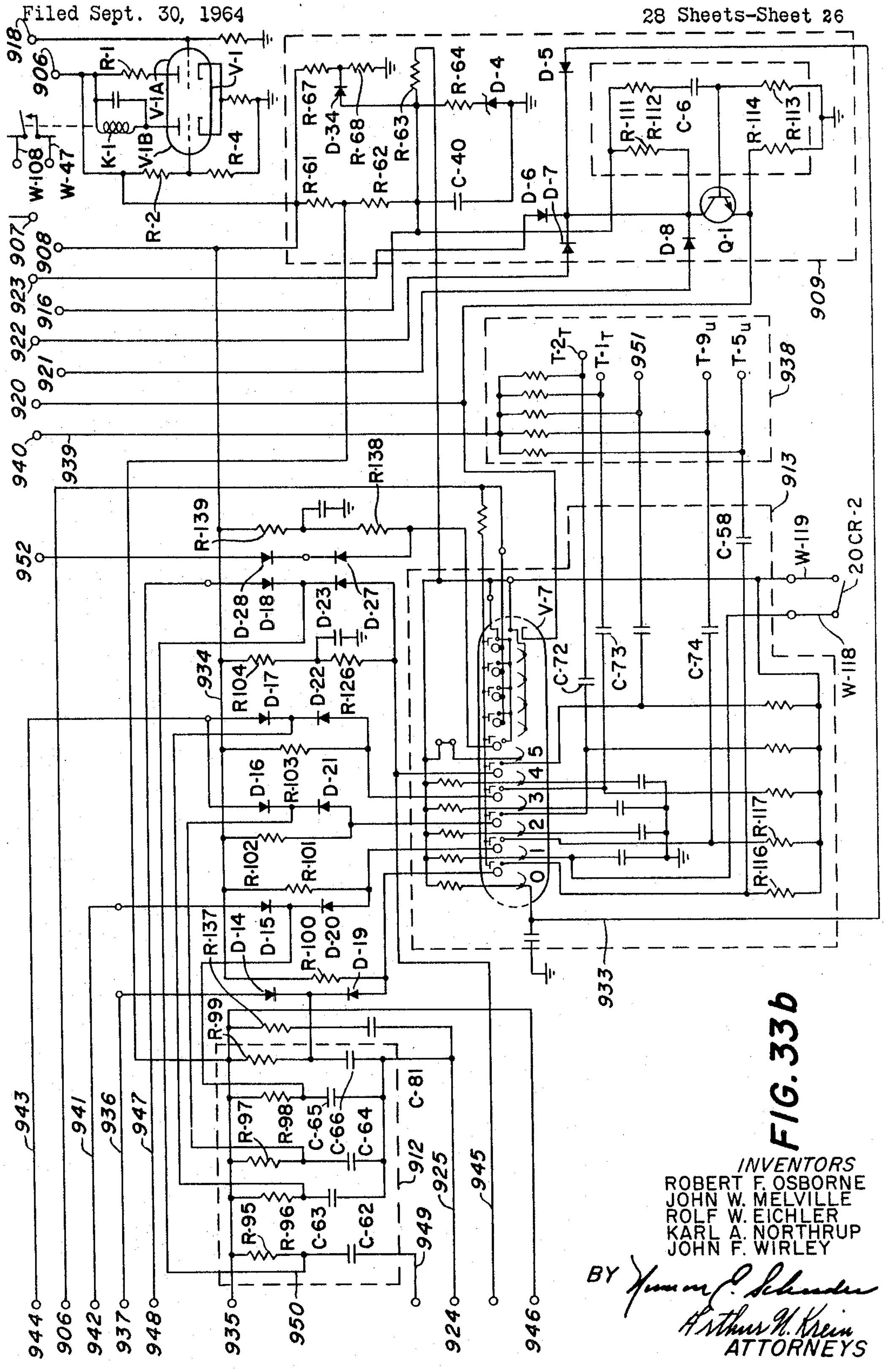
Figure 33C:
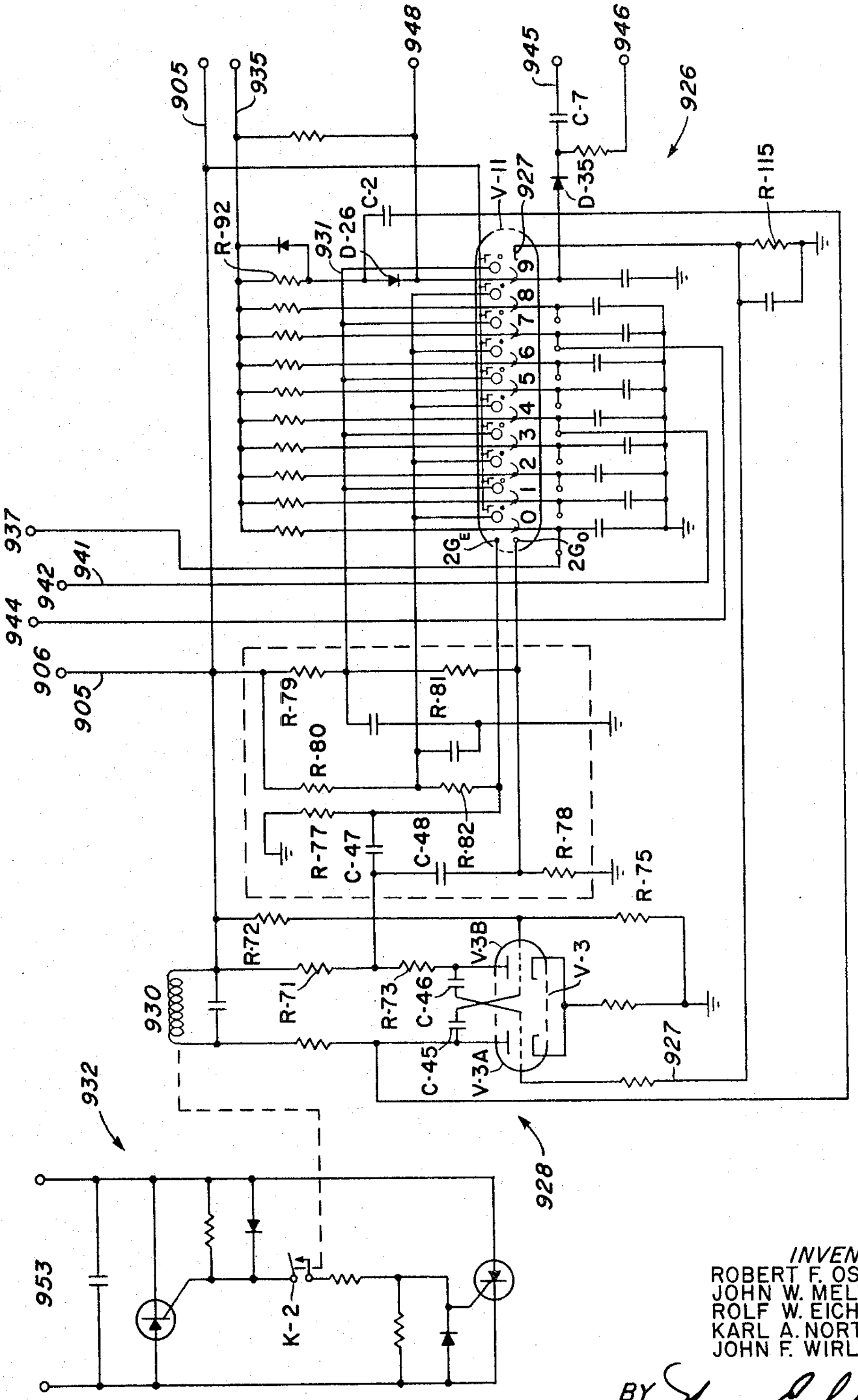
Figure 34:
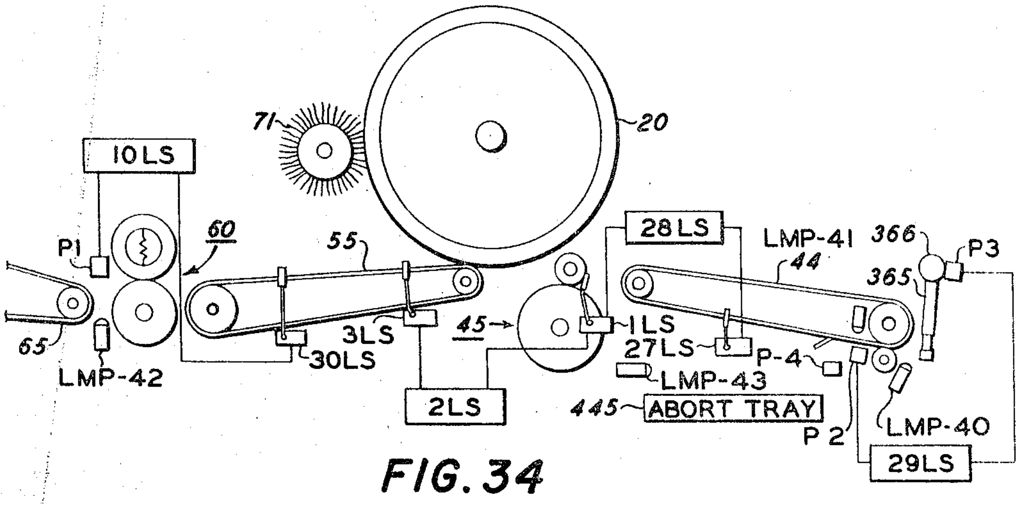
Figure 35:
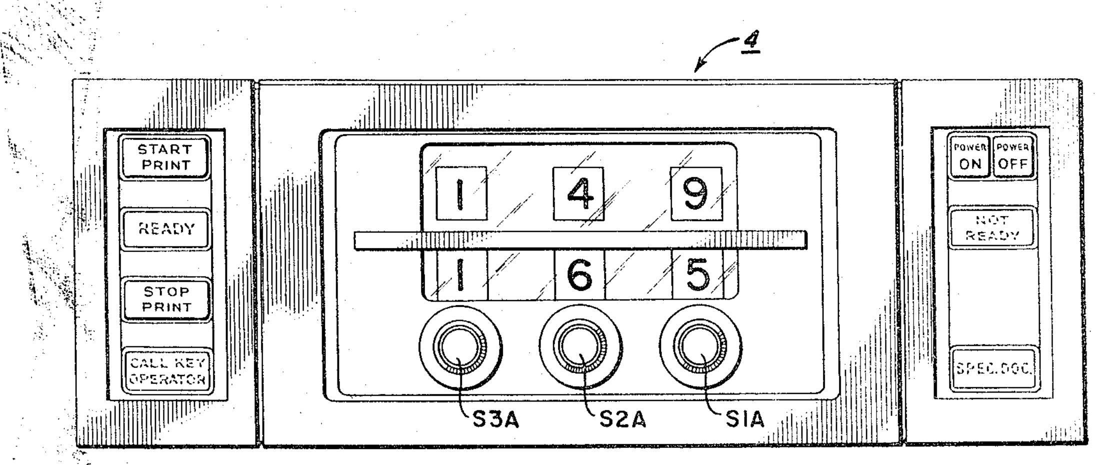

FIGS. 29*a*, 29*b*, 29*c*, 29*d* and 29*e* are time sequence views of the operation of the sheet registration device;

FIG. 30 is a top view of a switch actuator mechanism;

FIG. 31 is a sectional view taken along line 31—31 of FIG. 30;

FIGS. 32*a*, 32*b*, 32*c* and 32*d* are schematic electrical wiring diagrams of the electrical components of the xerographic apparatus;

FIGS. 33*a*, 33*b* and 33*c* are detailed schematic electrical wiring diagrams of the reset programmer and stepped rate counter of FIG. 32*c*;

FIG. 34 is a schematic diagram of the paper jam detecting system of the machine;

FIG. 35 is a front view of the control panel of the xerographic apparatus; and

Figure 36:
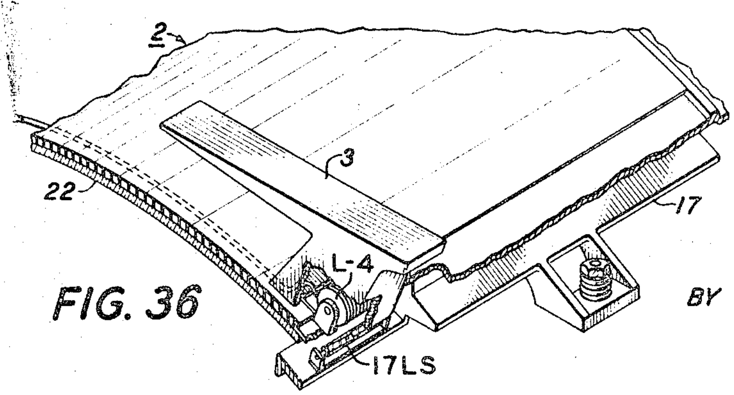

FIG. 36 is a perspective view of the platen cover and platen frame with parts broken away to show the platen interlock.

GENERAL

Figure 2:
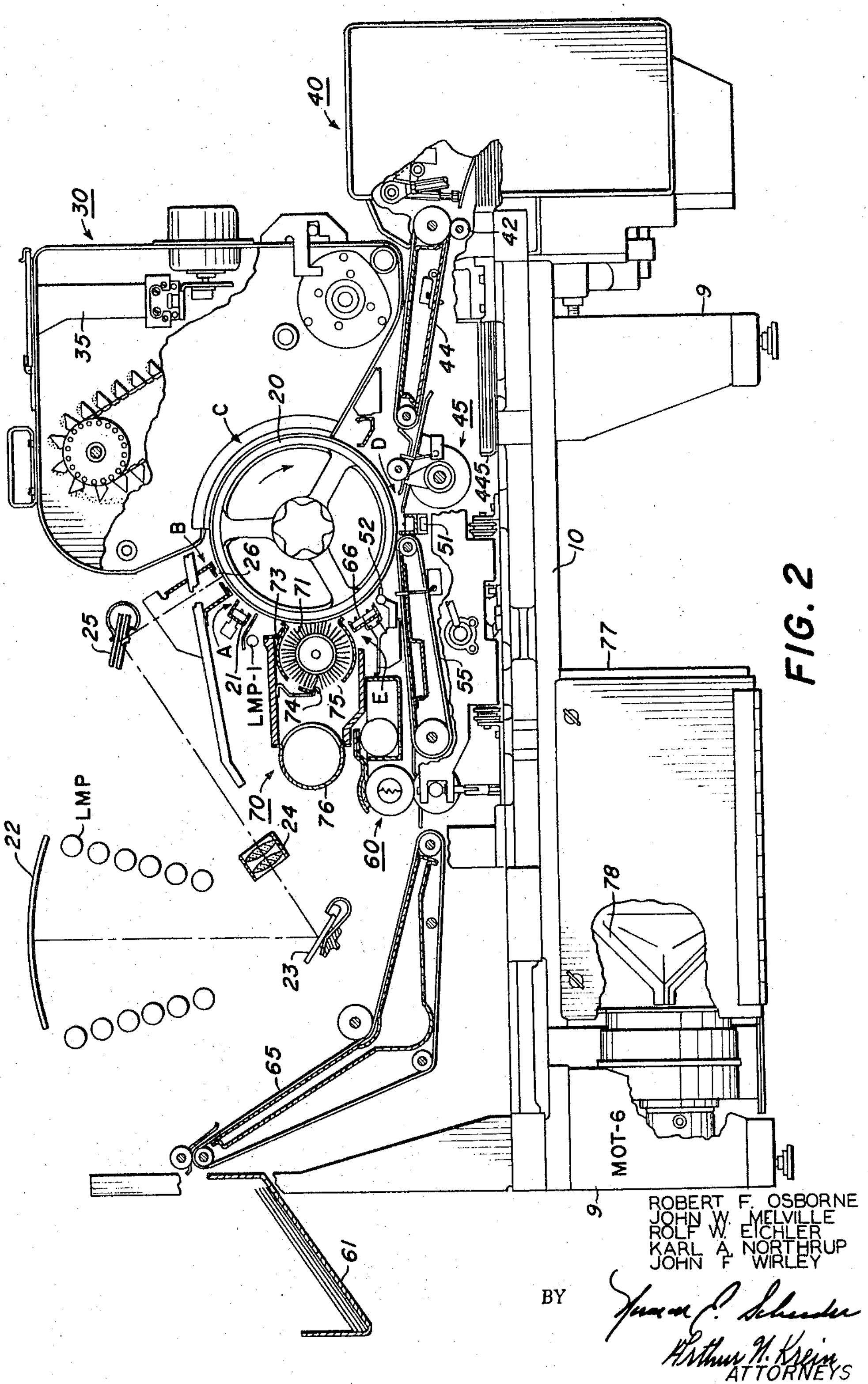
FIG. 2 illustrates schematically a preferred embodiment of a xerographic apparatus constructed in accordance with the invention.

As shown schematically in FIG. 2 the automatic xerographic reproducing apparatus comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, at which the xerographic powder image is electrostatically transferred from the drum surface to a transfer material or support surface; and, A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located, as indicated by reference character A. As shown, the charging arrangement includes a corona charging device 21 which includes a corona discharge array of one or more corona discharge electrodes that extend transversely across the drum surface and are energized from a high potential source and are substantially closed within a shielding member.

Next subsequent thereto in the path of motion of the xerographic drum is an exposure station B. An optical scanning or projection system is provided to project a flowing image onto the surface of the photoconductive drum from a stationary original.

The optical scanning or projection assembly comprises a stationary copyboard which consists of a transparent curved platen member 22 such as, for example, a glass plate or the like, positioned on the exterior of the cabinet, which is adapted to support a document to be reproduced, the document being uniformly illuminated and arranged in light projecting relation to the moving light-receiving surface of the xerographic drum. Uniform lighting is provided by banks of lamps LMPS arranged on opposite sides of the copyboard. Scanning of the document on the stationary copyboard is accomplished by means of a mirror assembly which is oscillated relative to the copyboard in timed relation to the movement of the xerographic drum.

The mirror assembly, which includes an object mirror 23, is mounted below the copyholder to reflect an image of the document through a lens 24 onto an image mirror 25 which, in turn, reflects the image onto the xerographic drum through a slot in a fixed light shield 26 positioned adjacent to the xerographic drum surface.

Adjacent to the exposure station is a developing station C in which there is positioned a developer apparatus 30 including a casing or housing having a lower or sump portion for accumulating developer material. A bucket type conveyor is used to carry the developing material to the upper part of the developer housing where it is cascaded over a hopper chute onto the xerographic drum to effect development. A toner dispenser 35 is used to accurately meter toner to the developing material as toner particles are consumed during the developing operation.

Positioned next and adjacent to the developing station is the image transfer station D which includes a sheet feeding arrangement adapted to feed sheets of support material, such as paper or the like, successively to the xerographic drum in coordination with the presentation of the developed image on the drum surface at the transfer station.

The sheet feeding mechanism includes a sheet feed device 40 adapted by means of vacuum feeders to feed the top sheet of a stack of sheets on a tray 41, to rollers 42 cooperating with the belts of paper transport 44 for advancing the sheet sufficiently to be held by paper transport 44 which in turn, conveys the sheet to a sheet registration device 45 positioned adjacent to the xerographic drum. The sheet registration device arrests and aligns each individual sheet of material and then in timed relation to the movement of the xerographic drum, advances the sheet material into contact with the xerographic drum in registration with a previously formed xerographic powder image on the drum.

The transfer of the xerographic powder image from the drum surface to the sheets of support material is effected by means of a corona transfer device 51 that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus to paper pick-off mechanism 52 for removing the sheets of support material from the drum surface. This device, which is of the type disclosed in Rutkus et al., United States Patent 3,062,536, includes a plurality of small diameter orifices supplied with pressurized aeriform fluid by a suitable pulsator or other device. The pulsator is adapted to force jets of pressurized aeriform fluid through the outlet orifices into contact with the surface of the xerographic drum slightly in advance of the sheet of support material to strip the leading edge of the sheet from the drum surface and to direct it onto an endless conveyor 55 whereby the sheet material is carried to a fixing device 60. At the fixing device, the transferred xerographic powder image on the sheet of support material is permanently fixed or fused thereto as by heat. After fusing, the reproduction is discharged from the apparatus at a suitable point for collection externally of the apparatus by means of the conveyor 65. In the embodiment shown, the reproductions are discharged from conveyor 65 into a receiving tray 61.

The next and final station in the device is a drum cleaning station E, having positioned therein a corona preclean device 66, a drum cleaning device 70 adapted to remove any powder remaining on the xerographic drum after transfer by means of a rotating brush 71, and a discharge lamp LMP-1 adapted to flood the xerographic drum with light to cause dissipation of any residual electrical charge remaining on the xerographic drum.

To remove residual powder from the xerographic drum, there is disposed a cylindrical brush 71 rotatably mounted on an axle and driven by a motor, not shown. For collecting powder particles removed from the xerographic drum by the brush, there is provided a dust hood 73 that is formed to encompass approximately two-thirds of the brush area. To ensure thorough cleaning of the brush, a flicking bar 74 is secured to the interior of the dust hood adjacent the edge of the outlet duct 75 of the dust hood and in interfering relation with the ends of the brush bristles whereby dust particles may be dislodged therefrom.

For removing dust particles from the brush and dust hood, an exhaust duct 76 is arranged to cover the outlet of the dust hood, the exhaust duct being connected at its other end to the wall of a filter box 77 attached to the dust hood. A filter bag 78 is secured within the filter box, with the mouth of the filter bag in communication with the exhaust duct. Motor fan unit MOT–5 and MOT–6, connected to the filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor unit.

Suitable drive means are provided to drive the drum rotating mirror and sheet feed mechanism at predetermined speeds relative to each other, and to effect operation of the bucket-type conveyor and toner dispenser mechanism and the other operating mechanisms.

Figure 1:
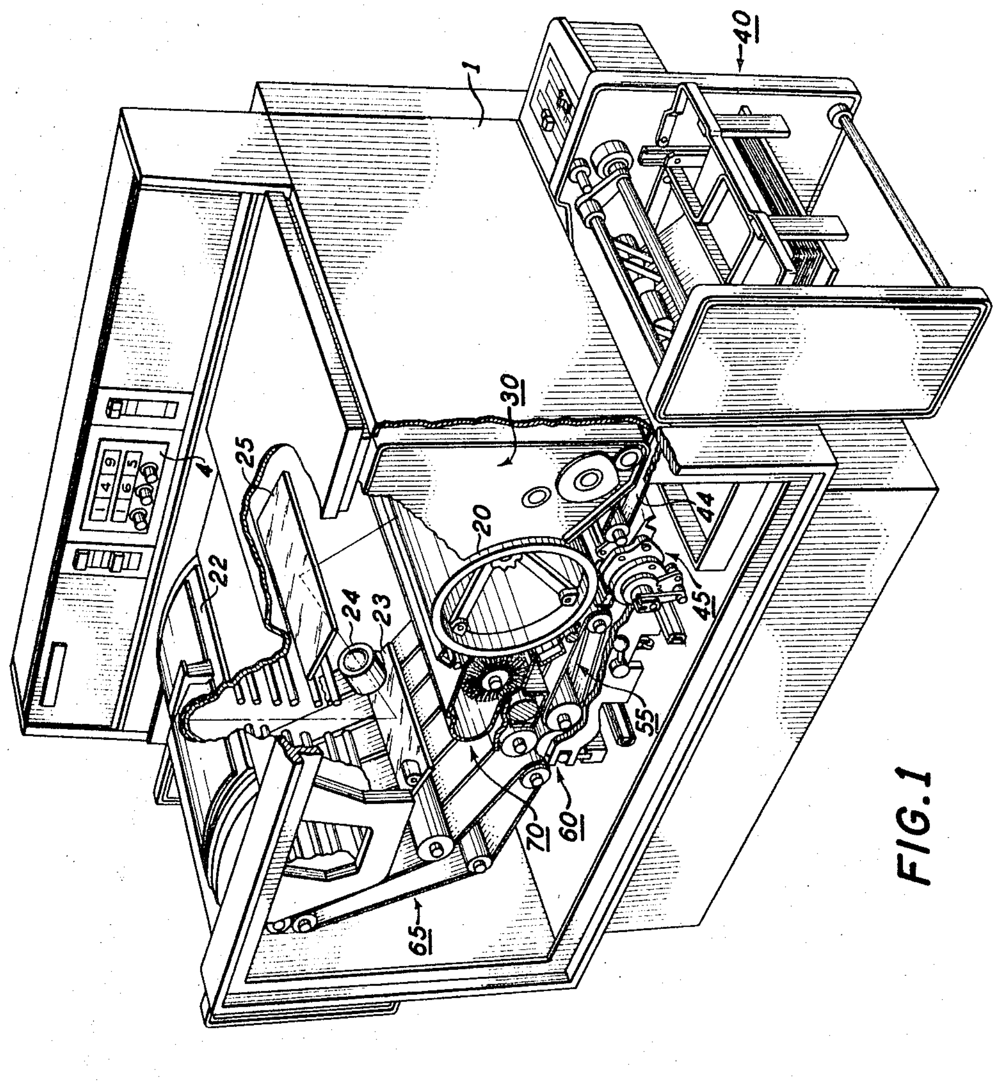
FIG. 1 is a right-hand perspjective view of the xerographic apparatus with parts of the cabinet broken away to show the arrangement of machine components.

This xerographic apparatus is adapted for installation in a suitable cabinet as shown in FIG. 1. The cabinet, generally designated 1, constructed in a conventional manner has mounted on the top thereof a main control panel 4 for initiating operation of the machine and for selecting and indicating the number of reproductions to be made.

Referring now to the drawings, there is provided a frame for supporting the components of the apparatus formed by a base plate 10 supported on legs 9. Vertical outboard and inboard frame plates 11 and 12, respectively, are secured to base plate 10 in spaced relation to each other.

The xerographic drum 20 is mounted on a horizontal driven shaft and the drum is positioned between frames 11 and 12, with the major xerographic components of the machine mounted around the drum.

EXPOSURE MECHANISM

The exposure mechanism is used to scan the object to be reproduced and to project a flowing image thereof onto the rotating xerographic drum. In the embodiment of the invention shown, the scanning of the object, such as a document or book, placed on a copy platen is accomplished by means of an oscillating object mirror which reflects an image from the object through a lens onto an image mirror which, in turn, reflects the image through a slotted light shield onto the xerographic drum.

The exposure mechanism includes an optical frame 13 for supporting the object mirror, lens and image mirror. The optical frame 13 is supported at one end by support bar 14, secured to and extending between frames 11 and 12, and at its opposite end by pin support 15 secured to frame 12. Attached to the optical frame, adjacent to the object mirror, is a lamp holder frame assembly 16 which, in turn, supports a platen support frame assembly 17.

The platen 22, made of transparent material, such as glass, is suitably attached to the platen support frame assembly directly over the axis of rotation of the object mirror 23. Platen 22 is curved in the shape of an arc, with the radius thereof equal to the distance from the platen surface to the axis of rotation of the object mirror 23. A platen cover 2 is pivotally secured in position to cover the platen 22 and to force a document into intimate contact with the platen. The platen cover is provided with a handle 3 at one end thereof to permit an operator to lift the platen cover from the platen to insert a document therebetween, or in the event that the document to be reproduced is a book, to remove the platen cover to permit free access to the platen.

A document or other object to be reproduced placed on the curved platen 22 is uniformly illuminated by banks of lights, identified as fluorescent lamps LMP–2, LMP–3, LMP–4, LMP–5, LMP–6, LMP–7, LMP–8, LMP–9, LMP–10, LMP–11, LMP–12 and LMP–13 in the electrical circuit diagram, mounted in conventional fluorescent lamp holders secured to the lamp holder frame assembly 16.

Object mirror 23 is supported by a suitable mirror support assembly fixed to mirror shaft 101 journaled by suitable bearings mounted in optical frame 13. A detailed description of the mirror support assembly is not deemed pertinent to a complete understanding of the invention, it being noted that this assembly positions the mirror in a flattened portion of the shaft so that the reflecting surface of the mirror is in a plane extending through the axis of shaft 101.

The shaft 101, and therefore the object mirror 23, are oscillated by means of a mirror actuating wheel 102 secured to the inboard end of the shaft for movement therewith. Motion in one direction of the mirror actuating wheel is effected by means of a tape 103 secured at one end to the mirror actuating wheel 102 and at its other end to a second wheel 104 driven in synchronization with the rotation of the xerographic drum, as described in detail hereinafter. Motion of mirror actuating wheel 102 in the opposite direction, or the return motion of this wheel, is effected by means of spring 105 connected at one end to pin 106 fixed to the wheel and at its other end to pin 107 secured in optical frame 13.

Both the lens 24 and the image mirror 25 are secured, in a suitable manner, in fixed position on the optical frame 13 in the optical path from object mirror 23.

The light shield 26 is simply an open, elongated box having side walls, end walls and a bottom wall provided with a narrow slot 27 extending across the length of the light shield. Light shield 26 is secured to the optical frame and is positioned with its bottom wall in close proximity to the peripheral surface of the drum and with the center line of the slot parallel to the axis of rotation of the drum.

The xerographic drum 20 is mounted on horizontal driven shaft 111 that rotates in bearings 112 and 113 positioned in drum drive casing 114 secured to the outer face of inboard frame 12 with a portion of the drum drive casing extending through a suitable opening in frame 12 toward frame 11. The free end or outboard end of shaft 111 is threaded to receive thumb nut 115 to secure the inboard hub of the xerographic drum into driven engagement with the pin 108 of drive collar 109 secured to the shaft for rotation therewith.

The shaft 111 is held in axial alignment at one end by bearing 112 butting against a shoulder of shaft 111 and by washer 116 forced against the opposite side of this bearing by bearing retaining cap 117 which also supports seal 118 encircling the shaft. At its opposite end, the shaft is held by bearing 113, the inner race of this bearing contacting retaining ring 121 positioned in a suitable groove formed in the shaft, while the outer race of this bearing contacts a retaining ring 122 secured to an inner wall of the drum drive casing.

A cam 123 is fixed to the inboard end of shaft 111 for a purpose to be described. Encircling the hub of this cam and secured to the cam, as by screws 124 is a driven gear 125 which is positioned to be engaged by a gear 126 fixed to the inboard end of shaft 127 which is journaled by bearings 128 also mounted in the drum drive casing. One end, or outboard end of shaft 127 extends from the casing through a seal 131 and bearing retaining cap 132 and has fixed thereto a drive sprocket 133 for a purpose to be described. The shaft 127 and therefore shaft 111 are operatively connected to the main drive motor MOT–2 of the apparatus by worm gear 135 fixed to the shaft of the motor, which engages gear 134 fixed intermediate the ends of shaft 127. The gear 134 is fixed to the shaft 127 by a key, an alignment of this gear is maintained by forcing it against a shoulder on the shaft by bushing 136, inner race of a bearing 128, gear 126, washer 137, and screw 138 threaded into the end of the shaft.

To effect a scanning cycle of the object mirror 23, there is fixed to drum shaft 111 the cam 123 which, in the embodiment shown, has three cam lobes, that is, three rise portions and three fall portions. The mirror actuating wheel 102, as previously described, has one end of tape 103 secured thereto, the opposite end of the tape 103 being secured to a second wheel 104 fixed to one end of shaft 141.

The opposite end of shaft 141 is provided with a cam arm 142, fixed thereon, which carries a cam follower 143 adapted to engage cam 123. Shaft 141 is journaled by bearings 144 mounted in the drum drive housing in spaced apart relation by shoulders on the shaft. The outboard bearing 144 is secured by washer 145 and bearing retaining cap 146.

With this arrangement, the object mirror is oscillated three times to scan an image during each revolution of the drum and in synchronization with the rotation therewith, since it is driven during the scanning cycle directly from the drum shaft as the cam follower 143 follows the rise portion on cam 123 secured to the drum shaft. Return motor of the mirror to its start-of-scan position is effected by the biasing action of springs 105 and this return motion is effected rapidly because of the shape of the fall portion of cam 123, it being apparent that the springs 105 will always bias cam follower 143 into cooperative engagement with cam 123.

The two wheels 102 and 104 have equal radii and this makes the angular velocity of the cam arm 142 equal to the angular velocity of the rotating object mirror 23. The cam 123 and the drum 20 are mounted on the same shaft making their angular velocity equal. Since the angular velocity of the cam 123 and the drum are equal, any deviation from constant angular velocity of the drum shaft will not be a factor in the synchronization of the optical system, because any deviation of the angular velocity of the drum would be synchronized with a proportionate deviation in the angular velocity of the scanning mirror, that is, object mirror 23, through the drum shaft, cam, wheels and the interconnecting tape.

The rear opening in the drum drive casing 114 is closed by a casing cover 151 secured to the drum drive casing by cover 152 secured to casing cover 151.

SHEET FEED MECHANISM

The sheet feeding mechanism 40 used to separate the top sheets one at a time from the top of a stack or pile of sheets and to feed the sheets to the paper transport 44 may be formed as an integral unit of the reproducing apparatus, or as shown, may be formed as a separate unit connected to the frame of the reproducing apparatus.

Referring to FIGURES 11–20 there is shown a front frame plate 301 and a rear frame plate 302 connected together and maintained in spaced relation to each other by cross member 303 and tie rods 304. A stack or pile of sheets, indicated as 305, is supported on the movable tray or table 41 between the frame plates 301 and 302. The tray 41 has depending sides 306 extending downward to which are secured a pair of extension arms 307 carrying a pair of rollers 308. The rollers 308 are adapted to ride in guide channels 309 secured to frame plates 301 and 302. Thus, the tray 41 is movable in a vertical direction between the two frame plates 301, 302 and is guided in its vertical movement by the rollers 308 in the guide channels 309.

Figure 11:
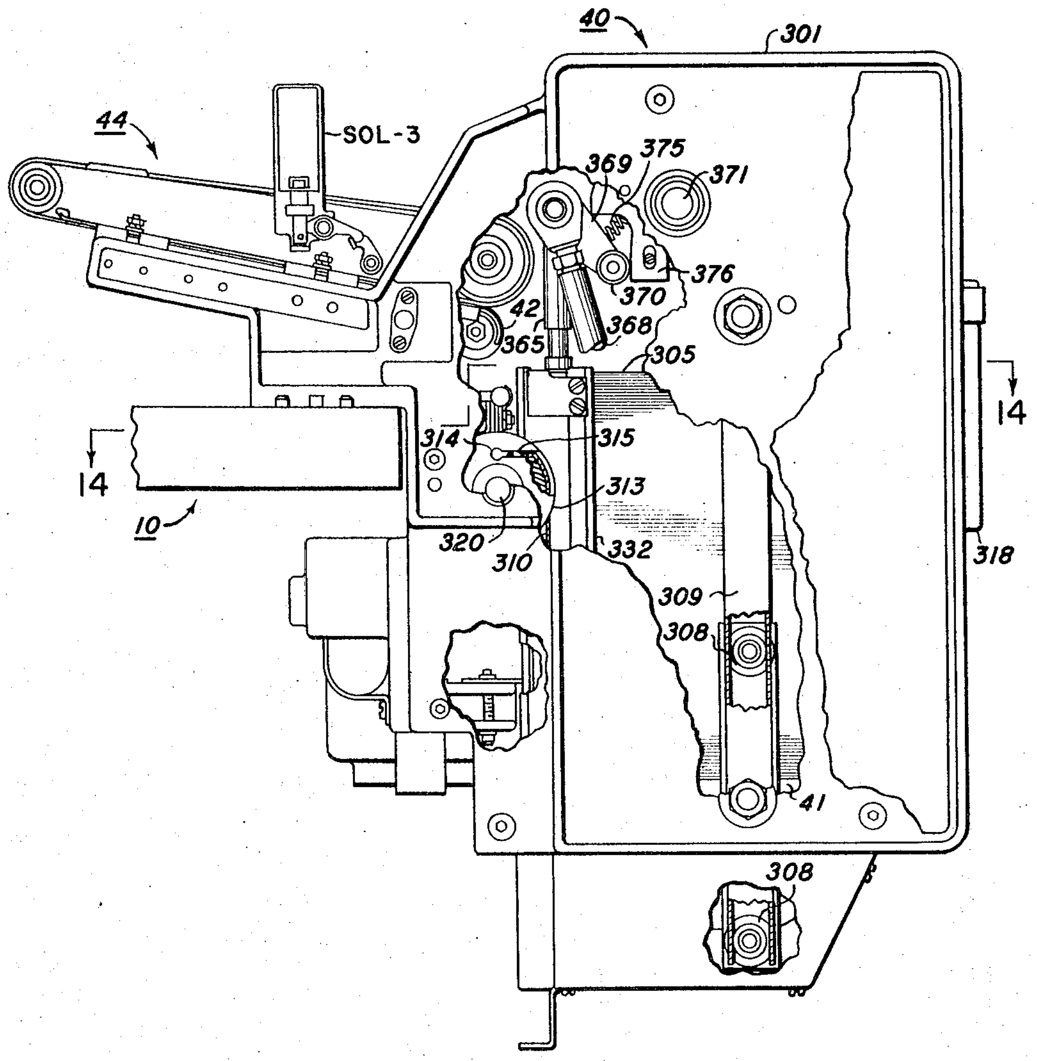
FIG. 11 is a front view of the sheet feed mechanism with portions broken away to show internal operation of the apparatus.
Figure 16:
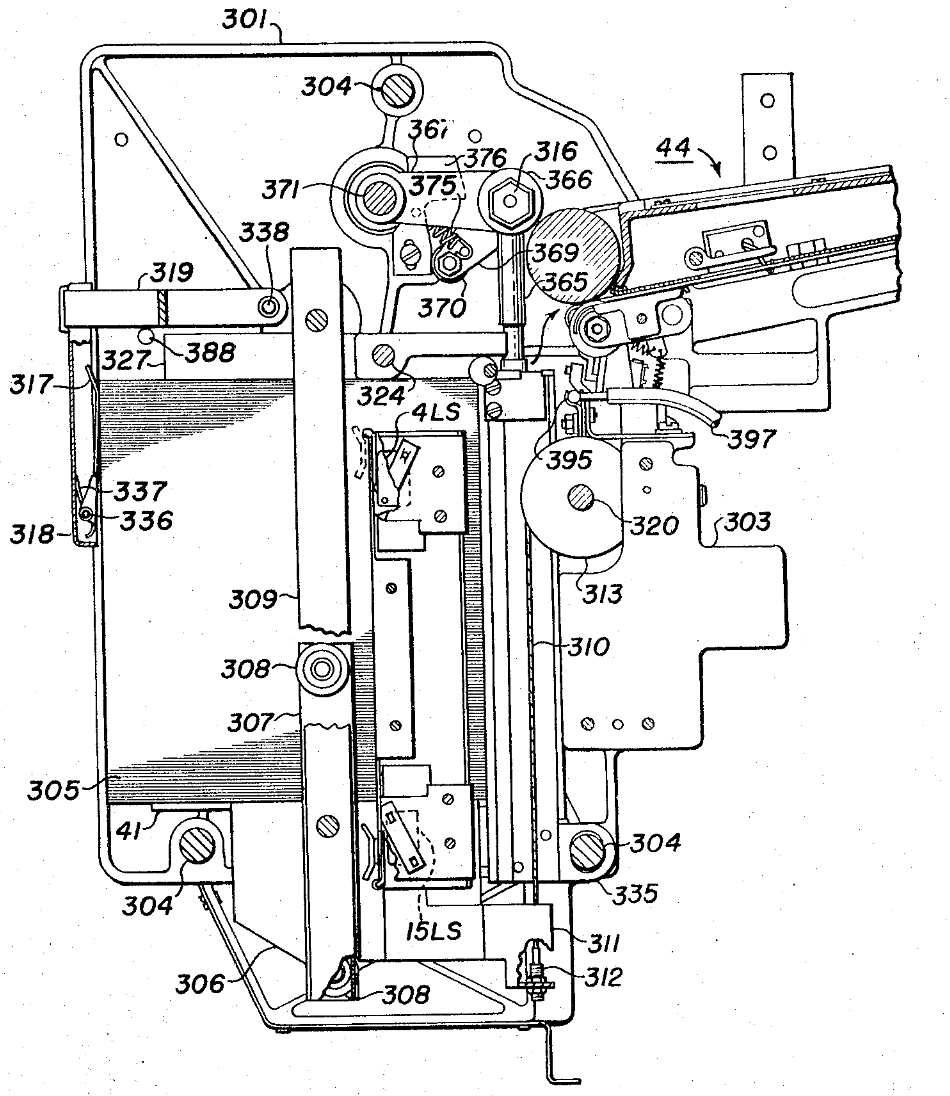
FIG. 16 is a sectional view of the sheet feed mechanism taken along lines 16—16 of FIG. 12.

The tray 41 is supported from a pair of cables 310 by means of brackets 311 secured to the tray sides 306. Each of the cables 310 has one end secured to the brackets 311 by means of connectors 312, as seen in FIG. 16 and the other end secured to a pulley 313 by means of a bead 314 in a hole and slot 315 in the pulley 313, as shown in FIG. 11.

The pulleys 313 are fixed to a shaft 320 on opposite sides of the tray between plates 301 and 302. Shaft 320, journaled in suitable bearings mounted in the plates 301 and 302, is driven to raise or lower the tray by means of a gear 321 mounted on a portion of the shaft 320 which extends through the frame plate 302. Driving power is supplied to the gear 321 to rotate shaft 320 to raise and lower the paper tray 41 by worm gear 322 on the drive shaft of an index motor MOT–1.

The index motor MOT–1 is connected to a source of electrical power and its operation controlled by index limit switch 14LS, down limit switch 15LS and index switch SW6, shown schematically in the wiring diagrams and described hereinafter. Down limit switch 15LS is secured to plate 302 in position to be actuated by the paper tray as it reaches its lower or bottom position.

The index limit switch 14LS and a tray up interlock switch 31LS are mounted in side-by-side relation on the outside of side frame 302, to be actuated by a switch actuating lever 323, pivoted at pin 324. An adjustable stop 325, mounted on the same bracket 326 as the switches 14LS and 31LS limits the movement of the lever 323 so that switches 14LS and 31LS are not damaged when the paper suply is excessively low or the tray is at the bottom of its downward movement.

The lever 323 is secured to the pin 324, and the pin 324 extends through the side frame plate 302. The opposite end of the pin 324 has the paper level sensing bar 327 secured thereto. The pin 324 is rotatably mounted in the frame plate 302 by means of a bearing 328 so that movement of the sensing bar 327 rotates the pin 324 and the lever 323. The opposite end of the sensing bar 327 is pivotally secured on a stub shaft, not shown, mounted in the side frame 301. The sensing bar is biased downward towards the top of the stack of sheets by a tension spring 329, mounted between the lever 323 and the switch bracket 326.

The opposite end of the lever 323 contains a cam follower 330 which is urged by the spring 329 against a cam 331. Rotation of the cam 331 raises and lowers the sheet sensing bar 327 by means of the lever 323 and pin 324. The movement of the cam 331 is timed with the movement of the sheet feeding so that the sensing bar 327 is raised from the sheet stack at the time the top sheet is fed; thus, the sensing bar does not interfere with the individual sheet feeding.

During operation of the sheet feeding mechanism, the sheet sensor 327 drops downward a distance sufficient to actuate switch 14LS by arm 323 after a predetermined number of sheets have been fed. The switch 14LS effects operation of the drive system described above to raise the entire sheet stack to the proper feeding level and to raise sensing arm 327 and, thus, releasing switch 14LS. During continued operation of the sheet feeder, the sheet stack is periodically indexed or raised to the feeding level so that the top of the stack is continuously in a position to feed sheets to the transport system.

In this particular apparatus, the sheet paper is fed edgewise to the xerographic reproducing machine. Therefore, the stack of sheets is arranged on the tray 41 with its longer dimension being transverse to the direction of movement of the sheet material.

The stack is aligned on the tray by means of a pair of adjustable guides 332, located at the leading edge corners of the sheet stack. The top of each guide 332 has a snubber 333 extending over the stack to retain the upward movement of the stack. In order to accommodate various size sheets, the guides 332 are adjustable to various positions in the direction of the length of the sheet stack. For example, the guides 332 would be at one position when 8″ x 10″ sheets are being fed and at different positions when 8½″ x 11″ or 8½″ x 13″ sheets are being fed. The guides are slidably mounted on the shaft 320 by a pair of bearing blocks 334 and slidably guided by brackets 335 on a bottom tie rod 304. The guides 332 are urged outward by a compression spring 340, mounted between the bearing blocks 334 with the shaft 320 serving as an internal spring guide. The guides in the bearing blocks can be urged inward towards each other by means of a pair of levers 341 pivotally attached at one end to the bearing blocks 334. The other end of the outboard lever is pivotally connected to a connector bar 342 and the other end of the inboard lever is pivotally connected to crank arm 344. The connector bar 342 is secured to a pin 343 which is journaled in the cross frame member 303. Rotation of the pin 343 is effected by a crank arm 344 secured to the pin and pivotally connected to a connector lever 345. Movement of the connector lever 345 actuates the crank arm 344 which in turn rotates the pin 343 and the connector bar 342. Movement of the connector bar 342 pulls the levers 341 and the bearing blocks 334 either inward against the action of the compression spring 340 or outward with the action of the compression spring 340. The bearing blocks slide along the shaft 320 and carry the brackets 335 along the tie rod 304.

The connector lever 345 extends outward through the rear frame plate 302 terminating at a pivotal connection with a second crank arm 346. Movement of the lever 345 is limited by an adjustable stop 347 which abuts the rear frame plate 302.

Figure 12:
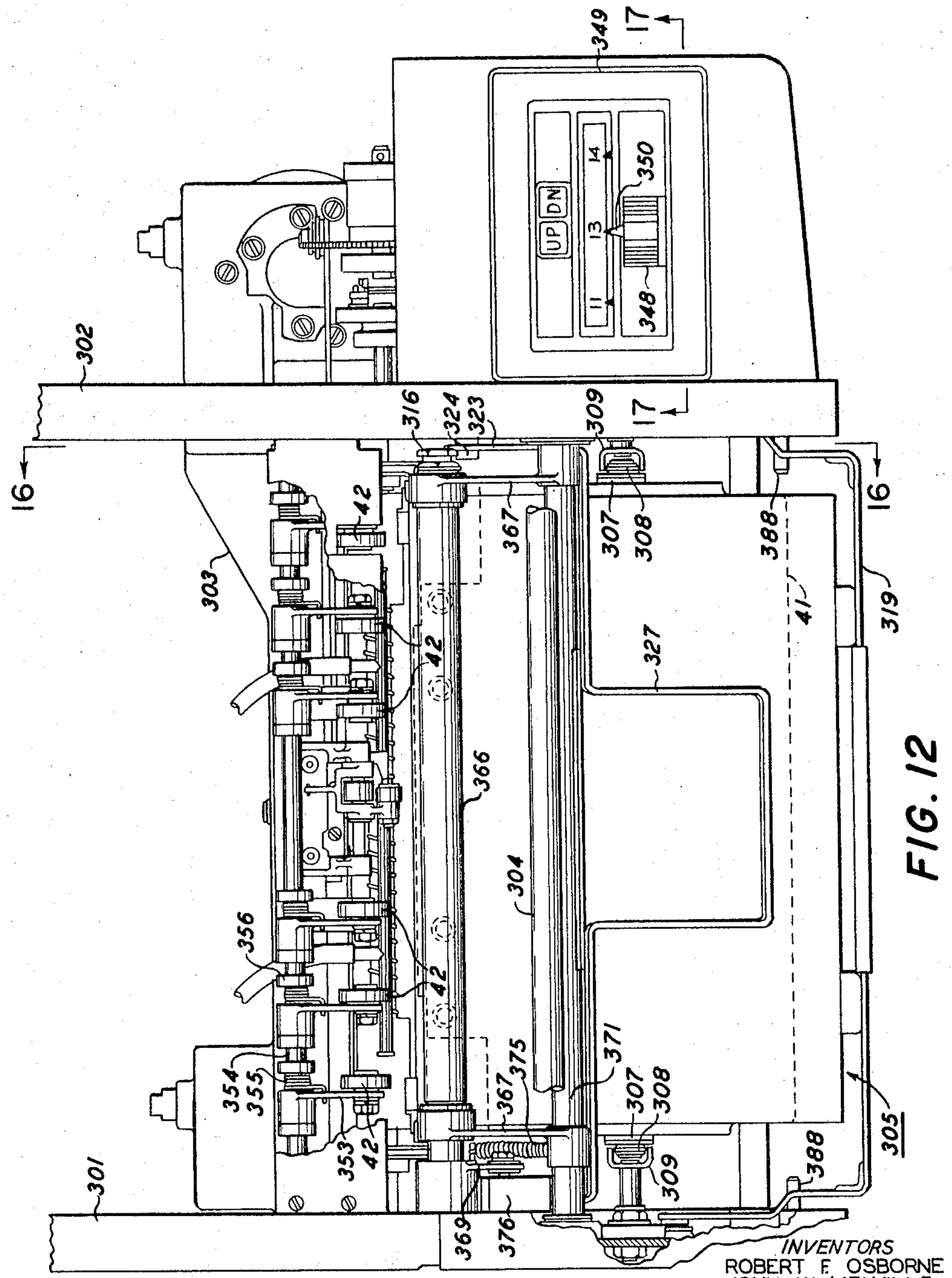
FIG. 12 is a top view of the sheet feed mechanism shown in FIG. 11.
Figure 13:
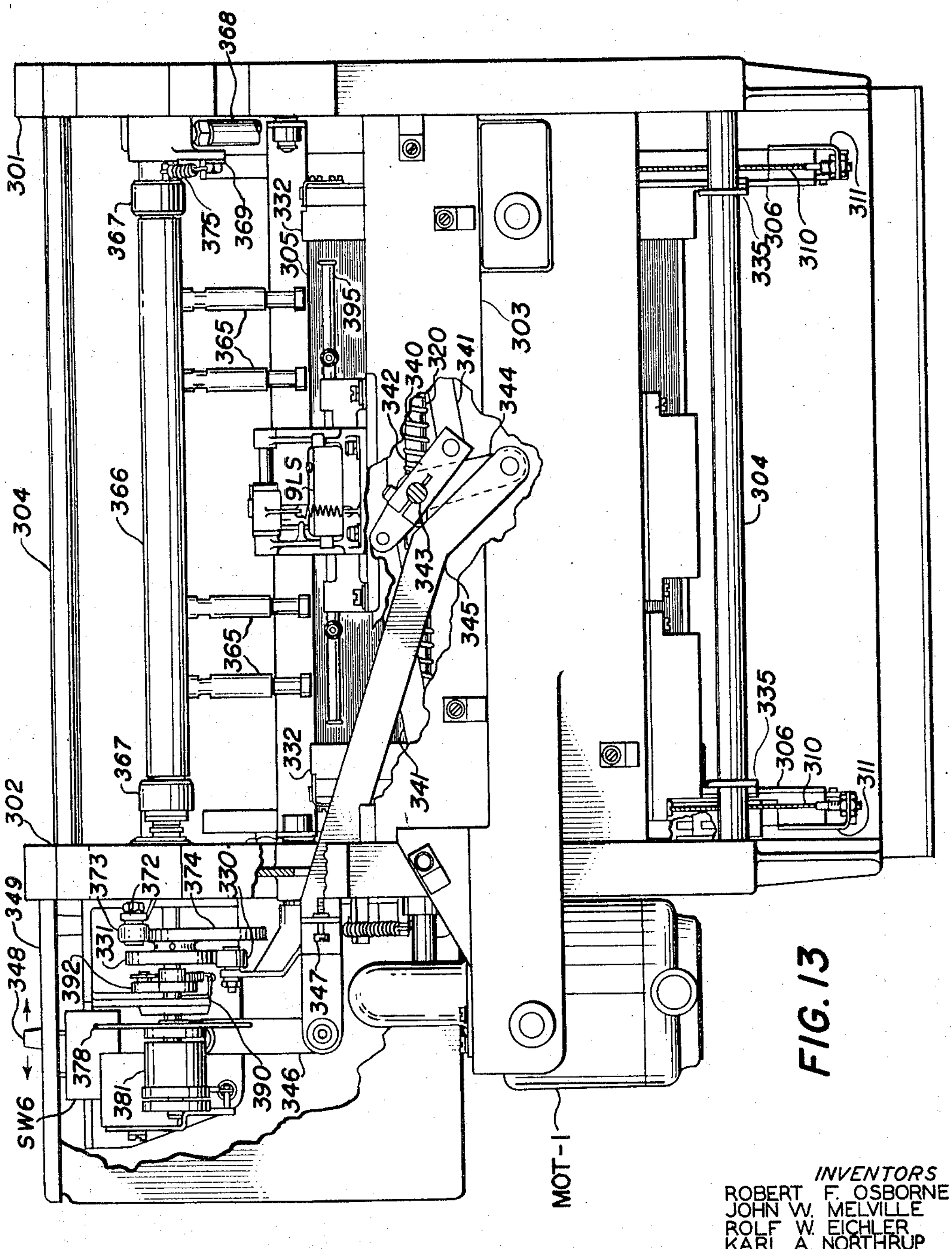
FIG. 13 is a left side view of the sheet feed mechanism shown in FIG. 11 with portions broken away to show internal portions of the apparatus.

Positioning of the paper stack guides 332 to accommodate the appropriate size paper being fed is accomplished by the operator by manually moving knob 348 located on the control panel 349. The knob 348 may be manually moved across the control panel, as seen in FIG. 12, until the pointer 350 indicates the appropriate size paper to be fed. The knob 348 is secured to a paper guide positioning arm 351 which is mounted on a shaft 352 and secured thereto to produce rotational movement of the shaft. The arm 351 is slidable along the shaft and is urged towards a limit plate 357 by means of compression spring 358. The crank arm 346 is also secured to the shaft 352 so that movement of the knob 348 and the positioning arm 351 produces rotational movement of crank arm 346. In turn, crank arm 346 produces lateral movement of lever 345 and positioning of the guides 332.

Figure 17:
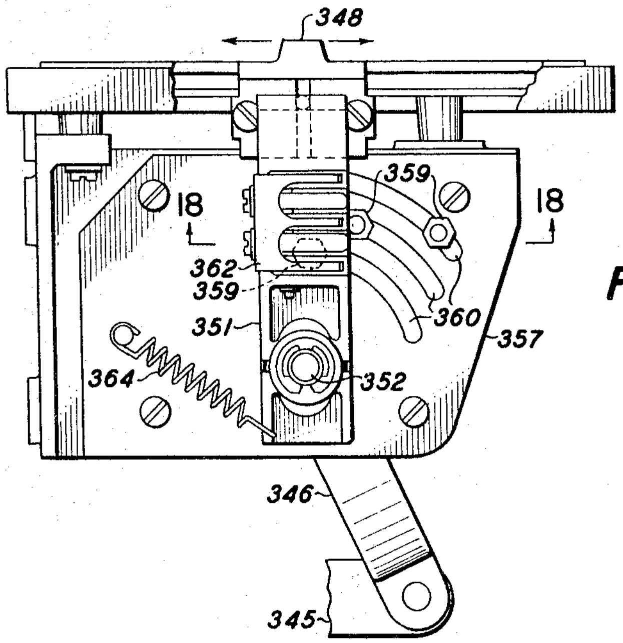
FIG. 17 is a view taken along lines 17—17 of FIG. 12.
Figure 21:
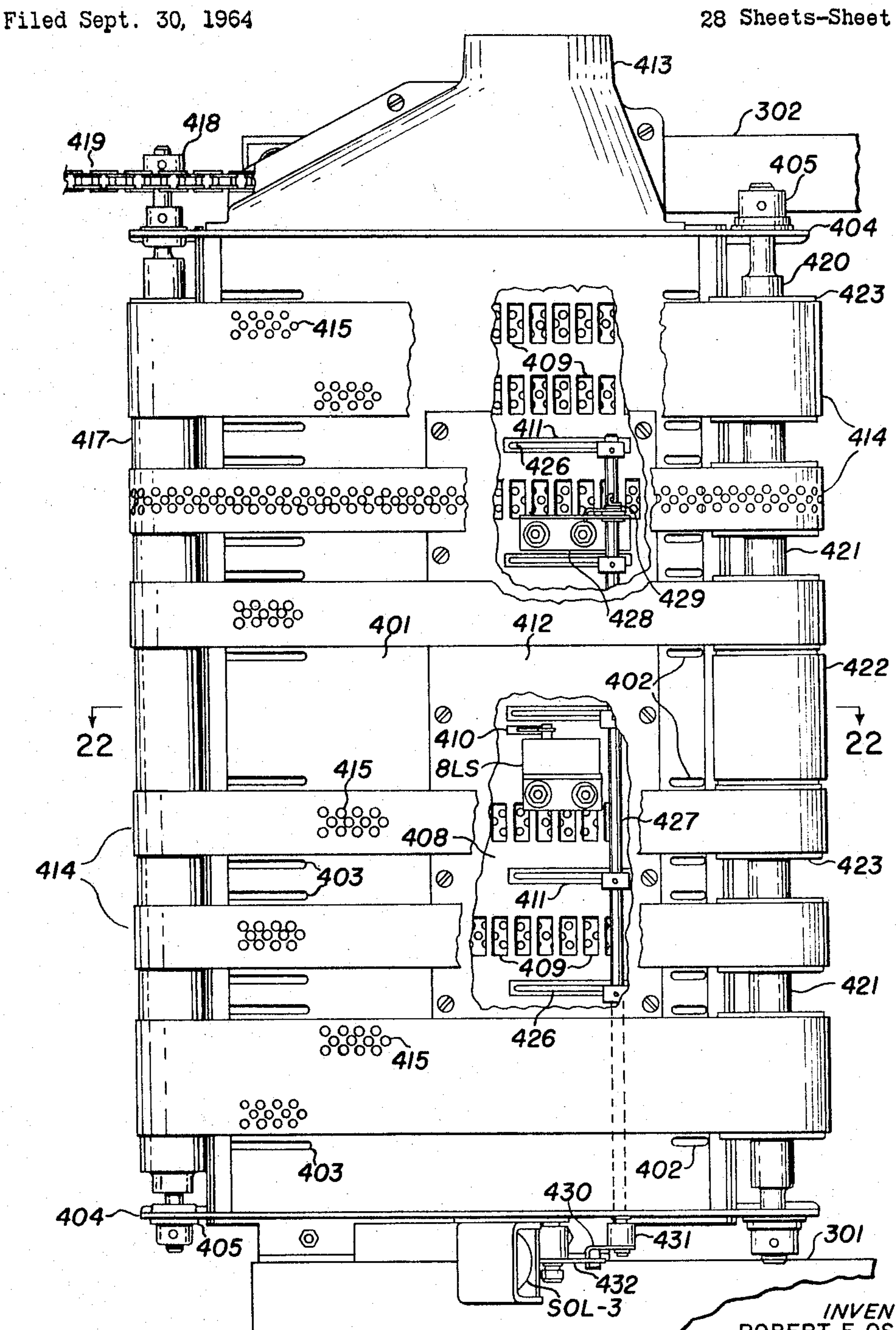
FIG. 21 is a top view of the paper transport mechanism.

The limit plate 357 provides positive stopping positions for the paper width indicator or knob 348. The limit plate has adjustable stops 359 located in a series of arcuate grooves 360 in the plate. A pawl 361 is mounted on the positioning arm 351 to cooperate with the stops 359. The pawls are urged towards the plate 357 by a clip 362 so that they abut the stops 359 upon movement of the arm 351. The stops 359 are positionable within the grooves 360 so that the position of the paper guides 332 may be adjusted according to the size of the paper expected to be used in the machine. As the arm 351 is moved from left to right, as seen in FIG. 17, a pawl 361 abuts the first stop 359 that it encounters. If this is the size of paper being used as indicated on an indicator dial on control panel 349, then movement of the knob 348 stops at this point. However, if it is a different size paper that is to be fed, then the knob 348 is moved towards the operator, that is, towards the left in FIG. 15, and the arm 351 pivots about point 363 against the action of spring 358 so that a pawl 361 is lifted over the stop 359. With the return of the knob 348 to its original position, continued movement is possible until subsequent stops are encountered by a pawl 361. When the knob 348 and arm 351 are returned to their original position the pawls 361 are deflected by stops 359 against the action of springs 362 so that the pawls ride over the stops 359. A tension spring 364, connected between the plate 357 and the arm 351, aids in the movement of the arm 351 and holds the arm against the stops 359.

The rear margin of the stack of paper on the tray 41 is aligned by deflectors 317 which are positioned to contact the trailing edge of the stack lightly to hold the paper in position on the tray. The deflectors 317 are pivotally secured to the depending supports 318 of brackets 319 by pins 336. Each deflector is normally biased outward from the depending supports, in a clockwise direction as seen in FIGURE 16, by a coil spring 337. Each spring 337 encircles a pin 336 with one end of the spring butting against the deflector and the opposite end of the spring butting against the depending support.

Stub shafts 338, fixed to the ends of the bracket, are journaled in frame plates 301 and 302 to permit this entire assembly to be rotated out of the position shown in FIGURE 16 to facilitate loading of paper onto the tray. Movement of this assembly in a counter-clockwise direction is limited by stop pins 388 extending from the frame plates 301 and 302.

A cam 389 is fixed to the opposite end of one of the stub shafts to actuate an interlock switch 24LS mounted on frame 302, when the assembly is raised to permit loading of paper onto the tray.

With the sheet stack adjusted to the proper height and the guides positioned according to the size of the paper by the above-described mechanism, the sheets may be seriatim fed from the top to the paper transport 44.

The sheet separating mechanism for separating the top sheet from the stack includes a number of suction feet 365 which by suction, pick up the topmost sheet and advances the sheet between the idler rolls 42 and the belts 414 of the paper transport system 44.

Each suction foot 365 comprises a hollow tube secured at one end to hollow manifold tube 366 journaled at opposite ends in pivot arms 367. One end of the tube 366 is sealed and has a suitable limiting valve 316 to control the suction pressure, and the opposite end of the tube is connected by a flexible conduit 368 to the inlet of a pump, not shown, driven by motor MOT–9, shown only schematically in the circuit wiring diagram. A cam follower arm 369, carrying cam follower 370 is also secured to the manifold tube 366. The opposite ends of pivot arms 367 are secured to rock shaft 371 journaled in plates 301 and 302.

The shaft 371 extends through the side frame 302 and has secured thereon a cam follower arm 372 which imparts a rocking motion to the shaft as the cam follower 373 is actuated by cam 374.

The rocking of the rock shaft 371 will cause the outer ends of pivot arms 367, carrying manifold tube 366, to travel in an arc. As this happens, the cam follower 370 on cam follower arm 369 is biased by spring 375 into engagement with a cam plate 376, secured to side frame member 301, as shown in FIG. 16.

The cam plate 376 has a substantially vertical guide surface terminating in a horizontal guide surface so that as the follower 370 traces a path along the vertical and then the horizontal guide surfaces, the rock shaft 371 will rotate in a counter-clockwise direction as seen in FIG. 16. The lower ends of the suction feet will be raised from a position in contact with the topmost sheet upward as the cam follower engages the vertical guide surface of the cam plate 376. Continued rocking motion of the rock shaft will cause the suction feet to rotate about the axis of manifold tube 366 towards the idler rolls 42 and the belts of the paper transport 44 as the cam follower moves along the horizontal guide surface.

Figure 14:
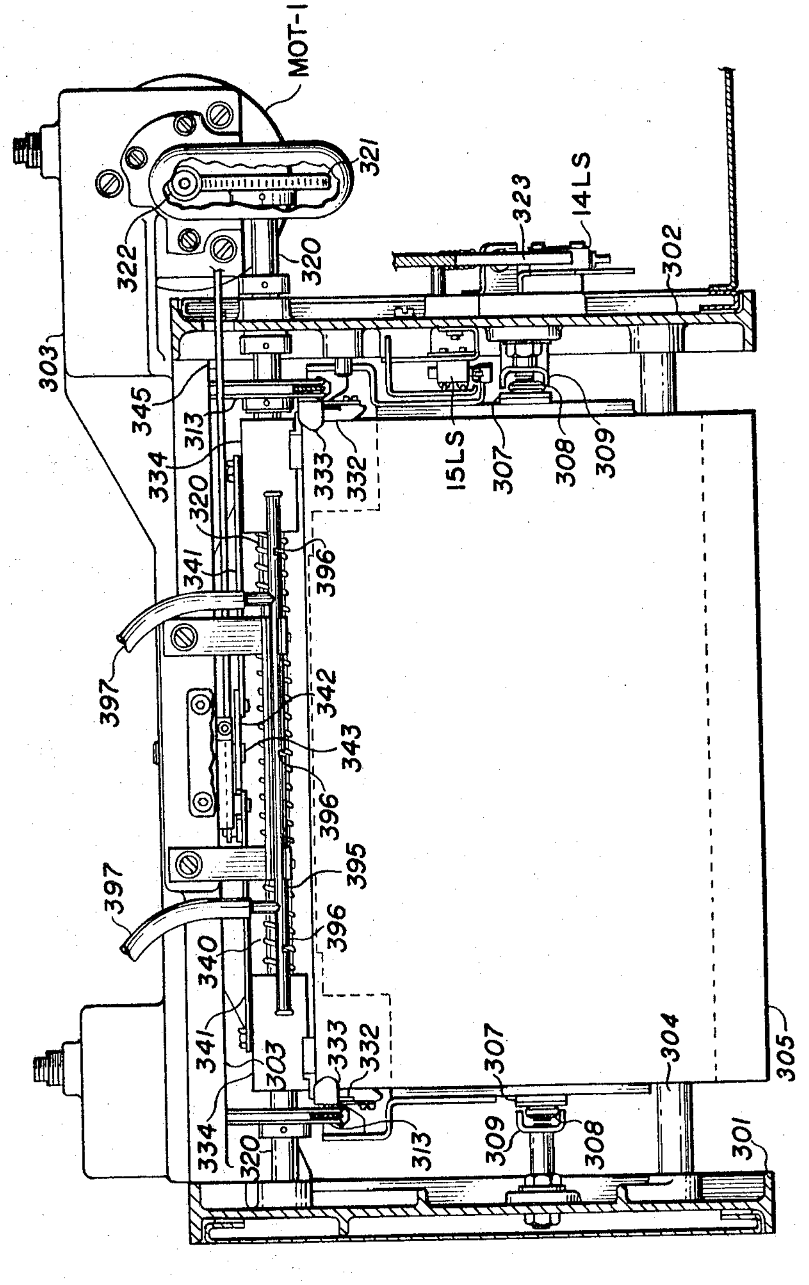
FIG. 14 is a sectional view of the sheet feed mechanism taken along lines 14—14 of FIG. 11.
Figure 15:
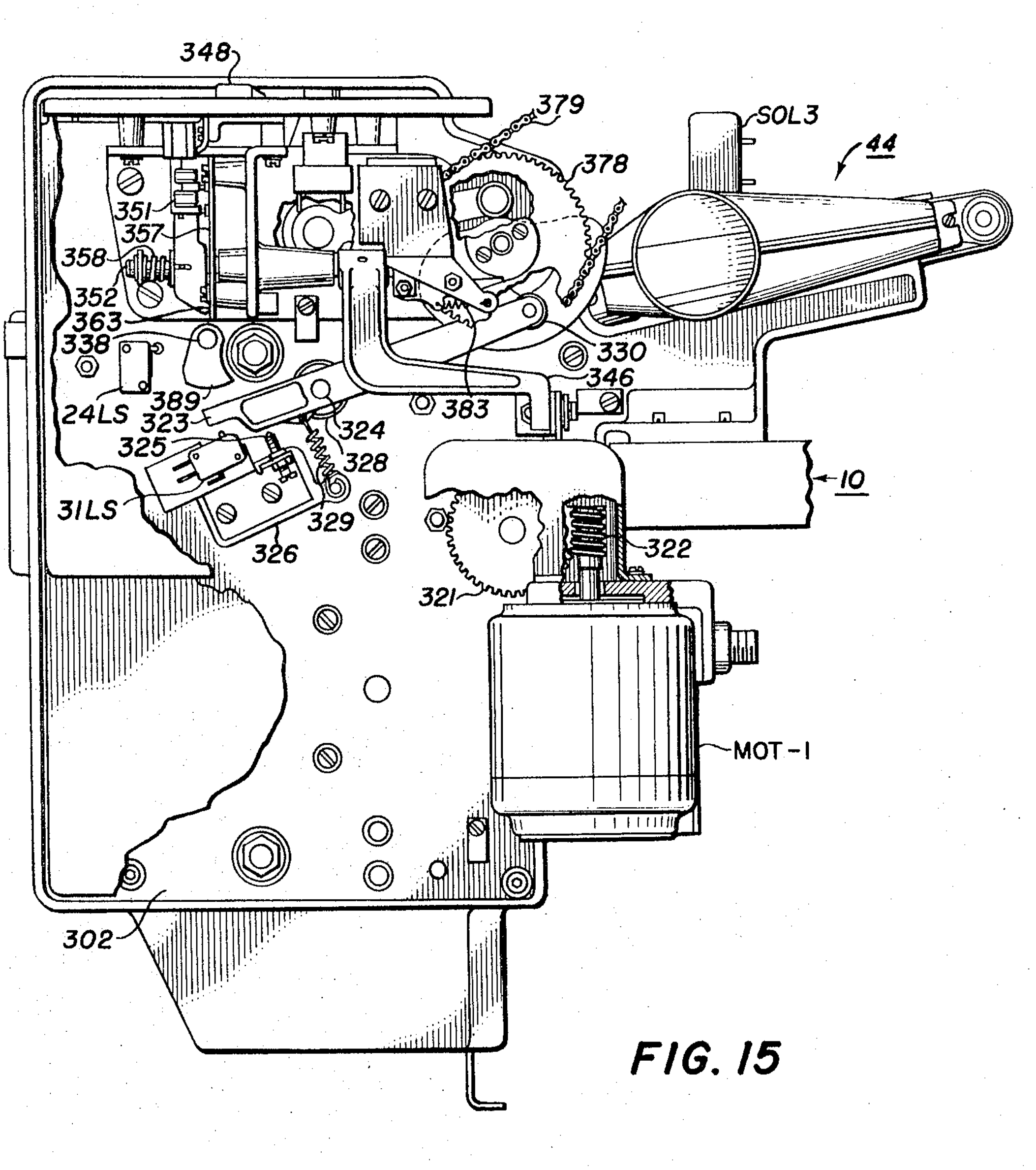
FIG. 15 is a rear view of the sheet feed mechanism with the cover panel broken away to show the internal elements of the mechanism.
Figures 18, 19, 20:
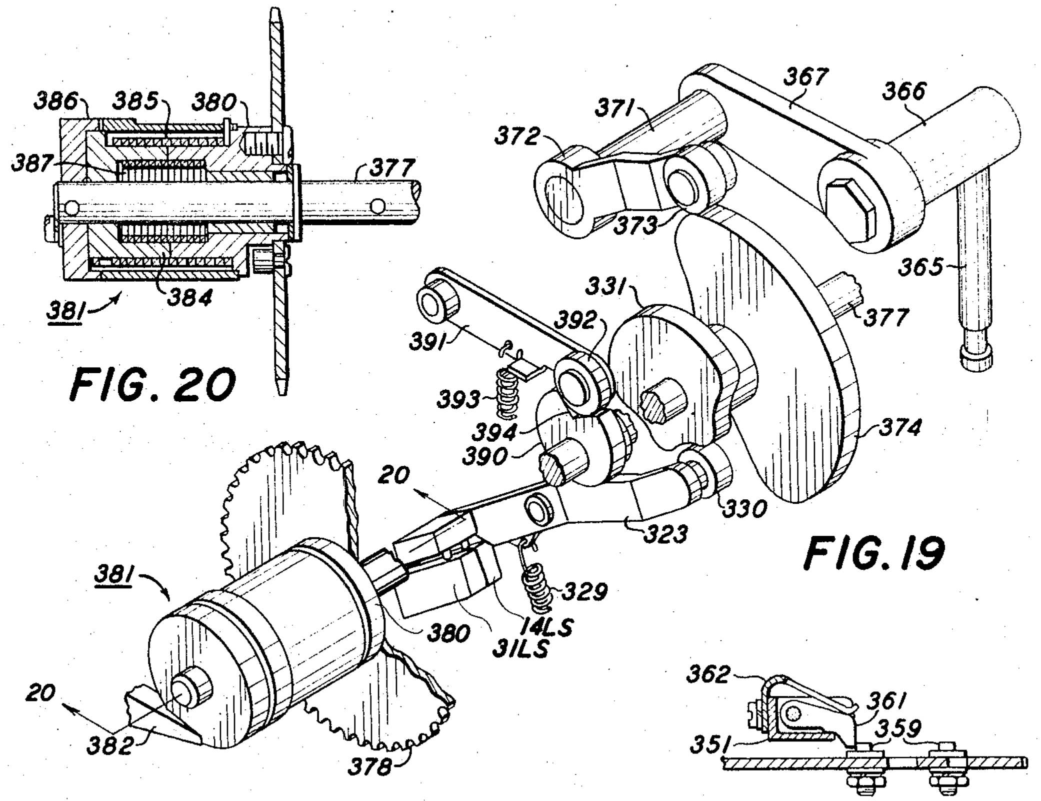
FIG. 18 is a sectional view taken along lines 18—18 of FIG. 17.
FIG. 19 is a perspective view of the drive system of the sheet feed mechanism.
FIG. 20 is a sectional view of the clutch taken along line 20—20 of FIG. 20.

Operation of the suction paper feet and the raising of the sensing arm 327 is effected and synchronized by having a rigid connection between the two cams 331 and 374. This is effected by mounting these two cams on shaft 377. A gear 378, driven by chain 379 from the developer and sheet feed drive motor MOT–3, is rotatably mounted on the shaft 377 and is secured to a first plate or drum 380 of a clutch 381. The clutch 381 is of the type which has a second plate or drum 384 secured to the rotating shaft and a coil spring 385 around both drums. When the movement of the spring is unrestricted, the diameter of the spring is in driving contact with the two drums so that the shaft is rotated. When rotational movement of the coil spring is restrained the inner diameter of the spring disengages both drum surfaces and driving action stops. In the present embodiment, as shown in FIGS. 14 and 18, a pawl 382, which is biased towards the clutch 381 by spring 383, is solenoid actuated to restrain the movement of the clutch spring 385 by catching an indentation in spring retaining sleeve 386. The operation of the paper feed solenoid SOL–1 is described hereinafter under machine operation. When the clutch 381 is actuated by disengagement of the pawl 382 from sleeve 386, the gear 378, which is continuously rotating, serves to drive the shaft 377 and rotate the cams 331 and 374. Since the cams 331 and 374 are directly connected, the operation of the suction sheet feeder and the sheet level sensing arm are synchronized. The solenoid SOL–1 immediately releases the pawl 382 after it is disengaged from the sleeve 386, and the spring 383 returns the pawl to a position against the clutch 381 so that after one revolution the pawl again engages the sleeve 386. Thus, the clutch is essentially a one revolution clutch. There is a second internal coil spring 387 which permits one directional movement of the clutch so that the pressure of the cam followers on the cam cannot produce overriding of the shaft.

In order to insure that the suction feet 365 start from the same position on each cycle a third cam 390 is mounted on shaft 377. A cam follower arm 391 and a cam follower 392 are biased against the cam 390 by a tension spring 393 and acts as a break to stop the rotation of shaft 377 with the suction feet 365 in position to start the next cycle. As the clutch 381 rotates the shaft 377 through one cycle, the cam follower 392 drops into an indentation 394 in the cam 390 and stops rotation of shaft 377. When the cycle is started the initial driving force from gear 378 is sufficient to rotate the cam 390 forcing the follower 392 out of the indentation.

Referring again to the separation of single sheets from the stack, the pressure side of the motor MOT–9 driven pump is connected by conduits 397 to manifold conduit 395 positioned near the leading edge of the stack of sheets. Apertures 396, in the manifold conduit directs air under pressure towards the leading edges of the topmost sheets of the stack whereby these sheets are loosened from each other to precondition the sheets for removal by the suction feet. When the suction feet 365 are in contact with a sheet, air is drawn in through valve 316 to this pump.

The idler rolls 42, which cooperate with the belts of paper transport 44, are rotatably mounted on arms 353 journaled on a shaft 354 which is secured against rotation between frame plates 301 and 302. Each of the arms 353 is biased by a torsion spring 355 to yieldingly force the idler roll, with which it cooperates, against the surface of a belt or against a sheet sandwiched therebetween. One end of each torsion spring is secured to a spring retaining collar 356 fixed to shaft 354 and the other end of each spring is secured to the arm 353 with which it coacts.

Paper transport 44 consists of a transport casing 401 closed on top by cover plate 412 and partially closed on the bottom by vacuum shoe 408 to form a vacuum chamber connected by an adaptor 413 to a vacuum conduit and motor MOT–7 operated vacuum pump, not shown. The upper surface of transport casing 401 is provided with front and rear belt guides 402 and 403, respectively, in relation to the path of paper travel, projecting upward in pairs from the casing surface to guide endless belts 414 which are supported and driven by idler roller and drive shaft 420 and 417, respectively, journaled in bearing assemblies 405 mounted in transport casing extensions 404. Endless belts 414 are driven by chain 419 engaging sprocket 418 fixed to the end of the drive shaft 417, the chain being driven through a drive system to be described. Transport casing 401 is secured to the frame plates 301 and 302 of the sheet feed mechanism 40 in a position whereby the belts 414 are in cooperating relation to the idler rollers 42 of the sheet feed mechanism to advance the sheet of transfer material delivered thereto by the vacuum feet 365 of the paper fed mechanism 40.

Idler roller 420 is provided with raised belt support portion 423 for supporting the endless belts 414 and a raised center index portion 422 having a radius equal to or greater than the radius of the belt roller portion plus the maximum thickness of the belt webbing, for a purpose to be hereinafter described. The undercut portion 421, between belt support portions 423, of the idler roller 420 permit the vacuum sucker feet of sheet feed mechanism 40 to advance between the belt support portions to advance sheets into contact between the belts and idler rollers. Multiple parallel rows of apertures 409 are provided in the vacuum shoe 408 in the path of travel of endless belts 414. The belts 414 are provided with suitable apertures 415 whereby as the belts travel over the multiple rows of apertures 409 in the vacuum shoe 408, a sheet will be held to the belts on the underside of paper transport by the vacuum system and be advanced thereby.

The vacuum shoe 408 is provided with a suitable slot opening 410 for the extension of actuator lever 425 of limit switch 8LS whose purpose is to be hereinafter described. Elongated finger slots 411 are provided in the vacuum shoe 408 between and parallel to the path of travel of the belt 414 to permit extension of reject fingers 426 into the path of travel of sheets in order to eject the sheets from the machine operation.

The reject fingers are secured to reject shaft 427 journaled at its outboard end by bearings 431 positioned in the outboard side of transport casing 401 and in bracket 428, the latter being secured to the inner surface of vacuum shoe 408. The reject fingers are normally biased out of the path of paper travel by torsion spring 429 encircling the reject shaft 427, the spring being secured at one end to the shaft and at its other end to bracket 428.

Movement of the reject fingers 426 into the path of travel of sheets conveyed by endless belts 414 is effected by reject solenoid SOL–3 provided with a lever 432 to contact reject arm 430 secured to the outboard end of reject shaft 427.

To prevent the delivery of multiple or superimposed sheets of transfer material to the xerographic drum, the reject solenoid SOL–3 is energized to project the reject fingers 426 into the sheet path through multi-sheet sensing switch 9LS, the closure of which is effected by a multiple sheet sensing device, generally referred to by reference numeral 433, having a roller cam follower 439 cooperating with the center index portion 422 of idler roller 420 to sense the presence of multiple sheets.

Roller cam follower 439 is journaled on stub shaft 440, fixed to a follower arm 437. The follower arm is journaled on shaft 435 fixed to the upright ends of base 436 secured to cross bar 303 of the sheet feed mechanism 40 in position to permit the roller cam follower 439 to cooperate with the center index portion 422 of idler roller 420 of paper transport 44. Axial alignment of the follower arm 437 on the shaft is maintained by retaining ring 451 positioned in a suitable groove formed in the shaft.

Figure 22:
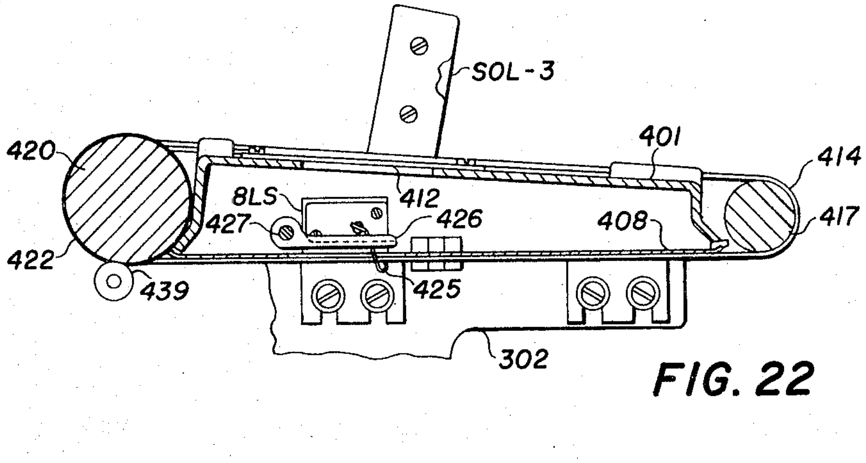
FIG. 22 is a sectional view of the paper transport.
Figure 23:
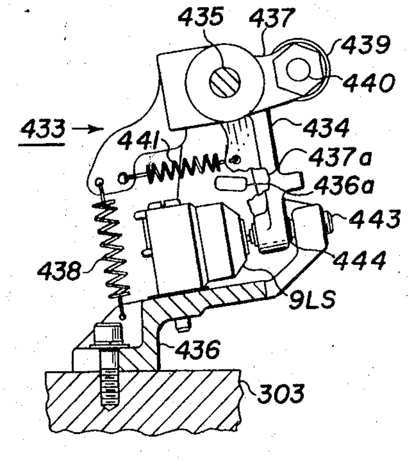
FIG. 23 is an enlarged front view of the multi-sheet sensing device.
Figure 24:
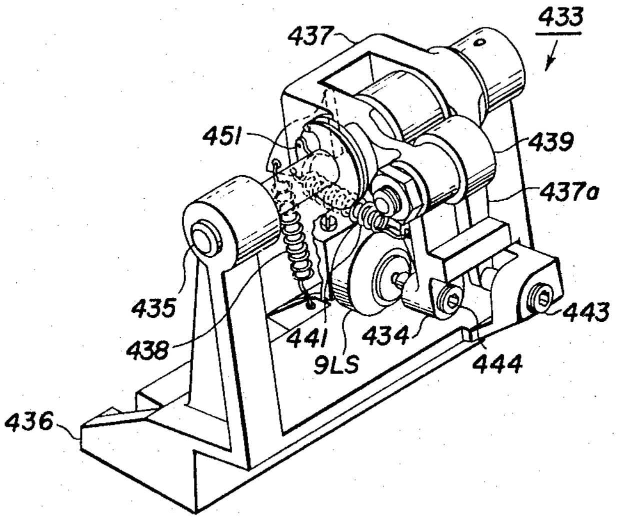
FIG. 24 is a perspective view of the multi-sheet sensing device.

The follower arm 437 is normally biased in a counterclockwise direction, as seen in FIG. 22, by spring 438 bringing the roller cam follower adjacent to the center index portion 422 of the idler roller 420. The spring 438 is secured at one end to base 436 and at its other end to a center extension of the follower arm opposite from the roller cam follower 439. Movement of the follower arm 437 in a clockwise direction is affected by the passage of a sheet or sheets between the roller cam follower and the center index portion 422. Movement of the follower arm in this direction is limited by a boss **436*a* extending from the base 436 into interference relation wtih the depending lever 437*a* of the follower arm, and in the counter-clockwise direction by a stop screw 433 threaded into the base 436**.

The multi-sheet sensing switch 9LS, a normally open switch, is actuated by actuator arm 434 journaled on shaft 435 between the bifurcated journaled portions of follower arm 437. The actuator arm 434 is normally biased in a clockwise direction, as seen in FIG. 22, to actuate switch 9LS thereby closing its contact.

However, this is normally prevented, except by the passage of multiple sheets between the roller cam follower 439 and the center index portion 422, by the depending lever 437*a* of follower arm 437 contacting the radial extending portion of the actuator arm 434 to rotate this arm in a counter-clockwise direction out of contact sufficiently with the actuator of switch 9LS to prevent closure of its contact.

When multiple sheets are advanced between the roller cam follower and the center index portion, the follower arm 437 and its depending lever are rotated sufficiently clockwise to permit the spring 441, only, to bias the actuator arm 434 into actuating contact with the actuator of switch 9LS to close its contact.

Adjustment for the thickness of sheets, to regulate the open and closing action of the actuator arm with the switch 9LS is effected by adjusted screw 444 threaded into the bottom portion of the actuator arm.

As a sheet is fed to the idler roller 420 by the vacuum feet of sheet feed mechanism 40 the sheets pass between the previously described center index portion 422 of the idler roller 420 and the roller cam follower 439 of the sheet sensing device. In the event of multiple or superimposed sheets being fed between these rollers, actuator arm 434 is permitted to rotate sufficiently to close sensing switch 9LS to energize solenoid SOL–3 thereby extending the reject fingers into the path of travel of the sheets to eject them into an abort or reject tray 445 located beneath paper transport 44.

Single sheets of paper separated and fed by the sheet feed mechanism 40 is further advanced by paper transport 44 to a sheet registration device 45 whereat the leading edge of a sheet is aligned and then advanced to the xerographic drum in registration with a previously developed image thereon. Transfer of the developed image on the drum to the sheet of paper is effected electrostatically by corona transfer device 51. After transfer, the sheet is separated from the drum by sheet pick-off device 52, the sheet dropping onto endless conveyor 55 to be forwarded thereby to fuser 60.

In the embodiment of the xerographic apparatus shown, sheet registration device 45, corona transfer device 51 and endless conveyor 55 and the bottom roll of fixing device 60 are supported on a frame assembly or drawer formed as a separate unit from the main frame of the machine. The frame assembly or drawer supporting these elements may be moved as a unit away from the xerographic drum to permit access to the paper path.

Figure 25:
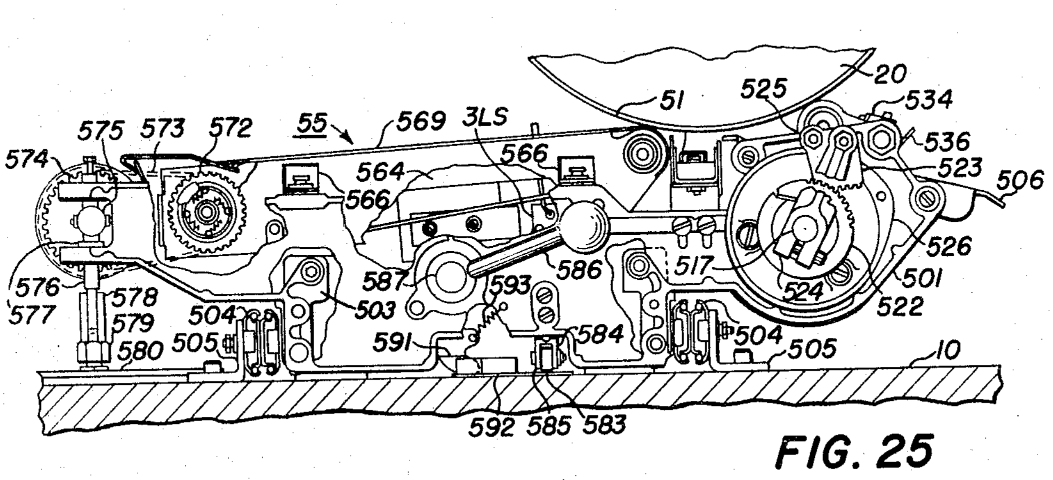
FIG. 25 is a front view of the drawer assembly of the apparatus supporting the sheet registration device, corona transfer device, an endless conveyor and the bottom roll of the fusing device of the xerographic apparatus.
Figure 26:
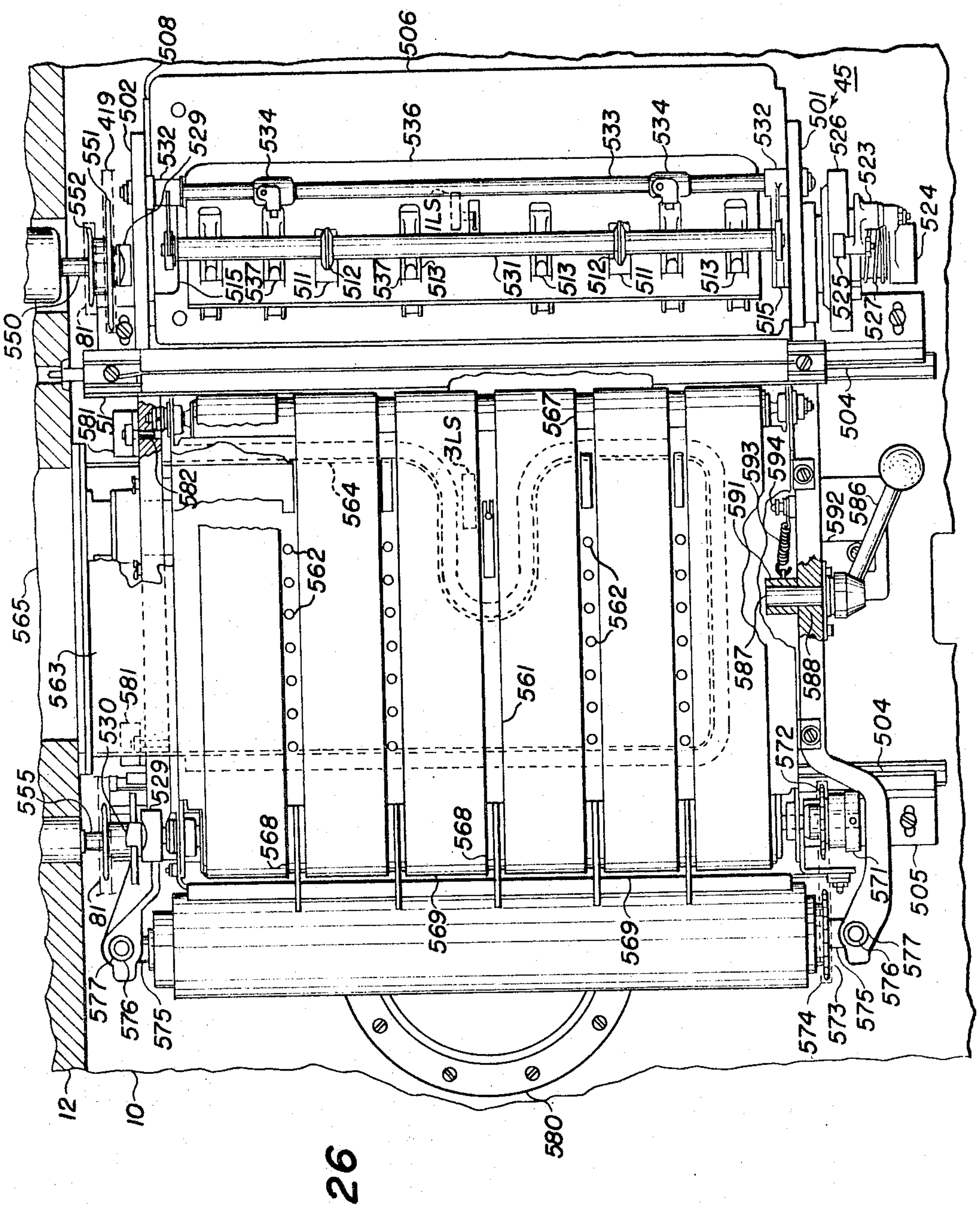
FIG. 26 is a top view of the apparatus of FIG. 25.
Figure 27:
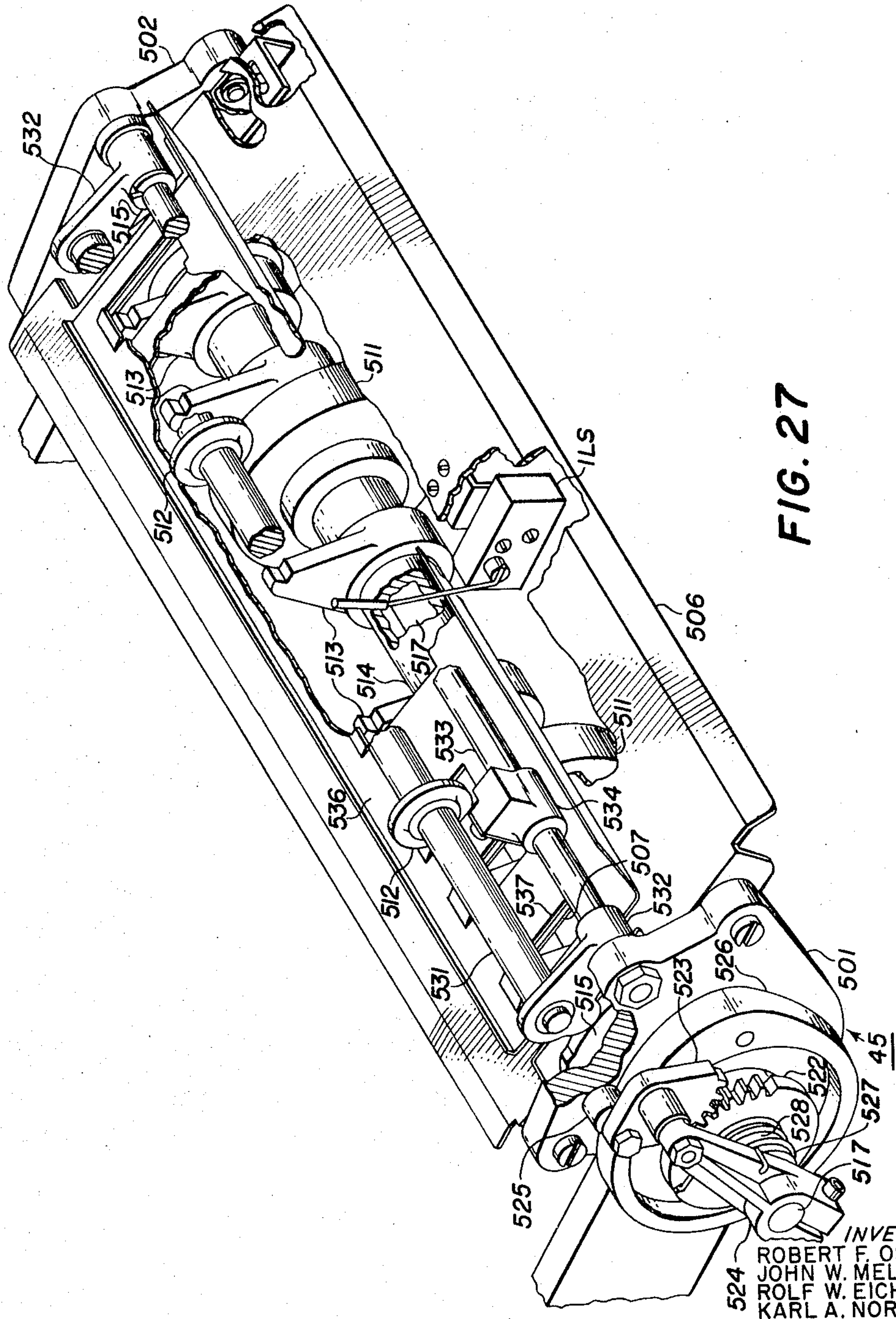
FIG. 27 is a perspective view of the sheet registration device of FIG. 25.

As shown specifically in FIGS. 25 and 26, the frame assembly or drawer includes an outboard frame 501 and an inboard frame 502 held in rigid spaced relation to each other by tie bar frame 503. This frame assembly supports one portion of drawer slides 504, the mating portion of which are secured to angle rail supports 505 fastened to the base plate 10 of the main machine frame.

In the normal operation of the sheet feed system, that is, when a single sheet has been separated from the stack and fed to the paper transport, the sheet is advanced toward the drum by paper transport 44. Single sheets thus advanced are guided by the feed table 506 of the sheet registration device 45 toward a set of feed rollers 511 and 512 which will direct the sheet into contact with the peripheral surface of the xerographic drum. Before a sheet can be advanced by the feed rollers 511 and 512, feed roller 512 is lifted out of cooperating relation with feed roller 511 and the forward progress of the sheet is momentarily stopped by register stops 513 mounted for rotation with the feed rollers 511.

The register stops 513 are used to align the leading edge of the sheet parallel to the axis of the drum and to restrain the forward progress of the sheet for a very short period of time so that the final advancement of the sheet to the drum is timed for proper registration with a developed xerographic image previously formed on the drum surface.

As shown in FIG. 26, the feed table 506 which extends between frames 501 and 502 is connected at one end to frame 501 and at its other end is fixed to bracket 508 attached to frame 502. The feed table 506 is provided with slots 507 through which the feed rollers 511 and register stops 513 extend. The upper paper guide 536 is also provided with slots 537 in alignment with the slots in the feed table.

Figure 28:
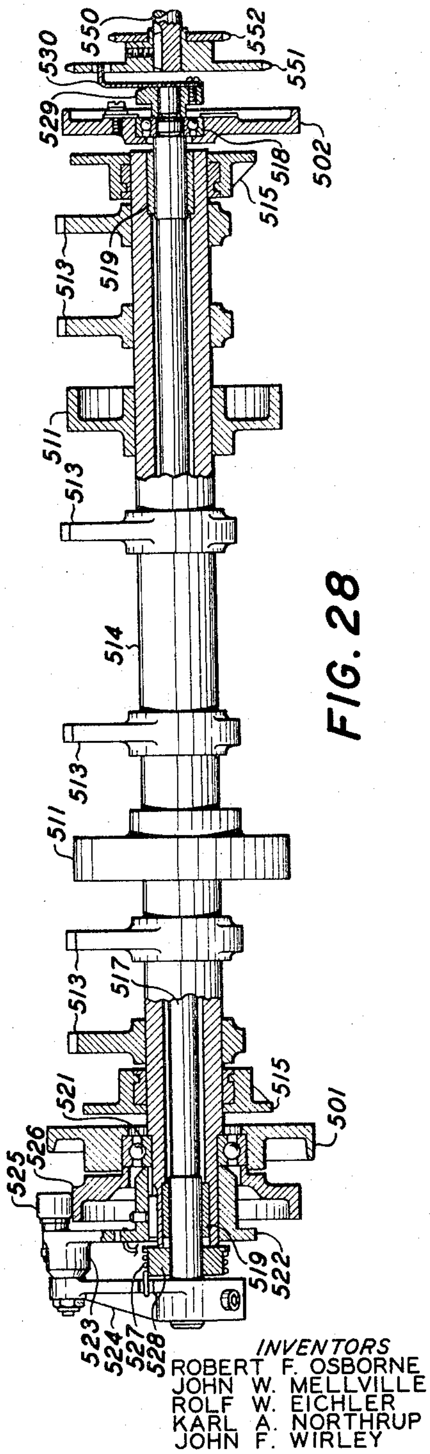
FIG. 28 is a sectional view of the shaft assembly of the sheet registration device of FIG. 25.

The feed rollers 511 and register stops 513 are fixed to an outer shaft 514 for rotation therewith, the outer shaft also supporting lift cams 515. As shown in FIG. 28, the outer shaft 514 encircles an inner shaft 517 which is journaled at one end by bearing 518 positioned in frame 502 and by bearings 519 positioned within outer shaft 514 rotatably supported at its left-hand end by bearing 521 mounted in outboard frame 501, whereby either the outer shaft or inner shaft can be rotated with respect to each other.

The outer shaft 514 encircling shaft 517 is thus mounted about the axis of the inner shaft to be rotated at varying speed by segmented gear 522 fixed to the outer shaft in driven engagement with the segmented gear 523 rotatably carried by the drive arm 524 fixed at the outboard end of the inner shaft to rotate with the inner shaft. The inner shaft is driven at a fixed rotative speed in timed relation to the xerographic drum so that, normally, the peripheral speed of the feed rollers 511 is substantially equal to the peripheral speed of the xerographic drum.

However, in order to effect sheet registration, the rotative speed of the outer shaft 514 and therefore the rotative speed of the register stops 513 and feed rollers 511 is first increased and then decreased with respect to the rotative speed of the inner shaft to allow the sheets to become registered.

This is accomplished by changing the location of the driving engagement between the segmented gears 522 and 523, that is, while the shafts 514 and 517 are being rotated through the engagement of these gears, segmented gear 523 is caused to oscillate thereby first effectively trying to drive gear 522 in the same direction of rotation and then to rotate gear 522 in the opposite direction as the direction of rotation of these shafts.

As seen in FIGS. 29*a*, 29*b*, 29*c*, 29*d* and 29*e*, this sequence is effected by cam follower 525 riding on cam 526 which is fixed to frame 501 in position to encircle the outer shaft and the hub of segmented gear 522. The cam follower 525 is journaled on an arm of the segmented gear 523 and is biased into contact with the cam by coiled spring 527 encircling spring hub 528, one end of the spring being secured to the drive arm 524 and the opposite end of the spring being connected to the gear 522. The spring 527 also tends to cause the arm 524 and therefore the gear 523 to rotate in a counter-clockwise direction as seen in these figures.

Figure 29E:
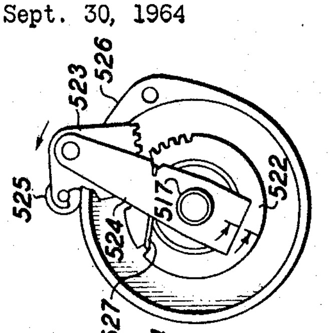
Figure 29D:
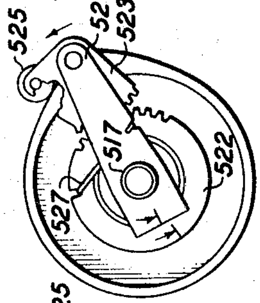
Figure 29C:
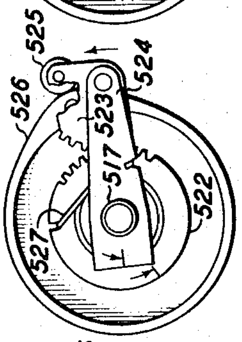
Figure 29B:
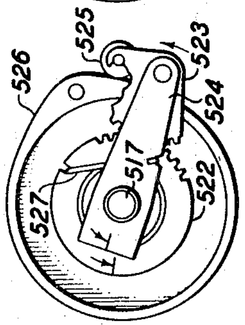
Figure 29A:
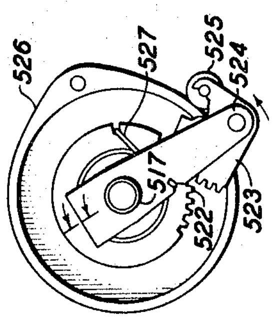

Referring to FIG. 29*a*, with the cam follower 525 riding on the dwell portion of the cam 526, the outer shaft is rotated in the direction shown at the same speed as the inner shaft through the above-described drive connection.

As the cam follower rides up on the rise portion of cam 526, as seen in FIGS. 29*b* and 29*c*, the gear 523 is rotated in a clockwise direction driving gear 522 counter-clockwise to increase the rotative speed of the outer shaft relative to the rotative speed of the inner shaft. This continues until the cam follower completes its ride up the rise of the cam and then as the cam follower begins to ride down the fall of the cam, the inner shaft continues to rotate while the outer shaft is beginning to rotate at a speed less than the rotative speed of the inner shaft. In effect, the outer shaft appears to be momentarily stopped while the inner shaft catches up to the outer shaft, as seen by the index marks in these figures. The register stops are mounted on the outer shaft so that their stop portions are positioned in the path of paper travel to stop and align the sheet.

As the cam follower again rides on the dwell portion of the cam 526 the inner shaft and outer shaft will again be rotated at the same speed as seen in FIG. 29*e* and will continue at this equal speed through the position shown in FIG. 29*a*. During this period, a sheet previously registered in the manner just described, is advanced by the rollers 511 and 512 into contact with the drum, further advance of the sheet being effected by the drum. As a sheet is forwarded, it will contact the actuator of limit switch 1LS suitably supported beneath feed table 506.

The feed rollers 512 which are actually idler rollers are mounted on shaft 531 journaled at opposite ends in one end of cam follower arms 532, the opposite ends of which are rotatably supported on support rod 533 fixed to frames 501 and 502. The cam follower arms are positioned to ride on the lift cams 515 which are mounted on the outer shaft 514 with their rise portions angularly displaced to effect lifting of the feed rollers 512 out of cooperating relation with feed rollers 511 as a sheet is being registered by the register stops. Support rod 533 is also provided with support blocks 534 to which the upper paper guide 536 is attached.

To effect rotation of inner shaft 517, it is provided at its inboard end with drive nut 529 having fastened thereon a drive arm 530. The turned out portion of the drive arm 530 is adapted to engage an aperture in clutch sprocket 551 mounted with sprocket 552 on the timing shaft 550 of a timing device to be described.

With this arrangement, there is provided a releasable clutch drive for the sheet registration device 45 on the drawer to permit withdrawal of the drawer as desired.

The timing shaft 550 is rotated by sprocket 552, through means to be described, at a speed directly related to the drum speed, which speed is also related to the speed of scanning of an image for projection onto the drum. The register stop is rotated out of interference relation to a sheet to allow the sheet to be advanced to the drum at a predetermined interval after start of scanning as controlled by the fall of the scan cam and its rate of rotation with respect to the drum.

The transfer of the xerographic powder image from the drum surface to the sheet thus advanced to the drum is effected by the corona transfer device 51 supported between frames 501 and 502 adjacent the drum at or immediately after the point of contact between the sheet and the rotating drum. A suitable electrical contact 541 is mounted on frame 502 to engage another contact 542 supported on the frame 12 whereby the corona transfer device is connected to the electrical circuit of the machine as shown in FIG. 32*a*. In operation, the electrostatic field created by the corona transfer device is effective to tack the sheet electrostatically to the drum surface, whereby the sheet moves synchronously with the drum while in contact therewith. Simultaneously with the tacking action, the electrostatic field is effective to attract the toner particles comprising the developed image from the drum surface and cause them to adhere electrostatically to the surface of the sheet.

After transfer, the leading edge of the sheet is separated from the drum by the sheet pick-off mechanism 52, the remainder of the sheet then peeling off the drum due to its own weight to fall onto the belts of endless conveyor 55 which transport the sheet to heat fuser 60.

Endless conveyor 55 includes a transverse extending guide plate 561 secured by angle brackets 566 to frames 501 and 502; a flanged cover 564 is secured as by spot welding to the underside of guide plate 561 forming therewith a vacuum manifold having a number of inlet apertures 562 formed in the guide plate and a discharge connection 563 in communication with a suitable aperture in inboard frame 12 which is connected by conduit 565 to a vacuum pump. Suitable gaskets are provided between discharge connection 563 and frame 12.

Sheets pulled toward the guide plate by suction through inlet apertures 562 are carried by belts 569 looped over idler roller 567 and driven roller 568 suitably journaled in the depending portions of guide plate 561.

The driven roller 568 has connected thereto at its inboard end a drive nut 529 and drive arm 530, the turned out portion of the drive arm being adapted to engage an aperture in clutch plate 553 mounted with sprocket 554 on an idler shaft 555 suitably journaled in frame 12. The outboard end of driven roller 568 is provided with a stub shaft portion fixed to rotate with the driven roller and carrying at its outboard end an overriding clutch 571, for example, a Miniclutch No. HV64A6A manufactured by the Miniclutch Co., Hamden, Connecticut. The driven portion of this clutch has fixed to it a sprocket 572 which is connected by chain 573 and sprocket 574 on the bottom roll of fuser 60 to drive this roll of the heat fuser.

The bottom roll of the fuser 60 is journaled on a fuser shaft 575 which is fixed at its opposite ends to guide rods 576 journaled by bearings 577 for vertical movement in the bifurcated ends of frames 501 and 502. The lower portions of these guide rods are secured to a fuser lift bar 578 which is actuated by a plunger 579 connected to an air actuated diaphram 580 controlled in a manner to be described.

A miss-detector limit switch 3LS is secured by a suitable bracket in a position whereby the actuator of the limit switch extends through an aperture in guide plate 561 into the path of paper travel, for a purpose to be described.

As previously described, the frame assembly, carrying sheet registration device 45, corona transfer device 51 and endless conveyor 55, is slidably mounted by means of drawer slides 504.

To insure proper alignment of these components with the xerographic drum, the brackets 581, secured to base plate 10, are provided with locating pins 582 adapted to engage suitable locating apertures formed in the frame 502.

The frame assembly is aligned vertically by cam follower 583 journaled on bracket assembly 584 fixed to this frame, which is adapted to slide onto the locating ramp of a cam plate 585 secured to base plate 10 in position to engage the cam follower as this assembly is pushed parallel to the drum.

Complete withdrawal of this assembly is prevented by suitable stops positioned on the drawer slides 504.

This entire assembly is locked into operative relation with the xerographic drum by manual operation of lever arm 586. The lever arm 586 is fixed to one end of shaft 587 journaled by bearing 588 frame 501, a locking cam 591 being fixed to the opposite end of the shaft 587 in position to engage a cam plate 592 fixed to the base plate 10. The locking cam 591 is normally held in locking engagement with the cam plate by spring 593 fixed at one end to the locking cam and at its other end to pin 594 extending from frame 501.

MACHINE DRIVE

As previously described, the xerographic drum 20, and the object mirror during the scanning cycles are driven in synchronization with each other by means of main drive motor MOT–2. Since the movement of a copy sheet, such as paper, to and from the drum must also be synchronized with the peripheral surface speed of the drum, the paper transport 44 and elements associated therewith, such as feed rollers 511 and 512, endless conveyor 55, fuser of fixing device 60 and inclined conveyor 65 are also driven by main drive motor M–2.

Figure 4:
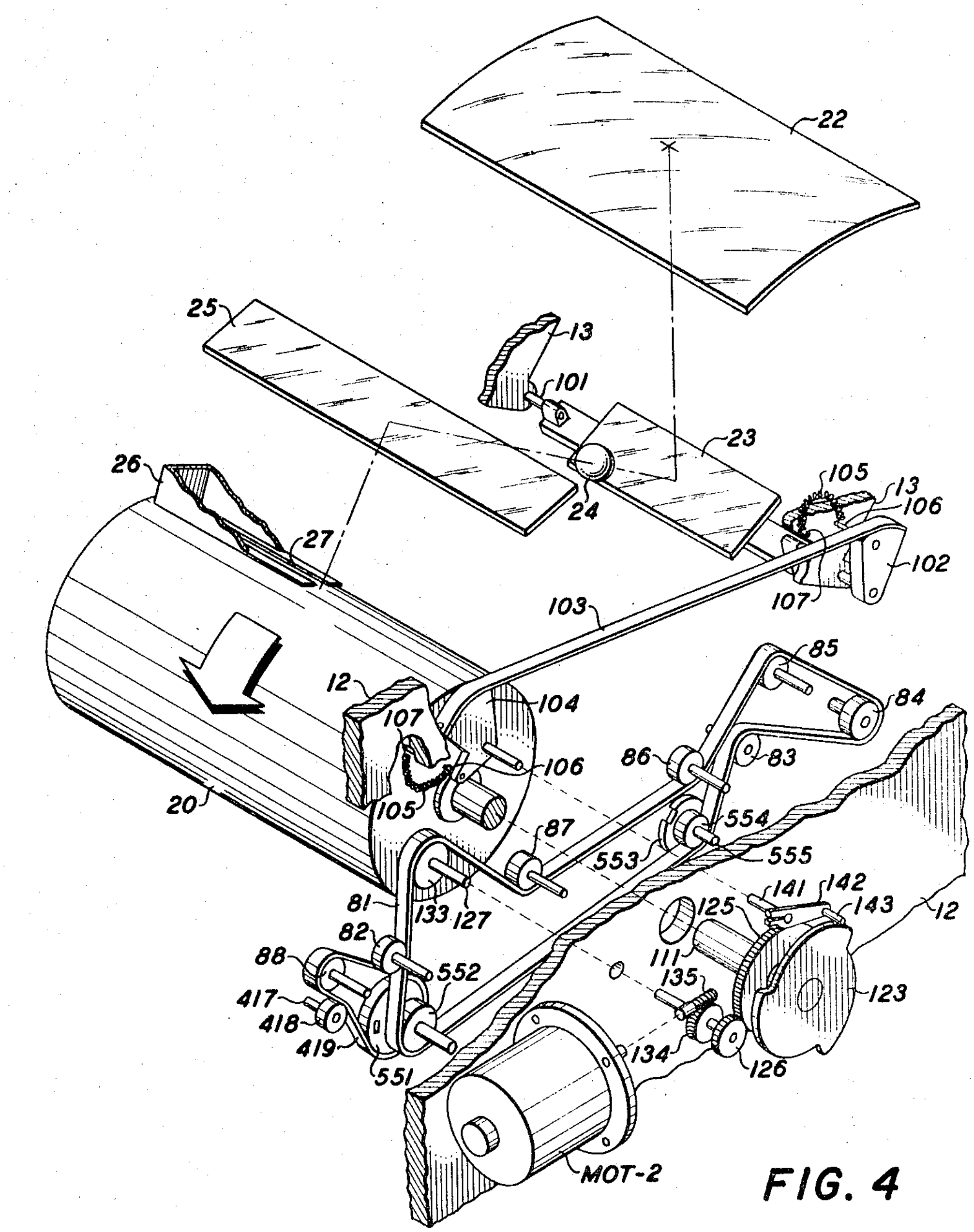
FIG. 4 is a perspective view of the optical system and main drive system for various operative elements associated with the xerographic drum.
Figure 10:
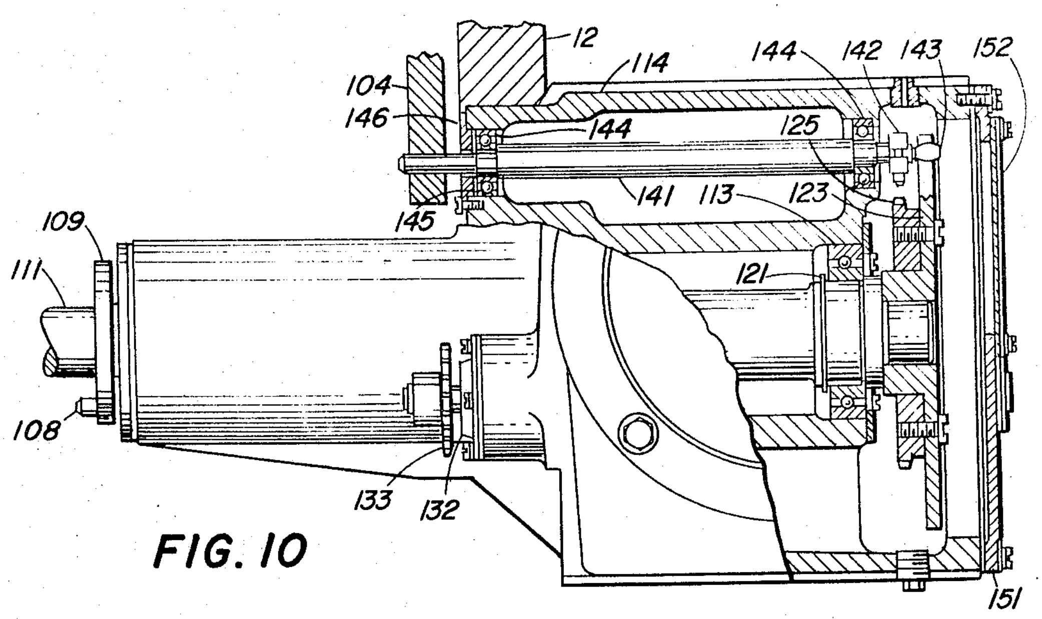
FIG. 10 is a sectional view, in part, taken along line 10—10 of FIG. 6.
Figure 5:
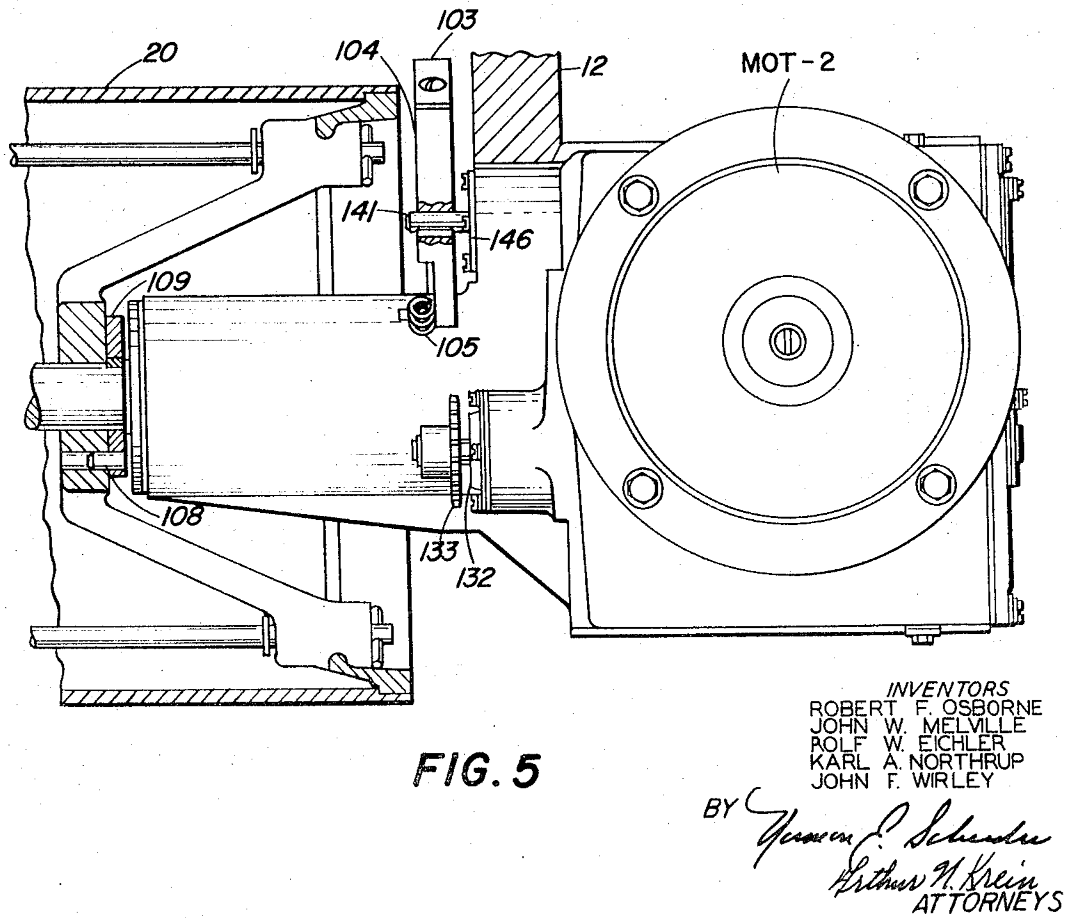
FIG. 5 is a right-hand view of the drum and main drive assembly of the apparatus with a portion of the xerographic drum shown.
Figure 6:
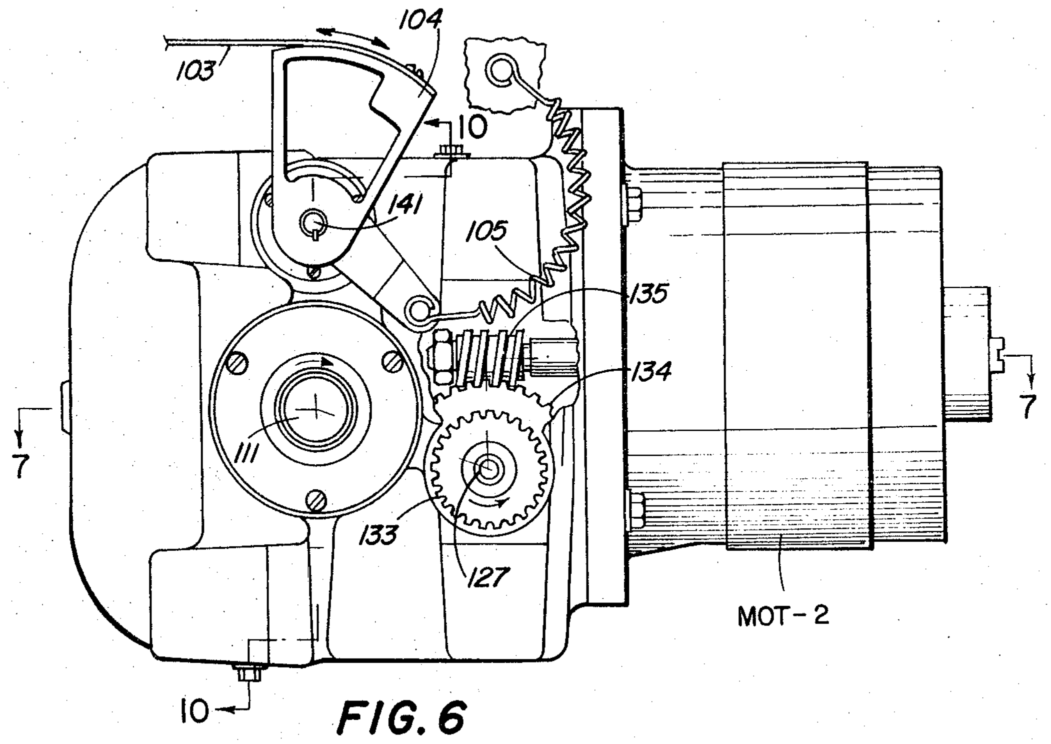
FIG. 6 is a front view of the drum and main drive assembly with the xerographic drum removed.
Figure 8:
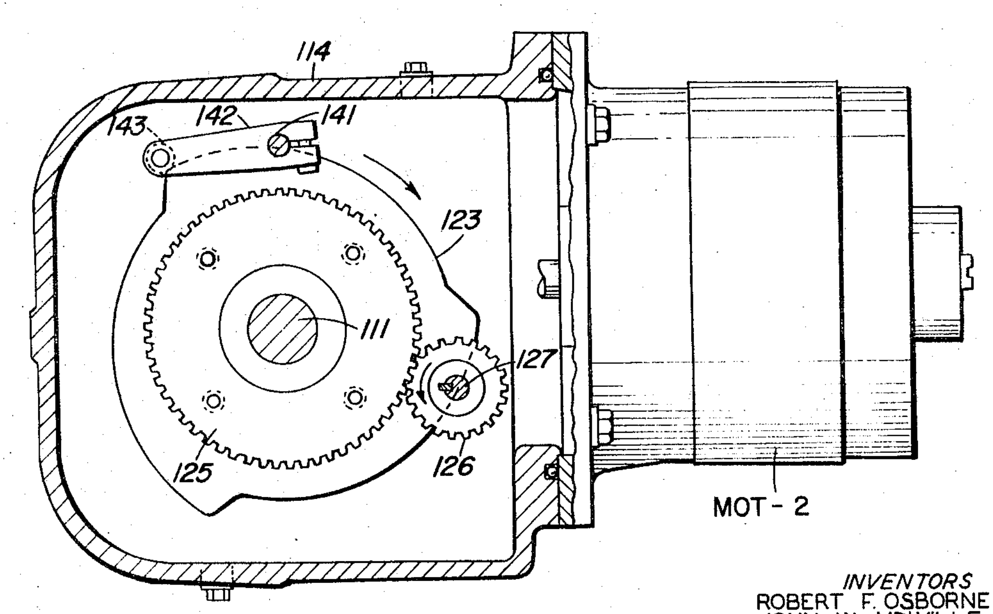
FIG. 8 is a sectional view taken along line 8—8 of FIG. 7.
Figures 7, 9:
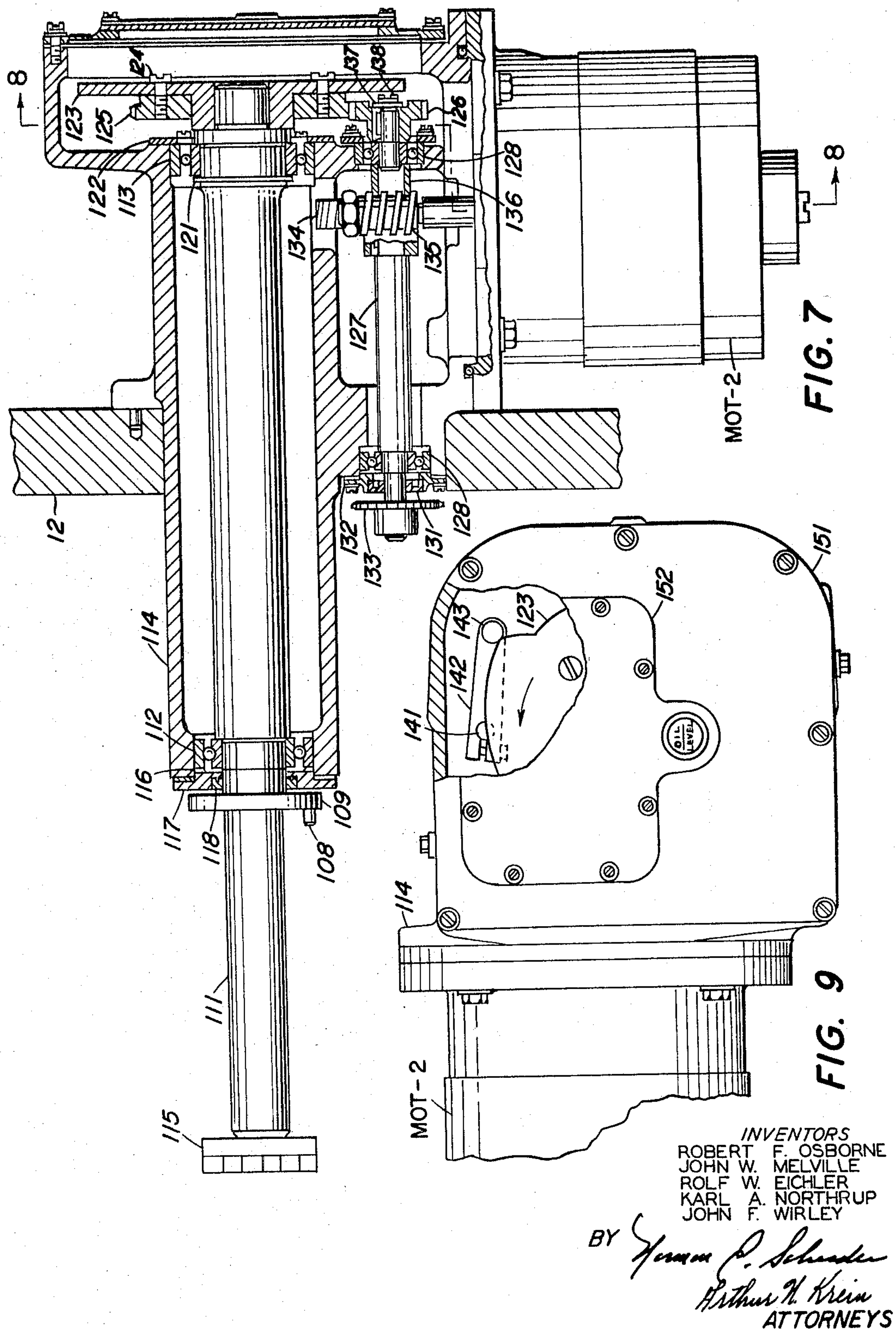
FIG. 7 is a sectional view taken along line 7—7 of FIG. 6.
FIG. 9 is a rear view of the drum and main drive assembly with parts broken away to show the cam drive arrangement.

As shown in FIG. 4, each of these components is operatively connected to the sprocket 133 driven by the main drive motor which also drives the drum as previously described. These components are operatively connected to sprocket 133 by roller chain 81 extending from sprocket 133 to roller sprocket 82 around sprocket 552 to drive the sheet registration device 45, then around sprocket 554 to drive endless conveyor 55, up over sprocket 83 suitably connected to drive the upper roller of fuser 60, around sprocket 84 to drive inclined conveyor 65, over idler sprockets 85, 86 and 87 back up to sprocket 133. Idler sprocket 82 is adjustably secured to inboard frame 12 sprocket 85 is a spring loaded take-up sprocket and the remaining idler sprockets 86 and 87 are fixed idler sprockets mounted on the inboard frame.

Figure 3:
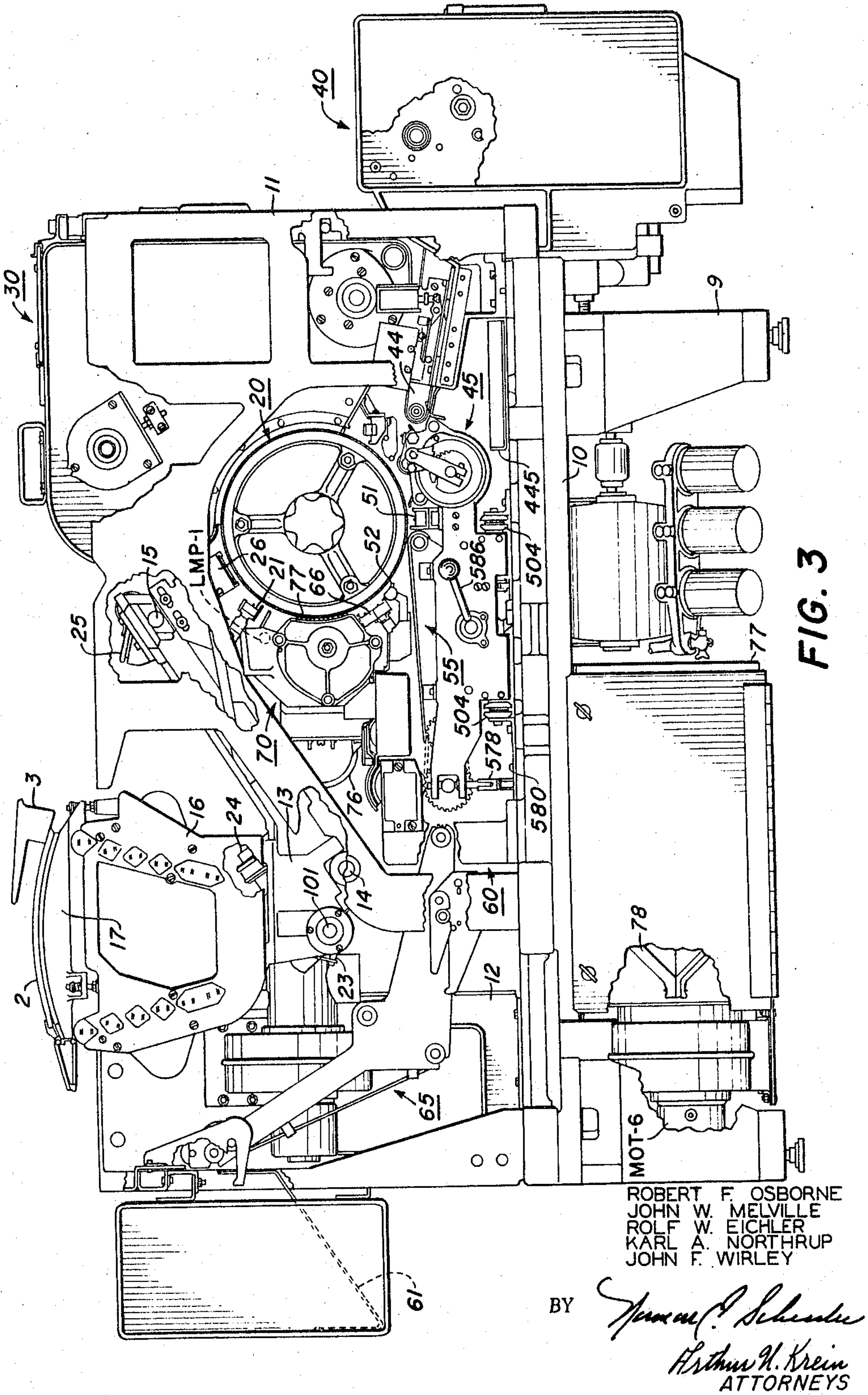
FIG. 3 is a front view of the xerographic apparatus.

As previously described, paper transport 44 is driven by sprocket 418 through roller chain 419. As seen in FIG. 3, the sprocket 418 engages the back side of the roller chain 419 which extends around the sprocket 551, fixed to sprocket 552, and around an idler sprocket 88 adjustably secured to inboard frame 12 in a well-known manner.

As shown in FIG. 30, the sprockets 551 and 552 are fixed to a timing shaft 550 journaled by bearings 801 in switch casing 802 secured to the rear side of frame 12 with a portion of this casing extended through a suitable opening in the frame.

The timing shaft 550 has fixed thereon seven cams; 803, 804, 805, 806, 807, 808 and 809 for actuating ten limit switches suitably mounted within the switch casing, three of the cams being used to actuate pairs of limit switches. Cam 803 actuates count pulse limit switch 7LS, cam 804 actuates a delay limit switch 11LS and a mispuff pulse limit switch 2LS, cam 805 actuates a platen interlock switch 16LS and a jam detect switch 28LS. Cam 806 actuates the abort reset switch 10LS, cam 807 the platen interlock switch 18LS and jam detect switch 29LS, cam 808 the paper feed limit switch 5LS and cam 809 actuates the puffer pulse switch 12LS. These cams are shown in line in FIG. 30 for ease in illustrating, it being realized that the cams are properly staggered readily on the shaft as shown in FIG. 31, to effect the proper timing sequences as described hereinafter.

With this arrangement of the drives, the scanning machanism and the paper feed system for advancing the sheet of support material to and from the drum are effected in synchronization with the rotation of the drum through a common drive medium, that is motor MOT–2.

MACHINE OPERATION

The apparatus disclosed herein makes possible a high speed, office type copying machine suitable for the rapid reproduction of multiple copies of an original placed on the platen 22. The sequence of operation of the apparatus shown is such that it can make permanent xerographic reproductions of an original at the rate of approximately 40 copies or reproductions per minute.

A clear understanding of the operation of the xerographic apparatus and of the electrical circuit controlling the various elements can best be obtained by reference to the schematic wiring diagram of the xerographic apparatus.

Before the xerographic apparatus may be actuated, the drawer asembly must be in operative position to actuate a miss-puff reset switch 22LS, the developer assembly 30 and the drum 20 must be in position to close interlock switches 26LS and 13LS respectively, and the doors of the cabinet 1 must be closed to close door interlock switches 19LS and 20LS, each of these switches not shown except schematically in the wiring diagram, being suitably positioned on the apparatus. In addition, the deflectors of the sheet feed mechanism must be in position to engage the rear of the paper stack, thereby opening interlock 24LS, previously described.

A customer ON-OFF control switch SW8, and ON-OFF switch, must have its ON contact SW8A closed. In addition, there must be a sufficient stack of paper in the sheet feed device 46 so as not to actuate the "Low" paper switch 4LS and the paper index switch SW6, must have its UP contact SW6A closed.

The first operation on starting the machine is for the operator to press the power on button of switch SW1 on the control panel of the machine to close its contact SW1A. With contact SW1A closed the main power relays 1CR and 19CR are energized. This latches in the main power relay 19CR which closes its contacts 19CR1 and 19CR2, 19CR then being held through the now closed contact SW1B, contact 19CR1, the door interlock switches 19LS and 20LS and a normally closed over temperature thermostat THS–1, which is shown only schematically, but is positioned adjacent the fuser 60 to prevent overheating of the fuser. In the event the fuser is above a preset temperature, the thermostat THS–1 will open its contact to automatically turn off the machine.

Energizing power relay 1CR and 19CR places the machine in the "stand-by" position. Power is applied through the closed contact 19CR2 of power relay 19CR to the programmer 5TR, described in detail hereinafter, energizing the indicator lamps of the programmer thus indicating to the operator that the machine is "on." Power is applied to puffer compressor motor MOT–13 used to drive a compressor, not shown, to supply high pressure air to the diaphragm 580 for the bottom roll of fuser 60 and to the paper pick-off mechanism 52. The circuit to the motor MOT–13 is controlled by a pressure limit switch 21LS set to open at a predetermined pressure. If the machine has not been operated for some time, and the pressure in the paper pick-off system is below the predetermined pressure, the contact of switch 21LS wil be closed to allow motor MOT–13 to be energized and will run intermittently depending on the pressure in the system. High voltage power is also supplied through the secondary of transformer T–1 to the power supply PS–2 which controls power supplied to the resistance element R–1 of the heat fuser 60. Thermistor RT–1 and RT–3, not shown except schematically, contact the upper roll of the heat fuser 60 the thermistor RT–1 being used to control the temperature of this roll through the power supply PS–2 while the thermistor RT–3 connected to the power supply PS–5 indicates, at a predetermined temperature, that the machine is ready to run.

Internally, the power supply PS–5 includes a silicone controlled rectifier and relay, not shown, although the contacts of the relay have been shown schematically and designated PS–5A, PS–5B and PS–5C. When the temperature of the fuser roll reaches a predetermined temperature the resistance of the thermistor will have reached a corresponding level, sufficient to permit the relay in the power supply to become energized. When the relay in the power supply PS–5 is energized, one of its contacts PS–5A closes the circuit to the "ready" lights LMP–30, LMP–31, LMP–32, LMP–33 and LMP–34 through the normally closed contacts 27CR2, 14CR2 and 8CR2 of control relays 27CR, 14CR and 8CR, respectively. These "ready" lights illuminate a suitable indicator panel on the main control panel of the machine to indicate to an operator that the machine is "ready" to start a reproduction cycle. Up until this time, while the machine was at "stand-by" the "not ready" lamps LMP–44, LMP–45, LMP–46, LMP–47 and LMP–48 have been energized through the normally closed contact PS–5C. Thus, when the power supply PS–5 is energized, the "not ready" lights go off and the "ready" lights come on.

During this "stand-by" mode, motors MOT–11 and MOT–12 are energized through the now closed contact 1CR1 of relay 1CR. These are two motors used to drive flushing fans, not shown, which are used to circulate air through the cabinet to keep the machine cool. Motor MOT–15 is also energized, which operates a blower, not shown, for cooling and heating the platen and lamp frame assembly cavity. A heater R–10, shown only schematically, which is energized through a normally closed contact PS–4A of power supply PS–4 and normally closed contact 14CR3B of control relay 14CR, is used to supply heat to this cavity so that the exposure lamps are maintained at a predetermined range of temperature both during stand-by and operation of the machine. This temperature is sensed by a thermistor RT–2, not shown, except schematically, mounted on the bulb wall of the lamp holder frame assembly 16, connected to the power supply PS–4 which has, internally, a relay having a normally closed contact PS–4A and a normally open contact PS–4B. When the temperature of the cavity reaches a predetermined level, the heater R–10 will be de-energized by opening of contact PS–4A, but the blower motor MOT–15 will continue to operate to keep the cavity from becoming too hot. Spot cooling of the lamps is also effected by a blower, not shown, driven by motor MOT–14 whenever contact PS–4B is closed.

*Print cycle.*—To make a reproduction, the operator places a document on the platen 22 and closes the platen cover 2. The operator then selects the desired number of copies on the dial indicator of programmer 5TR, described in detail hereinafter. The dial indicators, on the control panel of the machine, indicate units, tens and hundreds, each being readily operated by separate knobs. After the operator has programmed the machine to make the desired number of reproductions, the operator pushes the "print" button of print switch SW–4 thereby closing its contact SW–4A and opening its contact SW–4B. With the closure of contact SW–4A, the control relays 6CR and 14CR will be energized through contact PS–5A, normally closed contact 27CR2 of relay 27CR, contact SW–4A and normally closed contact 2CR2 of relay 2CR.

After energization, contact 14CR1 of relay 14CR is closed whereby relays 6CR and 14CR remain energized through the holding circuit consisting of normally closed contact 2TR–5 of shutdown timer 2TR and the now closed contact 14CR1.

Energizing of relay 6CR will close its contacts 6CR1 and 6CR2. With contact 6CR1 closed, the brush motor MOT–4 used to drive the brush 71 of the drum cleaning device 70 is energized through this contact and the normally closed contact 2TR3 of shutdown timer 2TR. Power is also supplied through this same circuit to the high voltage power supplies PS1 and PS3. Power supply PS1 is a high voltage power supply for the corona charging device 21, transfer device 51 and preclean device 66. Power supply PS3 acquires its primary power from power supply PS1 and is used as a high voltage power supply for development electrode D.E. of the developer apparatus 30, the voltage being supplied to the development electrode being controlled by a humidity sensing switch 25LS, not described in detail since it forms no part of the subject invention.

In addition, power is also supplied to energize the discharge lamp LMP–1 through ballast L–1, to energize the brush exhaust blower motors MOT–5 and MOT–6 used to drive exhaust blowers, not shown, of the drum cleaning device 70, a vacuum blower motor MOT–8 used to drive a vacuum pump, not shown, connected to endless conveyor 55 and conveyor 65, and a fluffer motor compressor MOT–9 driving a compressor, not shown, to supply pressurized air to the sheet feed device 40, the inlet side of this compressor being connected to the suction feet of the sheet feed device and valve 316, as previously described.

With the closure of contact 6CR2, a circuit is closed to energize motor MOT–7 used to drive a vacuum pump, not shown, connected to paper transport 44, the main drive motor MOT–2, motor MOT–3 used to drive paper transport 44, sheet feed device 40 and developer assembly 30 through normally closed contact 2TR3 of shutdown timer 2TR and previously closed interlock switches 13LS and 26LS suitably positioned to be closed when the developer assembly 30 is in operative position with respect to the xerographic drum 20. The latter circuit also provides power to relay 10CR which, in turn, provides B+ to the programmer 5TR through its now closed contact 10CR2 and normally closed contacts 21CR2 or 22CR2 of relays 21CR and 22CR, respectively. When relay 10CR is energized, its normally closed contact 10CR1 is opened which is in series with normally open contact 9CR1 of relay 9CR. Relays 21CR and 22CR are controlled by a platen interlock system, which will be discussed later, but whether the platen 2 is up or down, either one or the other of these two contacts will be energized. As soon as the contact 10CR2 closes, as relay 10CR becomes energized, the indicator lights, to be described, of the programmer 5TR light up. Relay 28CR is energized through normally closed contact 2TR2 of shutdown timer 2TR, closing its contacts 28CR1 and 28CR2 to supply power to ballast L–3 thereby energizing the exposure lamps LMP–2, LMP–3, LMP–4, LMP–5, LMP–6, LMP–7, LMP–8, LMP–9, LMP–10, LMP–11, LMP–12 and LMP–13.

When relay 14CR was energized, its contact 14CR3A was also closed, closing a second circuit to the puffer compressor motor MOT–13 whereby this motor now runs continuously. This in effect, overrides the previous control by pressure limit switch 21LS of the operation of this motor. Power is also now available to the circuit controlling the operation of motor MOT–10 used to drive the toner dispenser, this circuit including timers 6TR and 4TR, to be described hereinafter.

Other functions of the machine are energized in timed sequence from a bank of cam actuated limit switches, that is, a miss-puff pulse limit switch 2LS, a paper feed switch 5LS, a count pulse limit switch 7LS, and abort reset switch 10LS, a delay limit switch 11LS, a puffer pulse switch 12LS, a platen interlock switch 16LS, platen interlock switch 18LS, jam detect switch 28LS and jam detect switch 29LS. The cams actuating these switches are fixed on a timing shaft 550 for rotation in synchronization with the rotational speed of the xerographic drum 20, and this shaft is driven by the main drive motor MOT–2, as previously described. As this shaft is rotated to rotate the actuating cams, the first switch actuated is the delay limit switch 11LS. This switch is used to control the machine operation sequence, and it also provides a time delay to insure that the power supply PS–1 is in operation to charge the drum by means of a corona charging device 21, and this switch also insures that the paper is fed by the sheet feed device 40 at the right time in the machine cycle. When the delay limit switch 11LS is closed, this completes a circuit to control relay 4CR through normally closed contacts 7CR2 of relay 7CR, and a circuit is also completed to control relay 23CR closing its contacts 23CR1, 23CR2 and 23CR3. One of the contacts of relay 23CR, that is, contact 23CR1 completes a holding circuit to maintain relays 4CR and 23CR energized, and the other contact 23CR2 is used for a jam detection circuit which will be described hereinafter. When relay 4CR is energized, its three contacts are actuated for the following purposes: (1) contact 4CR2 sets up part of a circuit to the paper feed solenoid SOL–1; (2) contact 4CR3 is used in the platen interlock circuit to indicate if the machine is being operated with the platen cover open for a purpose to be described, and it is part of the circuit used to energize the copy lights LMP–35, LMP–36, LMP–37, LMP–38 and LMP–39; (3) contact 4CR1 is used to give a delay for an abort level indicator, which will be described hereinafter.

The next cycling switch actuated is paper feed limit switch 5LS which is used to complete the circuit to energize the paper feed solenoid SOL–1 with a predetermined time interval pulse of energy. At the same time the electrical cycle counter M2 is also energized. The paper feed solenoid SOL–1 connected to a lever system previously described, releases the paper feed clutch 381 of the sheet feed device 40. Release of the paper feed clutch 381 effects a sheet feed cycle, the sheet being fed to the paper transport 44 and roller 42 which advance the sheets sufficiently so that further advance of the paper is effected by paper transport 44. Assuming that only a single sheet has been advanced by the sheet feed device 40, advancement of this sheet by paper transport 44 will actuate a count pulse switch 8LS closing its contact 8LSA and opening its normally closed contact 8LSB. Opening of contact 8LSB prevents the reject solenoid SOL–3 from becoming energized. Contact 8LSA is in series with count pulse switch 7LS to the programmer 5TR, thereby setting up the circuit to the programmer, which circuit is still open because count pulse switch 7LS is still open. A short time after the sheet has actuated count switch 8LS, the count pulse switch 7LS is actuated. Closure of count pulse switch 7LS completes the circuit to the programmer 5TR, to provide a pulse to this programmer. It is noted that all of the cycling switches give an electrical pulse of a predetermined time interval.

The sheet is further advanced by paper transport 44 to the sheet registration device 45 contacting register switch 1LS, and then it is advanced by the sheet registration device 45 into contact with the xerographic drum 20 and as it passes adjacent to the corona transfer device 51 the paper will adhere to the xerographic drum electrostatically and would continue to rotate with the drum unless it is removed by the paper pick-off device 52. At this time, the trailing portion of the sheet is still in contact with register switch 1LS. The operation of the paper pick-off device is effected by a puffer solenoid SOL–2 operated valve, not shown, controlled by the puffer pulse switch 12LS which is actuated at this time to produce a puffer pulse. Contact 1LSA is part of this circuit and this contact will be closed because the sheet is still in contact with register switch 1LS.

After the sheet is puffed off the drum onto endless conveyor 55, it will be advanced by this conveyor and the sheet will contact a miss-detector switch 3LS. The miss-detector switch 3LS has a normally closed contact 3LSB, which when the sheet actuates 3LS will open a circuit, otherwise closed when the miss-puff pulse switch 2LS is actuated at this time, it being noted that the trailing portion of the sheet is still in contact with register swich 1LS keeping contact 1LSA closed. Miss-detector switch 3LS being actuated at this time opening contact 3LSB, prevents control relays 2CR and 8CR from being energized to shut down the machine, which would happen if the sheet was not puffed off the drum. A normal puffing of the sheet from the drum prevents machine shutdown.

A sheet carried by endless conveyor will be advanced to the fuser 60 and then onto the inclined conveyor 65 for discharge from the machine.

Referring again briefly to the programmer 5TR, it is used to control the number of reproductions to be reproduced. With this programmer, the operator may select the number of reproductions to be made through the use of indicator dials on the control panel. Assuming that the operator has set the programmer for the machine to make five reproductions, as each sheet onto which the document is to be reproduced is advanced, the count pulse switch 7LS is actuated and through closed contact 8LSA steps a circuit within the programmer 5TR until the fifth sheet at which time coincidence is reached with the preset number to produce an electrical signal within the programmer to energize shut down relay 7CR through wire W108. The shut down relay 7CR may also be energized by closure of stop switch SW5.

Shut down relay 7CR will remain energized for a preset time interval through the programmer until B+ power is removed from the programmer.

In addition, when shut down relay 7CR is energized, its contacts 7CR1 and 7CR3 close, while contact 7CR2 opens, contact 7CR1 completing a circuit through print switch contact SW–4B to shut down relay 7CR. Opening print switch contact SW–4B at this time would not drop out shut down relay 7CR because it will remain energized through another circuit in the programmer for the above-described time interval until the contact 10CR2 is opened removing B+ power to the programmer.

Opening the contact 7CR2 will drop out relay 4CR, opening the circuit to the paper feed solenoid SOL–1 which prevents further feeding of sheets by sheet feed device 40, and closing of contact 7CR3 will complete a circuit to energize the shutdown timer 2TR, a four sequence shutdown timer.

The first sequence that occurs is the closure of its contact 2TR1 completing a circuit to the "ready" lights LMP–30, LMP–31, LMP–32, LMP–33 and LMP–34, indicating to the operator that the machine is ready for another document. Contact 2TR2 opens de-energizing relay 28CR to cause its contacts to open to shut off the exposure lamps.

The second sequence that occurs is the opening of contact 2TR3 to shut off the developer drive motor MOT–3 and toner drive motor MOT–10, and to de-energize timer 6TR, timer 4TR and relay 10CR. When relay 10CR is de-energized, its contact 10CR2 opens to remove B+ power from the programmer 5TR, the indicator lights of the programmer remaining on. Shut down relay 7CR is no longer energized through the programmer. The operator can now depress the print switch SW–4 to open contact SW–4B to open the circuit to shut down relay 7CR to start another print cycle.

The next shutdown sequence is the opening of contact 2TR4 to break the circuit to the brush motor MOT–4 and power supplies PS–1 and PS–3.

The last shutdown sequence occurs when contact 2TR5 opens to de-energize relays 6CR and 14CR shutting off the machine and returning it to the "stand-by" condition. This last sequence occurs after a sufficient time interval from the start of machine shutdown to permit the last sheet to be discharged from the machine.

In the event that multiple sheets are fed instead of a single sheet by the sheet feed device 40, the multiple sheet sensing switch 9LS will be actuated by the previously described multiple sheet sensing device 433, which senses the thickness of more than one sheet advanced by the sheet feed device to paper transport 44. The multiple sheet sensing switch 9LS used in conjunction with relay 17CR, is allowed to close through the mechanism previously described, to close a circuit to energize relay 17CR to close its contacts 17CR1 and 17CR2. Closure of contact 17CR2, along with the normally closed contact 8LSB of count switch 8LS completes a circuit to energize the reject solenoid SOL–3 to bring the reject fingers 426 into the paper path causing the sheets to fall from paper transport 44 into the reject or abort tray 445.

The relay 17CR is held energized through its contact 17CR1 and contact 10LSB of multi-feed reset switch 10LS actuated at the proper time sequence, when the trailing edge of the sheets are past the pivot point of the reject fingers, to open contact 10LSB to de-energize relay 17CR.

SPECIAL CIRCUITS

To provide for machine shutdown in the event of a miss-puff, the sheet which is miss-puffed has contact with register switch 1LS but because of the miss-puff the sheet remains on the drum out of contact with the miss detector switch 3LS. Since the sheet has not reached the miss detector switch 3LS its contact 3LSB remains closed and when the miss puff pulse switch 2LS is actuated this completes a circuit to energize relays 2CR and 8CR to shut down the machine.

In addition to the above there are also four areas of jam detection in the machine as shown schematically in FIG. 34.

Whenever a jam or miss-puff occurs, relays 2CR and 8CR are energized and shut off the machine as explained previously due to a miss-puff. Contact 2CR2 opens the circuit to relays 6CR and 14CR shutting off the machine. Contact 8CR2 opens the circuit to the ready lights. Contact 8CR1 energizes relay 9CR which holds the count on the programmer. Contact 9CR3 keeps power to the platen interlock circuit when the doors are opened to clear the jam or miss-puff. Contact 9CR2 keeps the B+ circuit closed in the programmer when contact 10CR2 drops out due to the machine shutting off. Contact 9CR1 provides a holding circuit to the coil of relay 9CR when contact 8CR1 opens. Contact 2CR3 is used to insure that the count is not lost on the programmer due to the fact that there is a race between the closing of contacts 9CR2 and 10CR2. Contact 2CR3 prevents this race. Contact 2CR1 provides the holding circuit for the relays 2CR and 8CR through the drawer interlock switch 22LS which has its contact 22LS1 closed when the drawer is in. In parallel with relay 9CR is relay 29CR which along with its normally closed contact 29CR1, resistor R–9 and capacitor C–11 acts as an oscillator, the contact 29CR2 opens and closes causing the "call key operator" lights LMP–15, LMP–16, LMP–17, LMP–18 and LMP–19 to blink. After a jam or miss-puff occurs the machine shuts off and the "call key operator" lights blink. The operator opens the doors, pulls the drawer out which drops out relays 2CR and 8CR and then the operator clears the paper jam. The operator then engages the drawer, shuts the doors, pushes the "on" switch SW1A and the ready light comes on after the fuser gets up to temperature. The operator then presses the start button, relay 9CR drops out, but relays 14CR and 10CR are energized before relay 9CR drops out, as this is a time delay relay, and the machine starts to run from where it left off as the count was maintained on the programmer.

The operation of each jam detection circuit is as follows:

*Sheet feed area.*—At the sheet feed device 40 there is an illuminating lamp LMP–40 for photocell P–3 connected in series with relay 26CR. Immediately after the multiple sheet sensing device but before the reject fingers of paper transport 44 is another photocell P–2 illuminated by lamp LMP–41, photocell P–2 being connected in series with relay 25CR. The contact 26CR is open when no paper is fed and the contact 25CR is closed when no paper is being fed past photocell P–2.

Contacts 25CR and 26CR and the jam detect switch 29LS are in series with the coils of relays 2CR and 8CR. Contact 23CR2 is closed when the machine is running only, and prevents feedback circuits when the machine is off. Therefore, when a piece of paper is fed 26CR contact closes because relay 26CR drops out when paper passes by P–3 and contact 25CR opens when a piece of paper passes photocell P–2. At this time the jam detect switch 29LS is pulsed, but nothing happens as there is no paper jam. If there had been a paper jam, the sheet would not have reached the photocell P–2 and then contact 25CR would have remained closed and then when jam detect switch 29LS was actuated, relay 2CR and 8CR coil would be energized shutting off the machine.

*Paper transport.*—This system consists of jam detection switch in the paper path of paper transport 44, 27LS slightly ahead of count switch 8LS, and sheet registration switch 1LS in the sheet register device 45 and a jam pulse switch 28LS. A piece of paper actuates switch 27LS and then travels on and actuates switch 1LS and then the jam pulse switch 28LS is pulsed, and nothing happens. If the paper did not get to sheet registation switch 1LS the machine would shut off, because switch 1LS would remain closed and 27LS and 28LS being closed would complete a circuit to energize the relays 2CR and 8CR.

*Sheet registration device to conveyor 55.*—This system consists of switches 1LS and 3LS, the latter located in conveyor 55 and the miss-puff pulse switch 2LS. This circuit operates the same as the previous circuit described above.

*Fuser area.*—This system consists of a fuser jam detect switch 30LS, a switch located just before the rolls of fuser 60; relay 24CR, photocell P–1 located after the fuser rolls, lamp LMP–42 and multi-feed reset switch 10LS. The lamps for the jam detection circuit are connected to the secondary T–2B of transformer T–2.

Toner control timers 6TR and 4TR control the operation of the toner dispenser drive motor MOT–10. Timer 4TR is a motor driven timer. The contact for 4TR closes for a preset time interval every 4 minutes of machine operation. Closing of the contact of 4TR supplies power to relay 6CR which is an electronic timer. Timer 6CR is adjustable for 0 to 10 seconds.

The toner dispensing cycle continues all the time the machine is running, that is, every four minutes the toner dispenser drive motor MOT–10 will be operated for from 0 to 10 seconds continuously as controlled by timer 6TR. There is also an additional timer 3TR which is a timer used to control the toner dispenser drive motor for high rate dispensing. This runs the toner dispenser for a longer period of time than the previously described 0 to 10 seconds interval. This additional control is effected by the operator pressing the "increase" button of switch SW7. Pressing the switch SW–7 closes its contact to energize relay 13CR which holds itself in through one of its own contacts 13CR1 and contact 3TR1 of timer 3TR. When relay 13CR is closed, the motor MOT–10 is energized through the now closed contact 13CR2. Contact 3TR1 closes and stays closed for another preset period of time. Timer 3TR is a motor driven timer and is held in through contacts 13CR3, 10CR3 and 3TR2. This dispensing of toner for the second preset period is over and above what the timer 6TR will provide. Contact 3TR2 is actuated just before this timer stops to insure that it will operate long enough to open up contact 3TR1 to drop out relay 13CR.

Relay 30CR, and limit switches 3LSA, 32LS and 33LS comprise a tentative circuit at this time. This is to insure that the fuser rolls are at the proper operating temperature before the paper is advanced to the fuser. Two switches 32LS and 33LS are actuated when the rolls of the fuser are in operating relation to each other. A piece of paper advancing along conveyor 55 hits switch 3LS to close contact 3LSA, and if the fuser rolls are not in operative relation a circuit would have been completed to energize relay 30CR.

*Paper feeder elevator or index motor circuit.*—This circuit includes the index motor MOT–1 controlled by paper feeder up index limit switch 14LS actuated by a sheet sensor bar 327, previously described. With the up contact SW6A of index switch closed, a circuit is partly completed through normally closed contact 3CR1B of relay 3CR, the only break in this circuit being the contact 14LSA of index switch 14LS. However, as sheets are fed from the stack of sheets, the sheet sensor bar 327 will drop sufficiently to actuate switch 14LS closing its contact 14LSA to energize the index motor MOT–1 to raise the stack until the sheet sensor bar is disengaged from the index limit switch 14LS. This cycle of operation continues during normal operation of the machine.

If the supply of paper is nearly exhausted the "low" paper limit switch 4LS is actuated closing its contact which completes a circuit to energize relays 3CR and 12CR.

As this occurs, contact 3CR1A closes and contact 3CR1B opens to establish a holding circuit to relays 12CR and 3CR through the closed up contact SW6A and contact 3CR1A. Contact 12CR1 closes and provides power to the "down" portion of the elevator motor through the down limit switch 15LS, normally closed. Now the motor operates to lower the paper tray 41 until the down limit switch 15LS is actuated to break this circuit. Contact 3CR2 now closed, completes a circuit to relay 27CR through the contact of tray up interlock switch 31LS, mechanically in parallel with index switch 14LS. As soon as the paper tray starts to go down, tray up interlock switch closes 31LS as does index switch 14LS because the sensing bar drops down on this switch and switch 4LS opens. Relay 27CR will remain energized through its now closed contact 27CR1 and the switch 31LS. Contact 27CR2 of this relay opens breaking the circuit to the "ready" lights and contact SW4A of the print switch. In addition, the contact 12CR2 closes to complete a circuit to the relay 7CR to shut down the machine, as previously described. The machine is shut off but the programmer 5TR does not go off and it will hold the count. This is done with contact 3CR3 which is a series with relay 9CR so this circuit holds the counts in the programmer.

The operator must now load additional paper in the paper tray 41 and then press the up button of switch SW6, to momentarily open the contact SW6A, normally biased into a closed position, to break the circuit to relays 3CR and 12CR, the low paper limit switch 4LS opening as soon as the paper tray was lowered. The up index limit switch 14LS again takes over control of this motor until the sensing bar is again lifted out of contact with this switch 14LS to open its contact stopping the upward progress of the paper tray as determined by the height of the stack of paper positioned on the tray. Lifting of the sensor bar will also open switch 31LS breaking the circuit to relay 27CR, allowing its contact 27CR2 to again close to complete the circuit to print switch SW4A and the ready lamps. Switch 24LS is an interlock switch which prevents machine operation unless the deflector of the sheet feed device has been placed in operative relation to the stack after paper has been reloaded.

The operator can also lower the paper tray to add paper by depressing the down button for index switch SW6 to close the contact SW6B which completes a circuit to relays 12CR and 3CR, the index motor then being energized through the circuits previously described.

The purpose of rectifiers SR3, normally closed contact 14LSB and capacitor C7 is to provide a holding torque on motor MOT-1 when it is not operating.

An indicator circuit is also provided to detect the height of the stack of aborted paper accumulating in the reject tray 445. This circuit includes a photocell P4, lamp LMP-43 and relay 31CR. When the amount of paper in the tray reaches a predetermined height it interrupts the beam of light to the photocell P4 opening the circuit to de-energize relay 31CR. Contact 31CR1 then closes and when the next sheet of paper on transport 44 contacts count switch 8LS, the contact 8LSA closes completing a circuit to energize relay 7CR to time out the machine as previously described. At the same time normally closed contact 31CR2 opens, this contact being in series with normally open contact 4CR1 of relay 4CR.

PROGRAMMER

The function of the programmer 5TR which is a combination of a three digit present counter and a multiple stepped programming circuit is to actuate the billing counter or registering device M-1 in accordance with a predetermined program wherein a short run of xerographic reproduction on the machine will result in a relatively high cost per reproduction to the customer and a relatively low cost per reproduction for higher production. Since the machine is particularly adapted for high production, it use in this capacity should be restricted to reproducing copies of a document in relatively high numbers. Consequently, the program under which the programmer 5TR operates is such that it is more economical to reproduce many copies of a particular document rather than to reproduce only a few copies, for example, one to ten copies of the document. As will be described hereinafter, the cost to produce a reproduction is reduced in steps as prearranged by the circuitry in the programmer as the number of reproductions increases.

In the embodiment shown, the programmer 5TR is adapted to receive and input pulse for each sheet of paper upon which a reproduction is to be made and to actuate a relay which in turn advances the billing counter one unit for each relay actuation and in accordance with this sequence: for the first, second, third and fourth input pulse to the programmer, there will be ten relay closures for each of the pulses; for the next four input pulses, there will be six relay closures per input pulse; for the next twelve input pulses there will be three relay closures for each input pulse; and, for every odd number of input pulses occurring thereafter up to the four-hundred and ninety-ninth reproduction, there will be one relay closure for each of the odd number of pulses. After the programmer has counted the four hundred and ninety-ninth reproduction of a single document it will revert back to its initial condition, the xerographic machine will automatically shut down and the above-described sequence will again be in control.

In effect then the billing counter M-1 will be advanced ten units for each reproduction for the first four reproductions or to a first step total of forty units when only four reproductions are made of a particular document. For each copy after the fourth copy and before the ninth copy, the billing counter will advance six units per copy or to a second step total of twenty four for the next four copies. Reproducing between nine and twenty reproductions in the third step of the sequence, the billing counter advancement will be three units per reproduction after the eighth reproduction. Any reproduction after the twentieth during the fourth step of the sequence will advance the counter one unit for each of two copies reproduced. It will be apparent then that the billing counter will advance a total of 100 units when the machine reproduces twenty copies, will advance a total of 101 for the twenty-first copy, will advance a total of 102 for the twenty-third reproduction, and so on, in the example described.

From the foregoing, it will be apparent that as the cost per reproduction decreases in definite steps as the total number of reproduction increases, the machine becomes more economical as the production rate for each document becomes greater. While the programmer, as illustrated in FIGS. 33*a*, 33*b* and 33*c* is arranged to provide the four step sequence enumerated above, the number of steps in the sequence and the number of relay closures per input pulse may be varied.

For a general description of the operative functions of the programmer 5TR and its cooperative integration with the control circuits for the xerographic machine, attention is directed to the schematic diagrams of FIGS. 33*a*, 33*b* and 33*c*. The programmer is supplied with electrical power of 115 volts, A.C. at 60 cycles from the main wires W1 and wire W47, connected to terminals 900 and 901 respectively, which, in turn, are connected to the primary winding of a power supply transformer T-10.

As previously stated, when the machine "ON" button SW1A is depressed, power is supplied to the power relay 19CR. This energization closes contact 19CR2 which connects the wire W47 to the main power line W2. Thus, with the machine in "Stand-by" condition the primary winding for the transformer T-10 is energized to provide power for the filaments and other electrodes for the various electronic tubes in the programmer. Specifically, the programmer circuitry includes three indicator tubes V4, V5 and V6 which are preferably of the type disclosed in the patent to J. H. McCauly et al., Patent No. 2,906,906, and five multiposition beam switching tubes V7, V8, V9, V10 and V11, preferably of the type disclosed in the patent to Sin-Pih Fan et al. Patent No. 2,721,955.

In order to provide filament power and electrode voltage to these tubes, the transformer T-10 is provided with a secondary winding T-10A which is suitably connected to the filaments for the tubes V4, V5 and V6, and to the cathodes for the beam switching tubes V7, V8, V9, V10 and V11.

Another secondary winding T10B is connected to a full-wave rectifier circuit 902 for producing approximately 200 volts D.C. to a main bus wire 903. A wire 904 conducts the output of the rectifier circuit 902 to the respective plates of the indicator tubes V4, V5 and V6, and also to the shields for the beam switching tubes V8, V9 and V10. Another wire 905 connects the bus wire 903 to the shields for the beam switching tubes V7 and V11 by way of a terminal 906.

With the transformer T10 energized, thereby providing electrical power to the electrodes described above, the programmer 5TR is in "Stand-by" condition, as is the xerographic machine. Each of the indicator tubes V4, V5 and V6, has associated therewith selector switches S1A, S2A and S3A, respectively. Each of the switches may be manually manipulated to one of ten positions and, as shown in FIG. 25, suitable indicators S1B, S2B and S3B may be provided for indicating the selected position between zero and nine for each of the switches S1A, S2A and S3A, respectively. The indicator tube V4 is electrically associated with the beam switching V8 and is utilized as the units counter for the present programmer. In like manner, the indicator tube V5 is electrically integrated with the beam switching tube V9 and is utilized to count in decades of the input pulses. The indicator tube V6 is electrically integrated with the beam switching tube V10 and is utilized as the hundredths counter in the program.

As shown in FIG. 35, the selector switch S3A for the hundredths counter circuit is positioned at "1" thereby presetting the circuit to count at least one hundred input pulses. The selector switch S2A for tens counter circuit has been preset for "6," thus indicating that six decades of input pulses in addition to the one hundred preselected in the hundredths will be counted. In the units counter, the selector switch S1A has been actuated for the preselection number of "5," resulting in a combined total of "165" which, for the present description, will correspond to an example of operation of the programmer.

With the programmer in stand-by condition and the number of copies or reproductions set into the programmer by means of the selector switches S1A, S2A and S3A, the operator depresses the "Start" button SW4A to commence operation of the xerographic machine and the counting by the programmer 5TR. Pressing the "Start" button closes the circuit to the relay 10CR which when energized closes one of its contacts 10CR2. As will be described hereinafter, the switch contact 10CR2 is in series with a platen interlock switch 21CR2 which is closed when the platen has been lowered into position just previous to the scanning of a document. With the switch contact 10CR2 closed, a connection is made between the terminal 907 connected to the bus wire 903 and a terminal 908 in the reset circuit generally indicated by the reference numeral 909 and which are respectively connected to the wires W114 and W115 in the machine control circuit.

When the terminals 907 and 908 are closed, or rather a connection made therebetween, the bus wire 903 is connected to the spades in the beam switching tubes V7, V8, V9, V10 and V11 through a circuit to be described hereinafter. This connection thereby provides B+ voltage to the beam switching tubes which, as will also be described hereinafter, resets the indicator tubes to their zero conditions.

The programmer is now in condition to count the input pulses which correspond to the number of reproductions being made by the xerographic machine and to actuate the register mechanism or billing counter M–1 in accordance with the prearranged sequence. When the programmer has counted the preselected number of reproductions to be made which, in the example illustrated in FIG. 35, is "165" reproductions, the programmer will initiate the return of the xerographic machine to its "Stand-by" condition for further action by the operator.

Input pulses of 50 milliseconds are fed into the programmer once every 1.5 seconds which corresponds to the production rate of the xerographic machine, that is, a sheet of paper is fed to the paper transport 44 from the sheet feed device 40 every 1.5 seconds. As a sheet of paper is conveyed along the paper transport, it engages and actuates count pulse switch 8LS, previously described. During this actuation of switch 8LS, the count pulse switch 7LS is pulsed, also previously described. The switches 7LS and contact 8LSA are connected in series with line voltage by their connection with wires W1 and W47. With contact 8LSA and switch 7LS closed at the same time, a burst of 115 volts is fed into the programmer by way of a count converter circuit generally indicated by the reference numeral 910. This burst will energize a neon lamp NE–1 positioned adjacent a pair of photocells P–5 for converting the electrical pulse into a resistance change in the photocells. The change in resistance of the photocells is utilized to trip a counter driver generally indicated by the numeral 911 and comprising a twin triode tube V2, such as a 6211A tube. For each action by the count driver, two functions are performed. The first function is the generation of a pulse which causes the counter chain comprising the indicator tubes V4, V5 and V6 to register a count. The second function is to provide a pulse to a selector circuit generally indicated by the reference numeral 912, which in turn will cause a pulse programmer or gate programming circuit, generally indicated by the reference numeral 913 to operate (see FIG. 33*b*).

The counter chain circuit accepts input pulses from the count driver V2 and advances one count for each input pulse and the total accumulated count is continuously displayed on the indicator tubes V4, V5 and V6. As shown in FIG. 35, the indicator tubes are displaying the number "147" which is indicative that this number of reproductions have been produced so far for the example illustrated.

Normally, or in those instances when the count converter 910 is not producing an input pulse, the grid of the triode section V2A is held positive. This is accomplished by the connection of this grid to the junction of the resistance element in the photocells P–5 and a resistor R14 which is in series between the grid and the high voltage bus wire 903. During this time, the plate for this triode section is conducting and the plate for the triode section V2B is at approximately 200 volts because of its connection to the bus wire 903 by way of the wire 904. When the limit switches 8LS and 7LS are actuated, the neon lamp NE–1 is illuminated causing the resistance of the photocells P–5 to fall. When the voltage at the junction of the resistor R14 and the photocells falls to within about 6 volts of the reference voltage at the plate for triode section V2B, which is established by the voltage divider comprising resistors R16 and R17 and their series connection to the 200 volt source terminal 906, the plate of V2A draws current and a negative pulse is applied through a capacitor C3, to the grid of triode section V2A. This produces a negative signal at the grid which is applied by way of a resistor R123 and capacitors C4 and C5 to the odd switching grid G*o* and the even switching grid G*e* of the units switching tube V8, causing it to step one position. Simultaneously with the production of the negative signal, a positive signal is also produced and is applied to the gate programmer circuit 913 which will be described hereinafter.

In order to understand the step-by-step switching action of the beam switching tube V8 a brief description of the circuitry for the tube V8 will now be made. The beam forming elements or spades for the tube V8 are connected in odd and even groups. Each spade of the odd group is connected through a resistor to a common wire 914 which, in turn, is connected through a resistor R20 to a supply of voltage of approximately +70 volts. This voltage is provided by means of a wire 915 and terminal 916 which connect the resistor R20 to a voltage divider comprising resistors R67 and R68 in the reset circuit 909. The voltage divider has its ends connected between ground and the source wire 904 when switch contact 10CR2 is closed and the terminals 907 and 908 are joined. Each spade of the even group is connected through a resistor to a common wire 917 which is connected through the resistor R19 to the wire 915. The odd grid G*o*, which causes switching to an even position, is connected to the junction of the resistor R20 and the odd spade resistors by way of the bias resistor R22. The even spades are similarly connected through resistors for each of the even spades and the resistor R19 and the even grid G*e* is connected to this junction by way of the bias resistor R21.

From FIG. 33*a* it will be seen that the beam formed in an even position, that is, 0, 2, 4, 6, 8, spade holding current will flow through the resistor R19 and with the beam formed in an odd position, spade holding current will flow through the resistor R20. Thus, if the beam is in an even position, say position "0" then the spade "0" will be at zero volts, the common even spade wire 917 at about +42 volts and the common odd spade wire 914, because no current is being drawn by the odd spades at +70 volts. The even grid G*e* is then biased by way of R21 and +42 volts and the odd grid at +70 volts. If there is then applied a 60 volt negative pulse of a short duration, say 10 milliseconds, to both grids G*o* and G*e*, the beam will easily transfer from the even position "0" to the odd position "1" because the even grid which controls switching to an odd position has been driven to −18 volts with respect to the cathode. The odd grid G*o* however, has been driven only to +10 volts and because of finite switching time is at about +30 to +40 volts when the beam is in the odd position "1." This level of the grid prevents further switching action.

With the situation reversed, and spade holding current flows in resistor R19, the odd grids will be at +42 volts while the even grids will be at +70 volts. The next succeeding impulse of negative 60 volts will thus cause the beam to advance to position "2" and no further. In position "2" the spade holding current flows through the resistor R20 and the initial conditions are restored. The units count continues in this manner until it again reaches position "0" which then corresponds to the tenth reproduction produced by the machine. At this time a full +70 volt pulse developed across the resistor for the "0" spade and the resistor R19 is applied by way of the capacitors C17 and C18 to the odd grid TG*o*, and the even grid TG*e* for the tens beam switching tube V9. Since the tens tube is connected exactly as the units tube, this tube will switch from its "0" position to the position "1". For each complete switching cycle of the units tube V8 from its "0" position back to the "0" position, the tens tube V9 will advance one position. Similarly, for each complete cycle of the tens tube V9 from its "0" position back to the "0" position will advance the hundredths tube V10 one position. For the illustrated example of "165" reproductions, when the hundredths tube reaches its "1" position and the tens tube reaches its "6" position and the units tube reaches its "5" position, the counter chain will be in coincidence with the preset circuit and the machine will automatically time out.

The ten output electrodes or targets for the units tube V8 are connected to the corresponding numbered cathodes of the indicator tube V4. This tube will glow because of the electron current flowing through a target and then by way of the corresponding numerically shaped cathode through a resistor R9 and to the approximately +200 volt source wire 904. This current produces a voltage level at the conducting target for the tube V4 of about +50 volts, and it is this voltage drop that is used for the counting circuit as well as the programmer gate 913 and selector circuit 912. Similarly, the tens counter tube V5 and the hundredths counter tube V6, are similarly connected to numerically shaped cathodes for producing illumination of these indicator tubes.

The overall preset circuit comprises a preset driver V1, in the form of a twin triode, such as a 6211A tube, a reed relay K1, the preset selector switches S1A, S2A, S3A and an "and" gate consisting of the diodes D1, D2, D3 and the resistors R3, R6, R7 and R8. As previously stated, the selector switches S1A, S2A and S3A have been set to the number "165" which, for illustration purposes, in a typical example, will be the number of reproductions to be reproduced in the xerographic machine. The grid for the triode section V1A is connected by way of a terminal 918 through the resistor R136 to the source 904 by way of the three branch "and" gate circuit comprising the combinations D1–R6, D2–R7 and D3–R8. This connection holds the grid in a slightly conducting condition and current will flow to the plate which is connected through resistor R1 and the source terminal 906.

As each digit on the indicating tubes V4, V5 and V6 is matched to the selected digit as set by the appropriate selector switch, a level of +50 volts is applied from the corresponding target, through the particular selector switch to the anodes of the diodes D1, D2 and D3. When the indicator tubes V4, V5 and V6 are indicating the number "165," the counter circuit is in coincidence and all the inputs to the "and" gate are in their prescribed state. Since the junction of the resistor R136 and diodes is nominally held at from +170 to +120 volts with a level of 150 volts reverse biased, the potential at the junction of the resistor R136 and diodes falls to +50 volts, when the counter circuit is in coincidence and all the three branches of the "and" gate have been energized. With a potential of approximately +90 volts at the grid for the triode section V1B, established by the bleeder resistors R2 and R4, the plate for the triode section V1B is caused to conduct and the relay K1, which has its relay coil in series with this plate, closes. As was described in a preceding section concerning the electrical circuit to the xerographic machine, closing of the relay K1 connects the wire W108 to the wire W47 resulting in the energization of the relay 7CR. This action will cause shutdown of the machine and the placement thereof in "Stand-by" condition. It will be apparent then that the closure of the relay K1 terminates the reproduction process of the xerographic machine when the preset number of copies to be made which, in the illustrated example is "165," has been attained.

The reset circuit 909 will cause the three counters comprising the pairs of indicator tubes and corresponding beam switching tubes and the programmer gate 913 to reset or return to their "0" indicating positions upon removal and reapplication of the connection between the terminals 907 and 908. As previously stated, with the terminals 907 and 908 open, no B+ voltage is applied to the beam holding electrodes for the beam switching tubes. When the terminals 907 and 908 are closed, current will flow in the resistors R61, R62, R64 and the zener diode D4. This will cause a +70 volt potential to be established at the common junction, shown in FIGS. 33*a* and 33*b* by a wire 919 and the terminal 916, of the resistors R111, R112, R63 in the reset circuit; resistors R47, R48 in the circuit for the tube V10; resistors R33, R34 in the circuit to the tube V9; and resistors R19, R20 in the circuit for the tube V8. Simultaneously, the connection between the terminals 907 and 908 provides a charging current for the resistor and capacitor combination R112–C6, thereby causing a drop across the emitter base of the resistor R113 and transistor Q1. The time constant for the R112–C6 combination is such that the transistor Q1 will conduct for approximately 5 milliseconds after application of the B+ voltage. The collector for the transistor is thus at ground potential through the resistor R114 for about 5 milliseconds after voltage has been applied to the beam holding elements of the beam switching tubes V8, V9 and V10 and the programmer gate tube V7. The cathodes for the beam switching tubes V7, V8, V9, V10 and V11 are connected to a terminal 920 which is connected to ground through the resistor R114. This ground potential is also applied to the "0"

spades of the switching tubes V8, V9 and V10 through the diodes D8 by way of terminal 921, D7 by way of terminal 922, D6 by way of terminal 923 and D5, respectively, and causes them to form and lock a beam in the "0" position. After approximately 5 milliseconds the transistor Q1 stops conducting and the beam current of the four beam switching tubes V7, V8, V9 and V10 flows in the resistor R114 and causes the transistor to be held reversed biased by about one volt through the resistor R113, and the collector for the transistor returns to +70 volts. The diodes D5, D6, D7 and D8 will now become reversed biased and will no longer affect the circuit. Removal and reapplication of the connection between the terminals 907 and 908 effect the resetting of all beam switching tubes to their "0" position and thus condition the programmer 5TR for a restart of its operation. As will be described hereinafter, an arrangement of interlock switches are provided for breaking and making the connection between the terminals 907, and 908 under certain circumstances during operation of the xerographic machine.

As previously stated, when the triode section V2A of the count driver 911 produces a negative pulse on the grid thereof in response to an input pulse from the count converter 910 for causing switching of the units switching tube V8, a negative pulse is also developed across the resistor R13, connected in series with the plate for the section V2A. This negative pulse is fed from a terminal 924 through a wire 925 to a pulse network in the selector circuit 912 comprising capacitor C63, resistor R96; capacitor C64, resistor R97; capacitor C66, resistor R99; capacitor C81, resistor R137 by way of a programmer gating circuit which will be described hereinafter. This negative signal will cause the tube V11 in the output pulse counter generally indicated by the reference numeral 926, to form a beam in one of the spade positions. As to which spade position the beam is to form will be determined by the programmer gating circuit.

To illustrate, if the spade "0" for the tube V11 were to go to ground potential, electron current would flow up from ground through the resistor R115, from the cathode 927 through the target electrode for the "0" spade and, by way of the resistor R80 to the wire 905 to the 200 volt line at the terminal 906. The grid for the triode section V3A of a twin triode tube V3, which is arranged in an output pulser circuit indicated at 928 is connected by a wire 929 to a point between the cathode 927 and the resistor R115. This electron current establishes a 35 volt level at the grid for tube section V3A. The tube V3, preferably a 6211A type tube, is normally a locked-up multivibrator with a bias of 28 volts established by the resistors R72 and R75, connected in series between ground and the 200 volt line at the terminal 906 and with their junction being connected to the grid of the tube section V3B to thereby establish the bias of 28 volts. However, with the 35 volt level at the grid of the tube section V3A, the tube V3 becomes a free running multivibrator. The target current flowing from the target electrode for the "0" spade of tube V11 through the resistor R80 establishes a bias level of approximately 75 volts at the grid 2G*e* of tube V11 through the bleeder network comprising the resistors R82 and R77, while the odd grid 2G*o* is held at a level of about 125 volts through the bleeder comprising the resistors R79, R81 and R78. This results in the energization of the coil 930 of a relay K2 for closing its switch to an external circuit, which will actuate the billing counter M–1 once for each energizing impulse to the coil 930. As shown in FIG. 33*c*, the coil 930 is in series with the plate circuits of the tube V3. When the plate for section V3A conducts as a result of the grid reaching the 35 volt level, the voltage through the coil is sufficient to close the switch in the relay K2.

When the junction of the resistors R73 and R71, which are connected in series between the plate of the triode section V3B and the 200 volt wire 905, goes to a negative 75 volts, the negative edge of the pulse is coupled through the capacitors C47 and C48 to the grids 2G*e* and 2G*o*, respectively, for the tube V11. Since only the even grid 2G*e* is biased at 75 volts at this time, the beam will advance one position and current will now flow through the target electrode for the spade "1," through a wire 931 and through the resistor R79 and establish a 75 volt level at the odd grid 2G*o*. Since there is no current flowing at this time through the resistor R80, the voltage at the even grid 2G*e* returns to the 125 volt level. With the beam now formed at the target electrode for the spade "1" the multivibrator V3 again flips to cause energization of the relay coil 930 to effect closing of the relay switch. The capacitors C60 and C61 slow the rate of change of voltage so that the pulse width through the capacitors C47 and C48 will be too narrow to cause the beam to switch more than one position.

This process continued on alternate odd and even positions with corresponding energizations of the relay coil 930, until spade position "9" is reached whereupon only the first flip of the multivibrator V3 causes the coil 930 of the output relay K2 to become energized. On the return flip, the positive going edge of the section V3A is coupled to the junction of the resistor R92 and the diode D26 by way of a capacitor C2. This positive going action causes an unstable load line condition for the spade "9" current, which causes the beam to clear, from spade "9" rather than advance to position "0." When the beam clears the spade "9," the voltage across the resistor R115 drops to zero, causing the multivibrator V3 to return to its locked-up condition. By starting at the "0" position and terminating at the "9" position, the tube V11 has produced ten flips in the tube V3 resulting in ten closures of the relay K2.

In order to obtain any number of pulses from 1 to 10 wherein each pulse causes closure of the relay K2, a beam must be formed in a spade position. A beam initially formed in spade "0" position would give ten pulses, spade "1" nine pulses, and so forth. When the mulitivibrator V3 is free running, it closes relay K2 and switches the grids in the output pulse counter V11. The output relay K2 closes for approximately 50 milliseconds which is determined by the time constants for capacitors C45 and C46. The closure of this relay causes current to flow in the full wave rectifier bridge 932. Once conducting, the bridge circuit will continue to conduct until its anodes are reversed which occurs when the relay is opened.

From the foregoing, it will be understood that the output pulse counter circuit 926 will control the triggering of the output relay circuit and multivibrator V3. Depending upon which of the spades in the output pulse counter tube V11 a beam is initiated, the multivibrator V3 will trigger anywhere from one to ten and will actuate the relay K2 in accordance therewith. As previously stated, the programmer gate circuit 913 and selector circuit 912 determine which of the spades in tube V11 will be operated to produce the beam. These circuits are adapted to perform this function by two separate triggering circuits which are brought into control in accordance with specific functions for the programmer.

In one of these functions, as will be described more fully hereinafter, the reset circuit 909 will initiate the action. In this phase of operation of the programmer gate 913 and the selector circuit 912, these circuits receive a negative signal from the reset circuit 909. This negative signal is applied to the "0" spade of the tube V7 through the diode D5 by way of a wire 933 for establishing a beam in the "0" position. This will result in a current for the beam flowing from the resistor R114 in the reset circuit through the cathode and target "0" of the tube V7 and through the resistor R100 in the gate circuit 912 to the 200 volt bus by way of the wire 934 which is connected to the terminal 908. When this current is flowing through the resistor R100, the junction of the diode D19 and the resistor R100 will drop to about 8 volts. In the circuit arrangement as shown in FIG. 33*b*, the cathode for the diode D19 is at about 80 volts and, therefore, has its junction back biased.

In the second phase of operation of the programmer, actual operation of the xerographic machine to reproduce will initiate functioning of the programmer. The output of the count driver circuit V2, as developed across the resistor R13, is coupled by way of the terminal 924 through the capacitor C66 as a positive going pulse at the beginning of a count and a negative level at the end of the count. The combination of the capacitor C66 and the resistor R99 differentiate this pulse which is swinging from about 80 volts to 120 volts on the positive spike and 80 volts toward ground on the negative spike. On the positive pulse, both of the diodes D14 and D19 will be back biased. On the negative spike, however, the diode D14 is forward biased and being coupled by a terminal 935 to the spades of the tube V11 permits the tube V11 to form a beam in the spade "0" position.

In the other target resistors R101, R102, R103, R104 and R126, no current will be flowing. Therefore, the potential at the other diode resistor junctions R101–D20, R102–D21, R103–D22, R104, R126–D23 will be at approximately 180 volts. Also at this time, the diodes D15, D16, D17 and D18 will be back biased. As previously stated for illustration purposes, the number of reproductions selected was "165" and this number was applied to the selector switches S1A, S2A and S3A. The programming for the programmer 5TR is such that the first four reproductions would produce ten closures of the relay K2 per reproduction. As each sheet of reproduction paper trips the switch 8LS while the switch 7LS is pulsing, a count pulse is produced in the driver V2 and, the resultant negative pulse is fed to the programming circuit resulting in the beam being formed at the "0" spade of the tube V7. The "0" target of the tube V7 is connected by a wire 936 to a terminal 937 to the "0" spade of the tube V11. This will cause ten flips of the multivibrator V3 in cooperation with the pulse counter V11 for each of the first four counts produced by the driver V2. After the first four counts have been produced and a total of forty closures of the relay K2 have occurred, the programmer is adapted to control the second series of relay closures; six closures per count, for the next four reproductions.

In order to accomplish this, and the other series changes, the programmer is provided with a program sequence circuit 938 which derives electrical power from a wire 939 and terminal 940 from the 200 volt wire 904 and which is arranged to cooperate with the counter devices V4–V8, V5–V9, V6–V10. The negative going edge of the first four input pulses will couple through the diode D14 since at this time the diode D14 is the only forward biased diode. This signal is coupled to position "0" of the tube V11 by the wire 936 and terminal 937 thereby generating ten counts or closures of the relay K2 for each of the first four input pulses. The beam will remain in the "0" position of the tube V7 until "5" is reached in the units counter V4. When the count of "5" is reached in this counter, the negative signal from the target electrode "5" of the tube V8 is coupled by way of a suitable jumper from the terminal **G1*g* in the tube V4 to the terminal T5*u*, through the capacitor C58 to the "0" shield of the tube V7. The voltage at the junction of the resistor R101 and the diode D20 is now at +8 volts, since the beam in the tube V7 is at the "1" target electrode. Since there is no current flowing in the resistor R100, the junction of the resistor R100 and the diode D19 returns to 180 volt level. The negative going edge of the next three input pulses will also couple through the diode D15 instead of the diode D14 since the diode D15 is the only forward biased diode. This signal is coupled to position "4" of the tube V11 by a wire 941 and terminal 942, thereby generating six counts or closures of the relay K2. The beam will remain in position "1" of the tube V7 until "9" is reached in the units counter V4. When the count of "9" is reached in the units counter, the negative signal from the target electrode "9" of the tube V8 is coupled by way of a suitable jumper from the terminal G2*g* in the tube V4 to the terminal T9*u* in the program sequence circuit 938, through the capacitor C74 and develops a negative signal across the resistor R117 which switches the beam of the tube V7 from position "1" to position "2." This now causes current to flow through the resistor R102 and the voltage at the junction of the resistor R101 and the diode D20 returns to 180 volt level. The diodes D14, D15, D17 and D18 still remain back biased. The diode D16 is now the only diode open to a negative pulse. The beam will remain in position "2" until a total count of 20 is reached in the units and tens counter. When a count of 20 is reached the signal appearing on the terminal G3*g* is coupled by way of a suitable jumper to the terminal T2*t* through a capacitor C72 and this signal causes the beam in the tube V7 to switch from position "2" to position "3." The diode D17 is now open for a negative signal while the diodes D14, D15, D16 and D18 are back biased. This negative signal is conducted by a wire 943 and terminal 944 to the spade "7" in the tube V11 thereby causing a beam to form in this position of the tube V11 and producing three more closures of the relay switch K2 for each count produced by the count driver U2**.

On the count of 21, the signal appearing at the terminal **G4*g* in the units counter V4, which terminal is connected to the beginning position for the fourth series of relay closure, is coupled by way of a jumper to the terminal T1*u*, through a capacitor C73 causing the beam in the tube V7 to switch from position "3" to position "4." The 21 count would be coupled to position "9" of the tube V11 by way of a wire 945 having a capacitor C7 and diode D35 in series therewith. The junction between the capacitor C7 and the diode D35 is connected by way of a terminal 946 to spades for the tube V11. The instant the beam is formed in position "4" of the tube V7, the junction of the resistor R126 and diode D23 goes from a 180 volt to about 8 volts. This would give one closure of the relay switch K2. Current is now flowing in the combination of the resistors R126 and R104. The diode D18 which is connected by a wire 947 and terminal 948, to the "9" spades for the tube V11, is now open to a negative signal while the diodes D14, D15, D16 and D17** are reverse biased.

Upon reaching the position "4" of the tube V7, the signal is derived from the alternate target outputs of the units counter through the diodes D29, D30, D31, D32 and D33 (see FIG. 33*a*). This negative going signal is coupled through a resistor R122 to a capacitor C62 in the selector circuit 912 by way of a wire 944. The pulse is differentiated by the capacitor C62 and a resistor R95 and coupled by way of a wire 950 through the diode D18 which is now open to a negative pulse. This negative pulse causes a beam to form in the position "9" of the tube V11 yielding one closure of the relay K2 for every odd count after 21. The beam will remain in position "4" of the tube V7 until the programmer 5TR is reset back by the zero settings of the counter V4, V5 and V6.

The foregoing arrangement of the program sequence for the relay K2 closures involves a set of connections between the programmer gate 913 and certain designated spades of the output pulse counter 926 in order to produce multiple series of predetermined numbers of relay closures for each pulse produced by the count driver circuit 911. While only four series have been described, it will be apparent that the connections may be rearranged to provide other predetermined relay closures. The program sequence may also be altered by a re-arrangement of jumper connections between the appropriate counter cathodes of the tubes V4, V5, V6 and the program sequence circuit 938 in order to redetermine when the series changes are to occur. As shown in FIG. 33*b*, a terminal 951 is provided in the sequence circuit 938 to permit use of a fifth series of relay closures and this terminal may be coupled to the appropriate cathode of either of the tubes V4, V5, V6, at which the series change is to occur. For designating the number of relay closures for this fifth series, a circuit comprising dividers D27, D28; resistors R138, R139 and a terminal 952 is provided and may be coupled to the appropriate spade in the tube V11 to effect a new series change.

The hold-ten pulse contact 20CR2, shown in FIG. 32*b* closes when the platen is in the "up" position. This contact, when closed, holds the position "1" spade of the tube V7 at 60 volts so that the beam in that tube will remain in the "0" position. This allows the diode D14 to stay open to all input pulses produced by the count driver 911. The contact 20CR2 prevents the first series of a program from transferring to the second series and, when closed, will result in the production of ten relay closures by the relay K2 for each count produced by the driver 911. Use of this contact occurs automatically when the platen is maintained in the "up" position during reproduction of pages in the book or magazine which is classified as "special" copying.

In summary then, the gate circuit plus the selector circuit control the output pulse counter. The output pulser V3, both switches the output pulse counter V11 and controls the output of the circuit 932. The circuit 932 is provided with terminals 953 which may be connected to a suitable motor (not shown) and the source of 115 volts are provided for the machine circuit for energizing the motor and the circuit 932 for advancing the registering mechanism M–1 one unit for each relay closure.

Although only terminals G–1, G–2, and G–4 of tube V4 and terminal G–3 of tube V5 have been used in the example of a mode of operation, as described, it is realized that any of the other un-numbered terminals of tubes V4, V5 and V6 may be used in the manner described.

INTERLOCK CIRCUIT

The platen interlock circuit to be described below is a relatively extensive circuit which controls the mode of operation of the programmer 5TR and, in some cases operation of the xerographic machine for certain circumstances that may occur during operation of the machine. As previously stated, the programmer 5TR is adapted to actuate the billing counter or register mechanism M–1 in accordance with a pre-arranged program which makes it more economical to use the xerographic machine for high production purposes, by actuating the registering mechanism at a higher rate for low production runs and to gradually reduce the rate of the billing actuation as the production becomes greater. In order to insure that the machine will continue a high production run as initially preset by the selector switches S1A, S2A, S3A, and that the registering mechanism actuation will reflect the correct count in accordance with the initiallly preset data, the interlock circuit is arranged to return the counter devices in the programmer to a zero setting whereby the high rate of registering mechanism actuation will commence again at any time there is an interruption in the operation of the programmer due to operator default. On the other hand, the interlock circuit is also adapted to prevent the return to zero condition of the programmer counter devices and any change in the rate of billing counter activation in the event that there is a xerographic machine failure or, that the machine shuts down for reasons of a low paper condition or, that a mispuff occurs during operation. Similarly, any action undertaken by an operator to correct faulty machine conditions wherein interlock switches may be opened to service the machine will not affect the current stature of the programmer.

The platen interlock circuit comprised essentially of the relays 15CR, 16CR, 20CR, 21CR, 22CR and 32CR, the cycling switches 16LS and 18LS, a read switch 17LS and an electromagnet L–4 (see FIG. 36). As shown in the electrical schematic illustrations in FIGS. 32*a*–32*d*, the electromagnet L–4 is in series with the normally closed contact 16LSB and is adapted to derive electrical power from the neutral wire W1 and the wire W10 when the contact 19WCR2 is closed. In another electrical path, the electromagnet is also in series with the normally closed contact 4CR3A and the normally closed cycling switch 18LS. Physically, the electromagnet L–4 is mounted in the platen handle and is adapted to cooperate with the reed switch 17LS located in the platen casing immediately below the electromagnet.

The electromagnet is energized when the machine is turned "ON" which causes closing of the relay contact 19CR2, thereby providing power to the electromagnet through the normally closed switch 16LSB. When the platen is manually placed in its down position by the operator, and power has been applied to the electromagnet, the switch 17LS will close under the influence of the magnetic forces produced by the electromagnet. With the switch 17LS closed, the relay 16CR becomes energized thereby closing the normally open contact 16CR1A for energizing the relay 15CR through the normally closed switch 18LS and the now closed contact 16CR1A. When the relay 15CR is energized, its normally open contact 15CR1A closes thereby completing the circuit through the now closed normally open contact 16CR2 and the normally closed contact 21CR1 to the relay 22CR which becomes energized.

In the shutdown circuit, which requires the energization of the relay 7CR to commence the shutdown of the xerographic machine, the normally open contact 22CR3 closes; the normally open contact 15CR2B closes; the normally open contact 21CR3 remains open and the normally closed contact 15CR2A opens. In effect then, all branches in the shutdown circuit for the relay 7CR remain open and the xerographic machine will continue to run in normal operation. The running of the xerographic machine will continue under the control of the programmer 5TR which will count the number of reproductions being made and actuate the billing counter in accordance with the predetermined stepped sequence or program enumerated above.

Figure 32D:
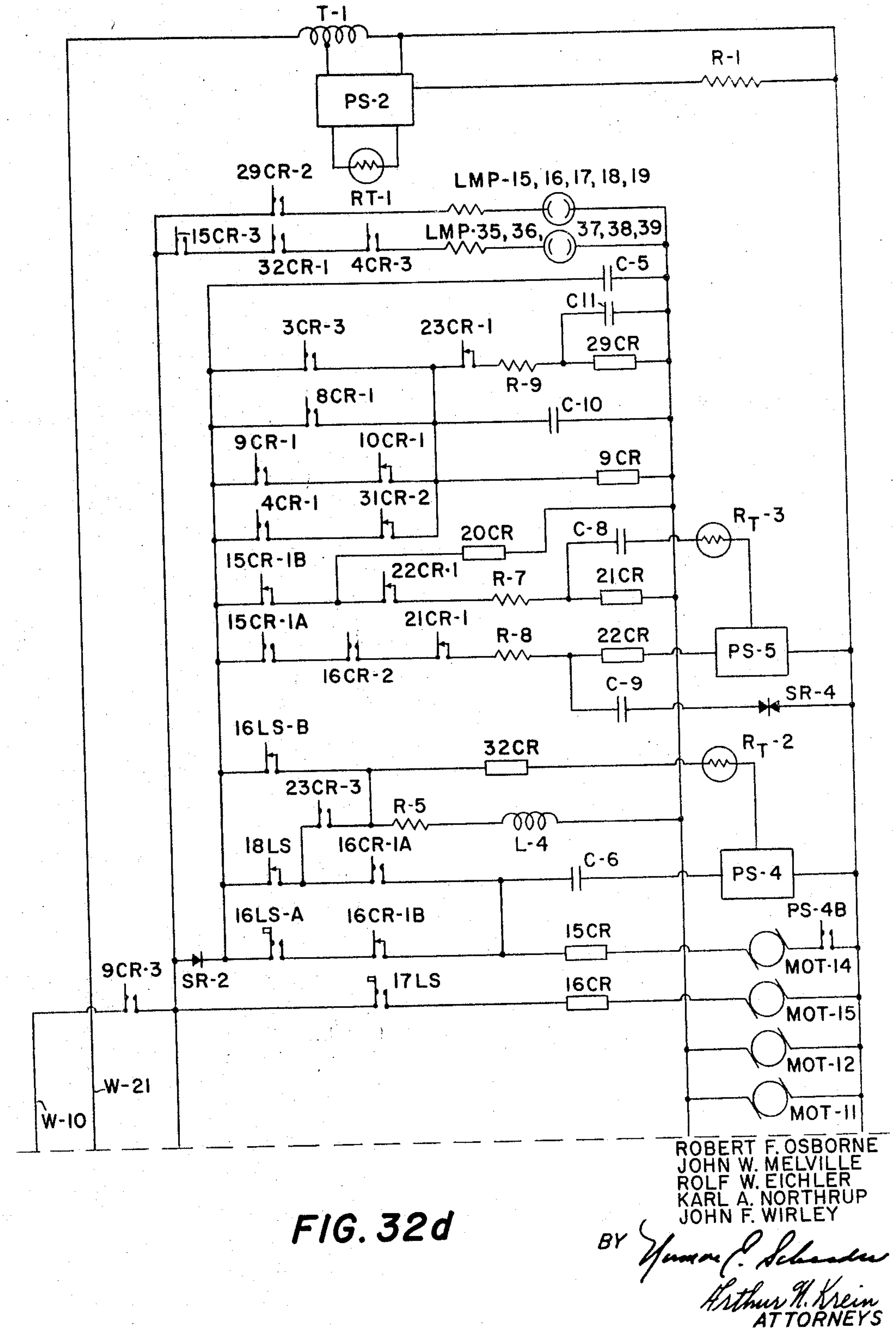

As previously stated B+ is supplied to the programmer 5TR to condition the same for its counting operation when there is an electrical connection between the terminals 907, 908. These terminals are connected to a circuit comprising parallel legs wherein a certain combination of switches must be closed in order to effect an electrical connection between the terminals. As shown in FIGURE 32*d*, the circuit includes the three relay contacts 9CR2, 10CR2, and 2CR3 connected in parallel to the terminal 907 and, the relay contacts 21CR2 and 22CR2 connected in series with the terminal 908. These contacts are connected to a common junction point whereby the establishment of the connection between the terminals 907, 908 requires at least one of the contacts 9CR2, 10CR2, or 2CR3 to be closed and, one of the contacts 21CR2 or 22CR2 to be closed in order to complete the connection.

The contacts 9CR2, 10CR2 and 2CR3 for the most part involve the various interlock switches associated with the various structural features of the xerographic machine or the jam detection switches. The contact 2CR3 will close when the relay 2CR is energized by the closing of mispuff switch 2LS, the "A" transport jam detection switch 1LSA and the closure of the miss detector switch 3LSB. The relay 2CR will also be energized if the paper transport 44 jam detection switches 27LS and 28LS are closed. If for any reason there is a paper jam during the transport of a sheet of paper, the relay 2CR becomes deenergized and permits opening of the contact 2CR3.

The contact 10CR2 will close when the relay 10CR is energized. As shown, the relay 10CR is in series with the developer interlock switch 13LS and the drum interlock switch 26LS. If for any reason the developer housing and the drum are removed or not in position for proper operation the contact 10CR2 will be in its open condition. Also in series with the relay 10CR is the timing switch 2TR3 which is normally closed but is actuated to its open condition 2.5 seconds after the shutdown relay 7CR is energized.

The contact 9CR2 is actuated to its closed condition when the relay 9CR is energized which occours when the relay 8CR is energized to close the contact 8CR1. Since the relay 8CR is connected in parallel with the relay 2CR energization of the latter will produce closing of the contact 9CR2. Normally, only the contact 10CR2 is closed during machine operation and the contacts 9CR2 and 2CR3 are closed when a machine malfunction occurs thereby maintaining the B+ voltage in the programmer 5TR in order that the count is not lost. The programmer will hold the count in the indicating tubes V4, V5, and V6 and will resume the count when the failure has been corrected and the machine started again.

On the other hand, the contacts 21CR2 and 22CR2 involve actions undertaken by the operator to intervene in the normal preset operation of the machine where for example the platen is lifted to insert another document while the previous document is still being reproduced under original preset conditions in order to obtain copies of the second document at a lower rate. As will be described hereinafter, if the platen is lifted during a run, the machine will shut down, the indicating tubes V4, V5 and V6 will switch to their "0" settings and a restart of the operation of the machine will cause a new counting operation of the programmer, that is, the count will start at the "0" settings, and, at the initial high rate of 10 billing counter actuations for the first four copies, six actuations for the next four copies and so on.

In the event that during a run or prior to the time that the counting devices are in coincidence with the particular number of reproductions of a given document set in the selector switches S1A, S2A, and S3A, the platen is lifted from its normal down position by the machine operator, the reed switch 17LS will open causing deenergization of the relay 16CR. With 16CR deenergized, the circuit to the relay 15CR, which circuit includes the normally closed cycling switch 18LS and the contact 16CR1A, will open resulting in the closing of the contact 15CR2B and the opening of the contact 15CR2A in the 7CR shutdown circuit. As shown in FIG. 32*d*, the relay 22CR is in series with the contacts 15CR1A and 16CR2 which revert to their open condition when the relays 15CR, 16CR, respectively are deenergized. However, the relay 22CR is a delay relay which releases its contacts after a short time delay after its coil has become deenergized. This will result in the energization of the shutdown relay 7CR since the contact 22CR3 remains closed for a short perior of time and while contact 15CR2B is closed. During this short period, the energization of the relay 7CR causes closure of 7CR1 which maintains energization of the relay 7CR through the contact 7CR1 and the switch SW4B after the relay 22CR has released its contact 22CR3. Consequently, upon this occurrence, the machine goes into its previously described shutdown sequence. Also, when the relay 15CR becomes deenergized, its normally closed contact 15CR1B closes and, after the short period of time for the relay 22CR to release its contacts has transpired, the relay 21CR becomes energized through the normally closed contact 22CR1, thus resulting in the closing of the contact 21CR2.

With the energization of the relay 7CR, its normally closed contact 7CR2 opens to cause deenergization of the relay 4CR which in turn opens the circuit to the paper feed solenoid SOL-1. With no paper being fed to the "A" transport, the cycling switch 8LS remains open to break the circuit to the pulse counter 911 in the programmer 5TR thereby terminating counting by this circuit. After a time interval of 2.5 seconds after commencement of shutdown of the xerographic machine, the timer contact 2TR3 opens thereby opening the circuit to the relay 10CR which, in turn, causes opening of the connection between the terminals 907, 908. Upon this occurrence, the supply of B+ voltage to the programmer 5TR will be terminated and the indicating tubes V4, V5 and V6 will go out.

If during or after the shutdown sequence the operator lowers the platen to its original closed position, the machine continues its shutdown sequence unaffected and to restart the machine, the operator must depress the start button again. Since the shutdown of the machine has caused termination of the supply of B+ to the indicating tubes V4, V5 and V6, these tubes will, upon restart, register "0" and the programmer will commence counting and produce billing counter actuation as it would from an original start. After restarting and without further interruptions, the machine will finish reproducing copies of the document when the preset number has been accomplished, resulting in a total production run of the preset number plus the number produced before the plated was raised.

Assume now that the operator wishes to operate the machine to produce copies of a page in a book or magazine under "Special" operation. In this event, the platen must be maintained in an "up" position to maintain continuous operation of the machine. For "Special" document reproduction with the platen up, the relay 22CR will be de-energized since 16CR2 will be opened with 16CR deenergized and, the relay 21CR will be energized. The contacts 21CR3 and 15CR2B will be closed and the contacts 22CR3 and 15CR2A will be opened and the circuit to the relay 7CR will remain open. With the machine still running, the contact 15CR3 is closed and the contact 4CR3 is closed resulting in the relay 32CR being pulsed by the switch 16LS. This will cause the "Special" document light to blink on and off. Also, with the platen "up" for "Special" reproductions, the contact 20CR2 is closed causing ten closures of the relay K2 for each reproduction as long as the machine is running in this condition. If the platen is put down during a run, the contact 15CR2A closes and the relay 7CR will be energized shutting down the machine. The contact 21CR3 stays closed long enough to energize the relay 7CR because as previously stated it is a time-delay relay.

If the platen is raised to change documents to take advantage of a lower billing rate of the registering device M-1, during a mispuff or low paper condition, the condition of the relays 21CR and 22CR will change resulting in opening of the contacts 21CR2 and 22CR2 in the programmer B+ circuit. This, in effect, opens the connection between the terminals 907 and 908 which, as previously stated, resets the programmer wherein the indicating tubes V4, V5, and V6 will all immediately register "0" and the programmer will produce 10 closures of the relay K2 for each sheet of paper being transported by "A" transport.

If a permanent magnet is used to simulate the electromagnet L-4, the relay 16CR will become deenergized at the time when the cycling switch 18LS is opened. This will cause deenergization of the relay 15CR and the machine will time out as previously discussed. In effect, the cycling switches 16LS and 18LS prevent the use of a permanent magnet in place of the electromagnet L-4 for producing a lower number of closures of the relay K2 for each input pulse to the programmer.

When the xerographic machine is running with the platen up, such or during scanning of a page in a book, the relay 20CR will be energized and the contact 20CR2 will close in the programmer circuit. This will result in the production of 10 closures of the relay K2 for each input pulse as long as the machine is running in this condition.

While the invention has been described with reference to the structure disclosed herein, it is not to be confined to the specific details set forth. Modifications or changes may readily become apparent to those skilled in the art, and, therefore, this application is intended to cover such modifications or changes as may come within the purposes of the improvements of the scope of the following claims.

What is claimed is:

1. A reproducing machine for reproducing copies of a document on sheets of record material including,
means for orienting the document relative to a fixed position during reproduction thereof,
positionable means operable to a predetermined condition when the document is in fixed position,
means for receiving and forming a transferable image of the document,
means for transferring said image to the sheets of record material when in contact with said image receiving means,
feed and transporting mechanism for feeding seriatim the sheets of record material into contact with said image receiving means to effect transfer of said image upon each sheet of the record material,
a counter device operatively associated with said feed and transporting means for cumulatively recording the number of the sheets of record material being transported,
a registering mechanism actuatable for indicating total actuation thereof at the rate of one actuation per input pulse in response to input pulses received by said registering mechanism,
means operatively associated with said counter device and said registering mechanism to generate to said registering mechanism a first series of input pulses for each of a predetermined number of transported sheets and a second series of input pulses for each of another predetermined number of transported sheets, and
an interlock circuit including switching means associated with said positionable means and said counter device for terminating recording by the latter when said positionable means has been operated from said predetermined condition.

2. A reproducing machine for reproducing copies of a document on sheets of record material including,
holding means operable to a predetermined position for maintaining the document in fixed position during reproduction thereof,
means for receiving and forming a transferable image of the document,
means for transferring said image to the sheets of record material when in contact with said image receiving means,
feed and transporting mechanism for feeding seriatim the sheets of record material into contact with said image receiving means to effect transfer of said image upon each sheet of the record material,
a counter device operatively associated with said feed and transporting means for cumulatively recording the number of the sheets of record material being transported,
a registering mechanism actuatable for indicating total actuation thereof at the rate of one actuation per input pulse in response to input pulses received by said registering mechanism,
means operatively associated with said counter device and said registering mechanism to generate to said registering mechanism a first series of input pulses for each of a predetermined number of transported sheets and a second series of input pulses for each of another predetermined number of transported sheets, and
an interlock circuit including switching means associated with said holding means and said counter device for terminating recording by the latter when said holding means has been moved from said predetermined position.

3. A reproducing machine for reproducing copies of a document on sheets of record material including,
means for orienting the document relative to a fixed position during reproduction thereof,
positionable means operable to a predetermined condition when the document is in fixed position,
means for receiving and forming a transferable image of the document,
means for transferring said image to the sheets of record material when in contact with said image receiving means,
feed and transporting mechanism for feeding seriatim the sheets of record material into contact with said image receiving means to effect transfer of said image upon each sheet of the record material,
a counter device operatively associated with said feed and transporting means for cumulatively recording the number of the sheets of record material being transported,
said counter device including means for producing a zero recording after recording has commenced upon the occurrence of an event,
a registering mechanism actuatable for indicating total actuation thereof at the rate of one actuation per input pulse in response to input pulses received by said registering mechanism,
means operatively associated with said counter device and said registering mechanism to generate to said registering mechanism a first series of input pulses for each of a predetermined number of transported sheets and at least a second series of input pulses for each of another predetermined number of transported sheets, and
an interlock circuit including switching means associated with said positionable means and said counter device for producing said event when said positionable means has been operated from said predetermined position whereby said counter device will revert to a zero reading.

4. A reproducing machine for reproducing copies of a document on sheets of record material including,
means for orienting the document relative to a fixed position during reproduction thereof,
positionable means operable to a predetermined condition when the document is in fixed position,
means for receiving and forming a transferable image of the document,
means for transferring said image to the sheets of record material when in contact with said image receiving means,
feed and transporting mechanism for feeding seriatim the sheets of record material into contact with said image receiving means to effect transfer of said image upon each sheet of the record material,
a registering mechanism actuatable for indicating total actuations thereof at the rate of one actuation per input pulse in response to input pulses received by said registering mechanism,
means for generating to said registering mechanism a first series of input pulses for each of a predetermined number of tranported sheets and at least a second series of input pulses for each of another predetermined number of transported sheets, and
an interlock circuit including switching means associated with said positionable means and said means for generating and operable while the latter is generating said second series of input pulses to condition the same to generate said first series when said positionable means has been operated from said predetermined condition.

5. A reproducing machine for reproducing copies of a document on sheets of record material including,
holding means operable to a predetermined position for maintaining a document in fixed position during reproduction thereof, means for forming an image of said document on a sheet of record material, feeding and transporting mechanisms for seriatim feeding and transporting sheets of record material, a registering mechanism actuatable for indicating total actuation thereof at the rate of one actuation per input pulse in response to input pulses received by said registering mechanism, pulse generating means for generating to said registering mechanism a first series of input pulses for each of a predetermined number of transported sheets and at least a second series of input pulses for each of another predetermined number of transported sheets, and an interlock circuit including switching means operatively connected with said holding means and said pulse generating means for terminating actuation by the latter when said holding means has been moved from said predetermined position.

No references cited.

NORTON ANSHER, *Primary Examiner.*